United States Patent
Andrews et al.

(10) Patent No.: US 12,358,227 B2
(45) Date of Patent: Jul. 15, 2025

(54) FLUID MANAGEMENT AND CIRCULATION SYSTEMS FOR USE IN ADDITIVE MANUFACTURING APPARATUSES

(71) Applicant: General Electric Company, Schenectady, NY (US)

(72) Inventors: Timothy Francis Andrews, Sharonville, OH (US); Carlos H. Bonilla, Lebanon, OH (US); Vadim Bromberg, Niskayuna, NY (US); Victor Fulton, Amelia, OH (US); Tyler Andrew Griffith, Norwood, OH (US); Younkoo Jeong, Clifton Park, NY (US); John Sterle, Clifton Park, NY (US); Grant Alan Ingram, West Chester, OH (US)

(73) Assignee: General Electric Company, Evendale, OH (US)

( * ) Notice: Subject to any disclaimer, the term of this patent is extended or adjusted under 35 U.S.C. 154(b) by 301 days.

(21) Appl. No.: 17/612,454

(22) PCT Filed: May 22, 2020

(86) PCT No.: PCT/US2020/034142
§ 371 (c)(1),
(2) Date: Nov. 18, 2021

(87) PCT Pub. No.: WO2020/237120
PCT Pub. Date: Nov. 26, 2020

(65) Prior Publication Data
US 2022/0234109 A1    Jul. 28, 2022

Related U.S. Application Data

(60) Provisional application No. 62/852,036, filed on May 23, 2019.

(51) Int. Cl.
*B29C 64/357* (2017.01)
*B22F 10/14* (2021.01)
(Continued)

(52) U.S. Cl.
CPC ............ *B29C 64/357* (2017.08); *B22F 10/14* (2021.01); *B22F 10/30* (2021.01); *B22F 10/62* (2021.01);
(Continued)

(58) Field of Classification Search
CPC ..... B29C 64/295; B29C 64/386; B29C 64/35; B29C 64/357; B29C 64/165; B29F 10/62;
(Continued)

(56) References Cited

U.S. PATENT DOCUMENTS

| 4,034,219 A | 7/1977 | Ouden et al. |
| 4,680,895 A | 7/1987 | Roestenberg |

(Continued)

FOREIGN PATENT DOCUMENTS

| CN | 204366039 U | 6/2015 |
| CN | 106862570 A | 6/2017 |

(Continued)

OTHER PUBLICATIONS

International Search Report and Written Opinion for application PCT/US2020/034254 mail date Aug. 24, 2020 (14 bages).
(Continued)

*Primary Examiner* — Alison L Hindenlang
*Assistant Examiner* — Erica Hartsell Funk
(74) *Attorney, Agent, or Firm* — Dinsmore & Shohl LLP

(57) ABSTRACT

Embodiments of the present disclosure are directed to additive manufacturing apparatuses, cleaning stations incorporated therein, and methods of cleaning using the cleaning stations.

17 Claims, 23 Drawing Sheets

(51) Int. Cl.
*B22F 10/30* (2021.01)
*B22F 10/62* (2021.01)
*B22F 10/70* (2021.01)
*B22F 10/80* (2021.01)
*B22F 12/10* (2021.01)
*B22F 12/50* (2021.01)
*B29C 64/295* (2017.01)
*B29C 64/35* (2017.01)
*B29C 64/386* (2017.01)
*B33Y 30/00* (2015.01)
*B33Y 40/00* (2020.01)
*B22F 12/53* (2021.01)
*B22F 12/90* (2021.01)

(52) U.S. Cl.
CPC .............. *B22F 10/70* (2021.01); *B22F 10/80* (2021.01); *B22F 12/10* (2021.01); *B22F 12/50* (2021.01); *B29C 64/295* (2017.08); *B29C 64/35* (2017.08); *B29C 64/386* (2017.08); *B33Y 30/00* (2014.12); *B33Y 40/00* (2014.12); *B22F 12/53* (2021.01); *B22F 12/90* (2021.01)

(58) Field of Classification Search
CPC .......... B29F 10/14; B29F 10/70; B29F 10/80; B29F 10/30; B29F 12/10; B29F 12/50; B29F 12/53; B29F 12/90
See application file for complete search history.

(56) References Cited

U.S. PATENT DOCUMENTS

| | | | |
|---|---|---|---|
| 4,722,824 A | 2/1988 | Wiech, Jr. | |
| 4,853,717 A | 8/1989 | Harmon et al. | |
| 5,121,329 A * | 6/1992 | Crump .................. | B33Y 30/00 228/180.5 |
| 5,204,055 A | 4/1993 | Sachs et al. | |
| 5,234,636 A | 8/1993 | Hull et al. | |
| 5,387,380 A | 2/1995 | Cima et al. | |
| 5,610,824 A | 3/1997 | Vinson et al. | |
| 5,672,579 A | 9/1997 | Diaz et al. | |
| 5,810,988 A | 9/1998 | Smith, Jr. et al. | |
| 5,847,283 A | 12/1998 | Finot et al. | |
| 5,902,537 A | 5/1999 | Almquist et al. | |
| 5,997,128 A | 12/1999 | Lou et al. | |
| 6,007,318 A | 12/1999 | Russell et al. | |
| 6,146,567 A | 11/2000 | Sachs et al. | |
| 6,158,838 A | 12/2000 | Capurso | |
| 6,159,085 A | 12/2000 | Hara | |
| 6,164,751 A | 12/2000 | Griffin et al. | |
| 6,241,337 B1 | 6/2001 | Sharma et al. | |
| 6,372,178 B1 | 4/2002 | Tseng | |
| 6,375,874 B1 | 4/2002 | Russell et al. | |
| 6,406,122 B1 | 6/2002 | Sharma et al. | |
| 6,416,850 B1 | 7/2002 | Bredt et al. | |
| 6,454,811 B1 | 9/2002 | Sherwood et al. | |
| 6,497,471 B1 | 12/2002 | Gargir | |
| 6,595,618 B1 | 7/2003 | Roy et al. | |
| 6,596,224 B1 | 7/2003 | Sachs et al. | |
| 6,764,636 B1 | 7/2004 | Allanic et al. | |
| 6,896,839 B2 | 5/2005 | Kubo et al. | |
| 6,899,777 B2 | 5/2005 | Vaidyanathan et al. | |
| 6,986,654 B2 | 1/2006 | Imiolek et al. | |
| 6,989,115 B2 | 1/2006 | Russell et al. | |
| 7,037,382 B2 | 5/2006 | Davidson et al. | |
| 7,225,803 B2 | 6/2007 | Boyadjieff | |
| 7,291,002 B2 | 11/2007 | Russell et al. | |
| 7,296,990 B2 | 11/2007 | Devos et al. | |
| 7,387,359 B2 | 6/2008 | Hernandez et al. | |
| 7,389,154 B2 | 6/2008 | Hunter et al. | |
| 7,435,368 B2 | 10/2008 | Davidson et al. | |
| 7,520,740 B2 | 4/2009 | Wahlstrom et al. | |
| 7,665,636 B2 | 2/2010 | Ederer et al. | |
| 7,686,995 B2 | 3/2010 | Davidson et al. | |
| 7,690,909 B2 | 4/2010 | Wahlstrom | |
| 7,700,020 B2 | 4/2010 | Nielsen et al. | |
| 7,736,578 B2 | 6/2010 | Ederer | |
| 7,790,093 B2 | 9/2010 | Shkolnik et al. | |
| 7,824,001 B2 | 11/2010 | Fienup et al. | |
| 7,897,074 B2 | 3/2011 | Batchelder et al. | |
| 7,962,238 B2 | 6/2011 | Shkolnik et al. | |
| 7,979,152 B2 | 7/2011 | Davidson | |
| 8,017,055 B2 | 9/2011 | Davidson et al. | |
| 8,033,812 B2 | 10/2011 | Collins et al. | |
| 8,105,527 B2 | 1/2012 | Wahlstrom | |
| 8,167,395 B2 | 5/2012 | Fienup et al. | |
| 8,185,229 B2 | 5/2012 | Davidson | |
| 8,862,260 B2 | 10/2014 | Shkolnik et al. | |
| 8,979,244 B2 | 3/2015 | Kritchman et al. | |
| 8,997,799 B2 | 4/2015 | Hodson et al. | |
| 9,193,164 B2 | 11/2015 | Kritchman et al. | |
| 9,403,322 B2 | 8/2016 | Das et al. | |
| 9,415,443 B2 | 8/2016 | Ljungblad et al. | |
| 9,434,838 B2 | 9/2016 | Jung et al. | |
| 9,446,448 B2 | 9/2016 | Mccoy et al. | |
| 9,561,622 B2 | 2/2017 | Das et al. | |
| 9,586,364 B2 | 3/2017 | El-Siblani et al. | |
| 9,757,831 B2 | 9/2017 | Ederer et al. | |
| 9,912,915 B2 | 3/2018 | Sinclair | |
| 9,956,612 B1 | 5/2018 | Redding et al. | |
| 9,962,767 B2 | 5/2018 | Buller et al. | |
| 10,000,009 B2 | 6/2018 | Maier | |
| 10,022,794 B1 | 7/2018 | Redding et al. | |
| 10,022,795 B1 | 7/2018 | Redding et al. | |
| 10,029,440 B2 | 7/2018 | Satoh | |
| 10,073,434 B1 | 9/2018 | Hollander | |
| 10,232,443 B2 | 3/2019 | Myerberg et al. | |
| 2001/0050448 A1 | 12/2001 | Kubo et al. | |
| 2002/0079601 A1 | 6/2002 | Russell et al. | |
| 2002/0089081 A1 | 7/2002 | Fong | |
| 2004/0145623 A1 | 7/2004 | Choi | |
| 2004/0160472 A1 | 8/2004 | Khalid et al. | |
| 2004/0173946 A1 | 9/2004 | Pfeifer et al. | |
| 2004/0263557 A1 | 12/2004 | Premnath et al. | |
| 2006/0098040 A1 | 5/2006 | Kang | |
| 2006/0246222 A1 | 11/2006 | Winkler | |
| 2007/0077323 A1 | 4/2007 | Stonesmith et al. | |
| 2008/0179786 A1 * | 7/2008 | Sperry .................. | B33Y 40/00 425/375 |
| 2008/0190905 A1 | 8/2008 | Heinlein | |
| 2008/0200104 A1 | 8/2008 | Chuang | |
| 2008/0241404 A1 | 10/2008 | Allaman et al. | |
| 2010/0151136 A1 | 6/2010 | Davidson et al. | |
| 2011/0074866 A1 | 3/2011 | Mamura et al. | |
| 2011/0190923 A1 | 8/2011 | Matsui et al. | |
| 2012/0274701 A1 | 11/2012 | Zhou et al. | |
| 2013/0000553 A1 | 1/2013 | Hoechsmann et al. | |
| 2014/0092172 A1 | 4/2014 | Koshi et al. | |
| 2014/0220168 A1 | 8/2014 | Perez et al. | |
| 2015/0145177 A1 | 5/2015 | El-Siblani et al. | |
| 2015/0151973 A1 | 6/2015 | Lee et al. | |
| 2015/0258706 A1 | 9/2015 | Okamoto et al. | |
| 2015/0266242 A1 | 9/2015 | Comb et al. | |
| 2015/0273762 A1 | 10/2015 | Okamoto | |
| 2015/0343533 A1 | 12/2015 | Park et al. | |
| 2016/0039207 A1 | 2/2016 | Kritchman et al. | |
| 2016/0067929 A1 | 3/2016 | Park | |
| 2016/0075085 A1 | 3/2016 | Sasaki | |
| 2016/0151973 A1 | 6/2016 | Jover et al. | |
| 2016/0214320 A1 | 7/2016 | Sasaki et al. | |
| 2016/0221263 A1 | 8/2016 | Din et al. | |
| 2016/0221269 A1 | 8/2016 | Okamoto et al. | |
| 2016/0325496 A1 | 11/2016 | De Pena et al. | |
| 2016/0325503 A1 | 11/2016 | Mironets et al. | |
| 2016/0332380 A1 | 11/2016 | De Pena et al. | |
| 2016/0361874 A1 | 12/2016 | Park et al. | |
| 2016/0368054 A1 | 12/2016 | Ng et al. | |
| 2016/0368214 A1 | 12/2016 | Sasaki et al. | |
| 2017/0014911 A1 | 1/2017 | Ng et al. | |
| 2017/0021569 A1 | 1/2017 | Puigardeu Aramendia et al. | |
| 2017/0056974 A1 | 3/2017 | Miyashita et al. | |
| 2017/0072644 A1 | 3/2017 | Ng et al. | |
| 2017/0095980 A1 | 4/2017 | Kritchman et al. | |

(56) References Cited

U.S. PATENT DOCUMENTS

| | | |
|---|---|---|
| 2017/0100937 A1 | 4/2017 | Ohnishi |
| 2017/0115594 A1 | 4/2017 | Martin |
| 2017/0136695 A1 | 5/2017 | Versluys et al. |
| 2017/0157862 A1* | 6/2017 | Bauer .................. B29C 64/124 |
| 2017/0203513 A1 | 7/2017 | Chanclon et al. |
| 2017/0217104 A1 | 8/2017 | Cortes I Herms et al. |
| 2017/0239889 A1 | 8/2017 | Ganapathiappan et al. |
| 2017/0239932 A1 | 8/2017 | Knecht et al. |
| 2017/0252975 A1 | 9/2017 | Park |
| 2017/0259456 A1 | 9/2017 | Sasaki et al. |
| 2017/0305142 A1 | 10/2017 | Yamaguchi |
| 2017/0318186 A1 | 11/2017 | Morovic et al. |
| 2017/0326792 A1 | 11/2017 | Paternoster et al. |
| 2017/0334138 A1 | 11/2017 | Vilajosana et al. |
| 2017/0341365 A1 | 11/2017 | De Lajudie et al. |
| 2017/0355137 A1 | 12/2017 | Ederer et al. |
| 2017/0368756 A1 | 12/2017 | Sanz Ananos et al. |
| 2018/0001559 A1 | 1/2018 | Paternoster et al. |
| 2018/0004192 A1 | 1/2018 | Perret et al. |
| 2018/0009157 A1 | 1/2018 | Gutierrez et al. |
| 2018/0009167 A1 | 1/2018 | Alejandre et al. |
| 2018/0011475 A1 | 1/2018 | Donovan et al. |
| 2018/0071820 A1 | 3/2018 | Natarajan et al. |
| 2018/0079137 A1 | 3/2018 | Herzog et al. |
| 2018/0126632 A1 | 5/2018 | Bonatsos et al. |
| 2018/0141271 A1 | 5/2018 | Gunther et al. |
| 2018/0154480 A1 | 6/2018 | Bai et al. |
| 2018/0193947 A1 | 7/2018 | Harding et al. |
| 2018/0200791 A1 | 7/2018 | Redding et al. |
| 2018/0236549 A1 | 8/2018 | Spears et al. |
| 2018/0311898 A1 | 11/2018 | Schwarzbaum et al. |
| 2018/0326660 A1 | 11/2018 | Gifford et al. |
| 2018/0339467 A1 | 11/2018 | Donovan et al. |
| 2018/0370213 A1 | 12/2018 | Gold et al. |
| 2019/0001571 A1 | 1/2019 | Stockett et al. |
| 2019/0022752 A1 | 1/2019 | Twelves, Jr. et al. |
| 2019/0091766 A1 | 3/2019 | Kasperchik et al. |
| 2019/0111619 A1 | 4/2019 | Schalk et al. |
| 2019/0118468 A1 | 4/2019 | Bobar et al. |
| 2019/0126535 A1* | 5/2019 | Thompson ............. B33Y 30/00 |
| 2019/0126554 A1 | 5/2019 | Iwase |

FOREIGN PATENT DOCUMENTS

| | | |
|---|---|---|
| CN | 107175827 A | 9/2017 |
| CN | 107364126 A | 11/2017 |
| CN | 108165961 A | 6/2018 |
| CN | 108927491 A | 12/2018 |
| EP | 1018429 A1 | 7/2000 |
| EP | 1108546 A1 | 6/2001 |
| EP | 1270185 A1 | 1/2003 |
| EP | 1440803 A1 | 7/2004 |
| EP | 1946907 A2 | 7/2008 |
| EP | 2543514 A2 | 1/2013 |
| EP | 3168035 A1 | 5/2017 |
| EP | 3205483 A1 | 8/2017 |
| EP | 3486008 A1 | 5/2019 |
| GB | 2550341 A | 11/2017 |
| GB | 2568518 A | 5/2019 |
| JP | H11157087 A | 6/1999 |
| JP | 2001334582 A | 12/2001 |
| JP | 2003508246 A | 3/2003 |
| JP | 2003211687 A | 7/2003 |
| JP | 2005319650 A | 11/2005 |
| JP | 2008086846 A | 4/2008 |
| JP | 2014065179 A | 4/2014 |
| JP | 2014527481 A | 10/2014 |
| JP | 2015174338 A | 10/2015 |
| JP | 2015182428 A | 10/2015 |
| JP | 2015193184 A | 11/2015 |
| JP | 2016093909 A | 5/2016 |
| JP | 2016107543 A | 6/2016 |
| JP | 2016141151 A | 8/2016 |
| JP | 2017508063 A | 3/2017 |
| JP | 2018503543 A | 2/2018 |
| JP | 2018516774 A | 6/2018 |
| JP | 2018520029 A | 7/2018 |
| JP | 2018523595 A | 8/2018 |
| JP | 2018526527 A | 9/2018 |
| WO | 20010117783 A1 | 3/2001 |
| WO | 2015100085 A2 | 7/2015 |
| WO | 2015151832 A1 | 10/2015 |
| WO | 2017023281 A1 | 2/2017 |
| WO | 2017177603 A1 | 10/2017 |
| WO | 2017196337 A1 | 11/2017 |
| WO | 2018026011 A1 | 2/2018 |
| WO | 2018072975 A1 | 4/2018 |
| WO | 2018091007 A1 | 5/2018 |
| WO | 2018143953 A1 | 8/2018 |
| WO | 2018194688 A1 | 10/2018 |
| WO | 2018231205 A1 | 12/2018 |
| WO | 2019027405 A1 | 2/2019 |
| WO | 2019027431 A1 | 2/2019 |
| WO | 2019059099 A1 | 3/2019 |
| WO | 2019066781 A1 | 4/2019 |
| WO | 2019194795 A1 | 10/2019 |
| WO | 2020237161 A1 | 11/2020 |

OTHER PUBLICATIONS

International Search Report and Written Opinion for application PCT/US2020/034261 mail date Jan. 29, 2021 (32 bages).
Japanese Office Action for Application No. 2021-567071 dated Nov. 29, 2022 (8 pages).
International Search Report and Written Opinion for application PCT/US2020/034144 mail date Jan. 13, 2021 (22 pages).
International Search Report and Written Opinion for application PCT/US2020/034207 mail date Sep. 1, 2020 (16 pages).
International Search Report and Written Opinion for application PCT/US2020/034205 mail date Nov. 13, 2020 (23 pages).
Japanese Patent Office Action for Application No. 2021-567073 dated Dec. 6, 2022 (5 pages).
International Search Report and Written Opinion for application PCT/US2020/034189 mail date Oct. 1, 2020 (24 pages).
International Search Report and Written Opinion for application PCT/US2020/034204 mail date Sep. 2, 2020 (15 pages).
International Search Report and Written Opinion for application PCT/US2020/034244 mail date Nov. 12, 2020 (23 pages).
Hewlett Packard Thermal Inkjet Printhead information sheet, undated (1 page).
International Search Report and Written Opinion for application PCT/US2020/034145 mail date Dec. 1, 2020 (21 pages).
International Search Report and Written Opinion for application PCT/US2020/034259 mail date of Dec. 1, 2020 (23 pages).
International Search Report and Written Opinion application PCT/US2020/034142 mail date Aug. 20, 2020 (15 pages).
International Search Report and Written Opinion for application PCT/US2020/034141 mail date Aug. 20, 2020 (27 pages).
Mercedes-Benz USA: "Magic Vision Control—Mercedes-Benz Windshield Wipers", YouTube, dated Nov. 21, 2013 (Nov. 21, 2013), pp. 1-1, XP054980752, Retrieved from the Internet: URL:https://www.youtube.com/watch?v=07AZHk kLR0k [retrieved on Aug. 5, 2020] 0:13-0:40.
International Search Report and Written Opinion for application PCT/US2020/034140 mail date Nov. 27, 2020 (21 pages).
Hewlett Packard HP LaserJet Pro M404 Series information sheet, undated, https://www8.hp.com/h20195/v2/GetPDF.aspx/4AA7-4955EEP.pdf (5 pages).
"Solution Preparation Guidelines" The Sekisui Chemical Group, httpswww.sekisui-sc.comwp-contentuploadsSelvolPVOH_SolutionPreparationGuidelines_EN.pdf.
Cooke et al., "Process Intermittent Measurement for Powder-Bed Based Additive Manufacturing" National Institute of Standards and Technology, Gaithersburg, MD 208991, Institute for Research in Electronics and Applied Physics, University of Maryland, College Park, MD 20742-3511., Aug. 17, 2011.
Hong et al., "Solvent Effect on Structural Change of Poly(vinyl alcohol) Physical Gels" Journal of Applied Polymer Science . Sep. 1998, DOI: 10.1002/(SICI)1097-4628(19980919)69:123.0.CO;2-U.

(56) References Cited

OTHER PUBLICATIONS

Shanjani et al., "Material Spreading and Compaction in Powder-Based Solid Freeform Fabrication Methods: Mathematical Modeling" Department of Mechanical and Mechatronics Engineering, University of Waterloo, 200 University Avenue West Waterloo, ON N2L 3G1, Canada, Sep. 10, 2008.

Sparrow, "Evonik, Voxeljet partner to develop 3D-printing systems for series production of finished plastic parts", Plastics Today, Nov. 10, 2019, https://www.plasticstoday.com/3d-printing/evonik-voxeljet-partner-develop-3d-printing-systems-series-production-finished-plastic.

"Advanced DLP for Superior 3D Printing" EnvisionTec, Mar. 9, 2017.

European Patent Office Action for Application No. 20735467.1 dated Mar. 16, 2023 (4 pages).

European Patent Office Action for Application No. 20732377.5 dated Mar. 9, 2023 (5 pages).

\* cited by examiner

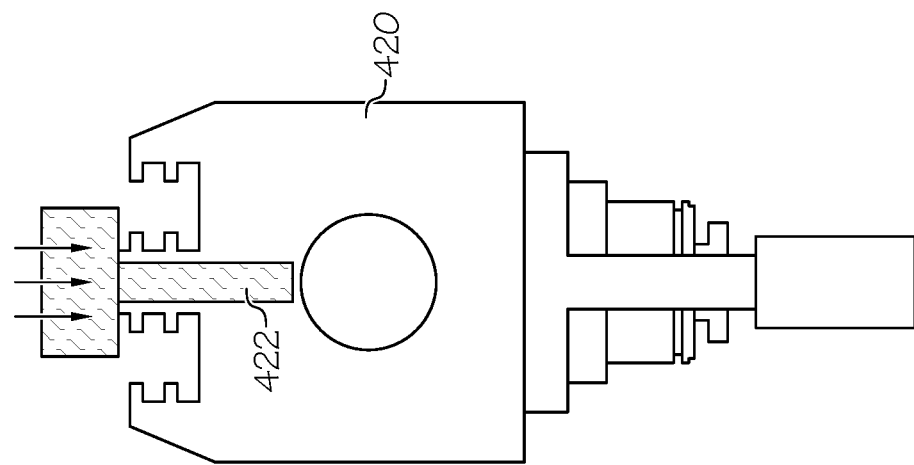
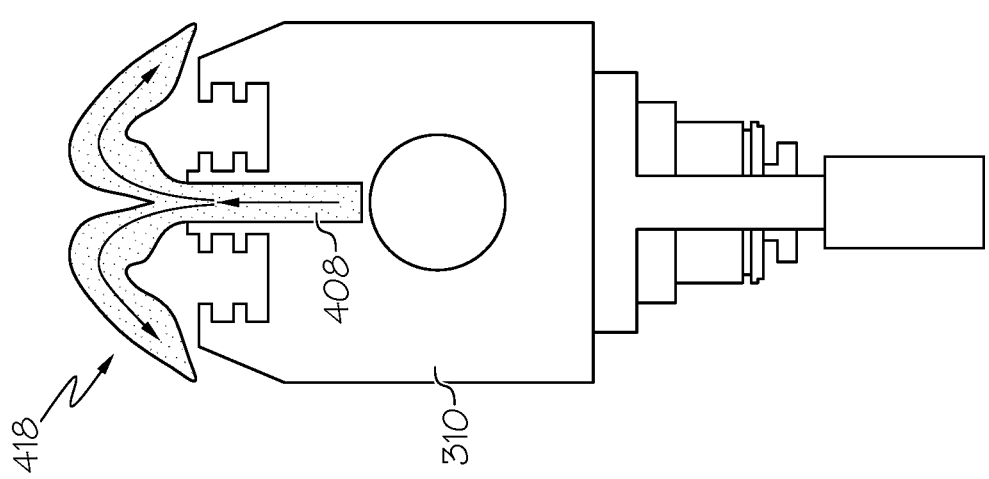
FIG. 4F
FIG. 4E

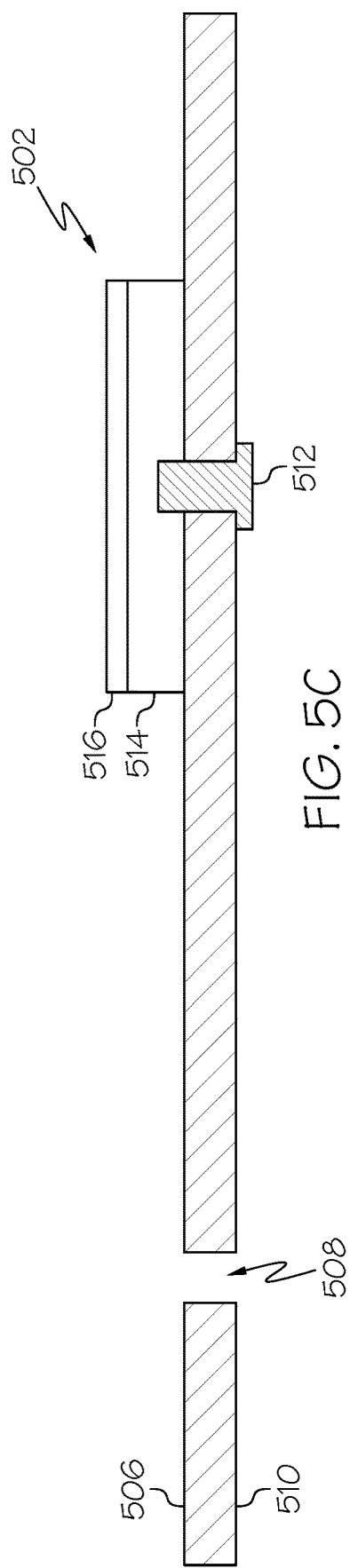
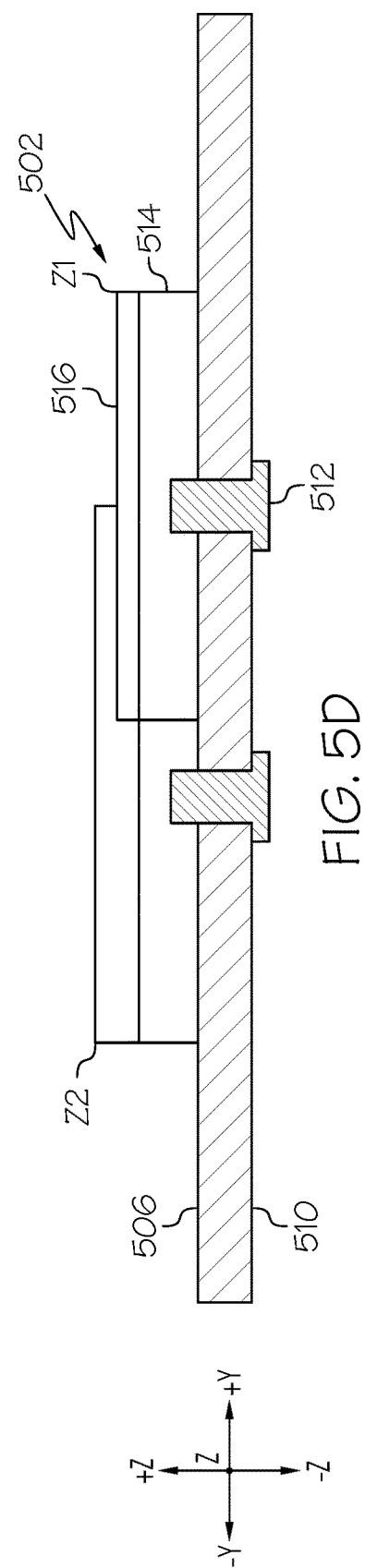

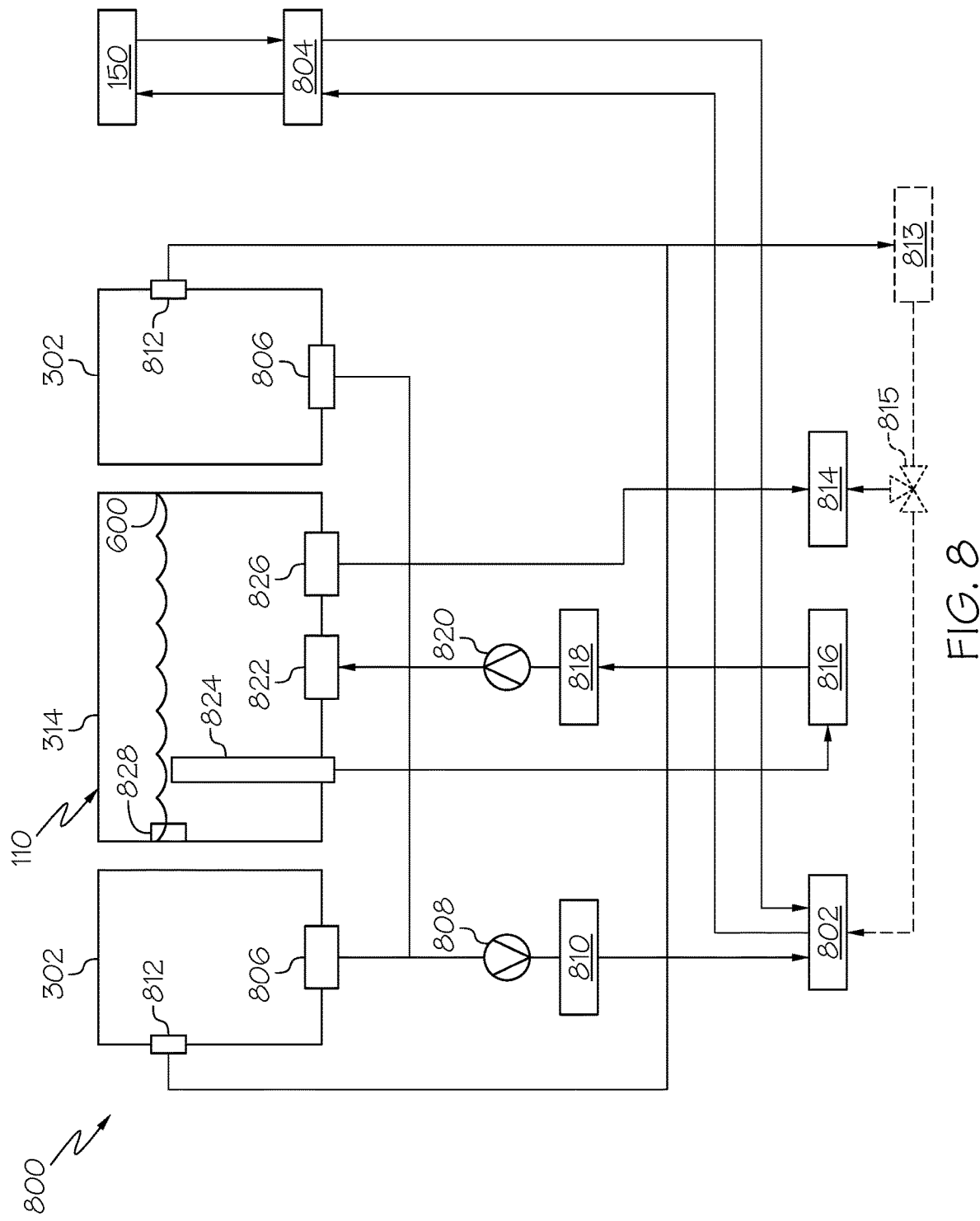

FLUID MANAGEMENT AND CIRCULATION SYSTEMS FOR USE IN ADDITIVE MANUFACTURING APPARATUSES

CROSS-REFERENCE TO RELATED APPLICATIONS

This application is a U.S. National Phase of PCT/US2020/034142, entitled "FLUID AND CIRCULATION SYSTEMS FOR USE IN ADDITIVE MANAGEMENT MANUFACTURING APPARATUSES" and filed May 22, 2020, which claims the benefit of and priority to U.S. Provisional Application Ser. No. 62/852,036, titled "CLEANING SYSTEMS AND ADDITIVE MANUFACTURING APPARATUSES AND FLUID MANAGEMENT AND CIRCULATION SYSTEMS INCORPORATED THEREIN" filed May 23, 2019, the entire contents of each are hereby incorporated by reference herein.

BACKGROUND

Field

The present specification generally relates to additive manufacturing apparatuses and, more specifically, to cleaning systems for additive manufacturing apparatuses and methods for using the same.

Technical Background

Additive manufacturing apparatuses may be utilized to "build" an object from build material, such as organic or inorganic powders, in a layer-wise manner. Early iterations of additive manufacturing apparatuses were used for prototyping three-dimensional (3D) parts. However, as additive manufacturing technology has improved, there is an increased interest in utilizing additive manufacturing apparatuses for large-scale commercial production of parts. One issue of scaling additive manufacturing apparatuses to commercial production is improving the through-put of additive manufacturing apparatuses to meet commercial demands.

Accordingly, a need exists for alternative additive manufacturing apparatuses and components thereof which improve manufacturing through-put.

SUMMARY

A first aspect A1 is directed to a fluid management system for supplying at least a binder fluid and a cleaning fluid, the system comprising: a cleaning fluid path comprising at least one cleaning fluid reservoir, a pump configured to deliver the cleaning fluid from the at least one cleaning fluid reservoir to at least one cleaning station vessel, and a drain coupling the at least one cleaning station vessel to the at least one cleaning fluid reservoir; and a binder fluid path comprising at least one binder reservoir, a pump configured to deliver the binder fluid from the at least one binder reservoir through an ink supply system to a print head manifold, and a binder purge bin configured to receive binder fluid discharged by a print head coupled to the print head manifold.

A second aspect A2 includes the fluid management system of aspect A1, wherein the binder purge bin is a first binder purge bin, the binder fluid path further comprising a second binder purge bin, wherein the first binder purge bin is located upstream from the at least one cleaning station vessel and the second binder purge bin is located downstream from the at least one cleaning station vessel along a path of the print head.

A third aspect A3 includes the fluid management system of any of the foregoing aspects A1-A2, wherein the cleaning fluid path further comprises a filter positioned between the at least one cleaning fluid reservoir and the pump.

A fourth aspect A4 includes the fluid management system of any of the foregoing aspects A1-A3, wherein the binder fluid path further comprises a filter positioned between the binder purge bin and the at least one binder reservoir.

A fifth aspect A5 includes the fluid management system of any of the foregoing aspects A1-A4, wherein the binder fluid path further comprises an additional pump configured to pump fluid from the binder purge bin to the at least one binder reservoir.

A sixth aspect A6 includes the fluid management system of any of the foregoing aspects A1-A5, wherein the cleaning fluid path further comprises a heater to heat the cleaning fluid.

A seventh aspect A7 includes the fluid management system of any of the foregoing aspects A1-A6, wherein the cleaning fluid path further comprises a controller configured to send a signal to a valve positioned in the cleaning fluid path between the at least one cleaning station vessel and the at least one cleaning fluid reservoir to redirect a predetermined amount of the cleaning fluid flowing from the at least one cleaning station vessel to the at least one cleaning fluid reservoir to a waste tank, wherein the predetermined amount of the cleaning fluid contains at least some binder fluid.

An eighth aspect A8 includes the fluid management system of aspect A7, wherein the controller is further configured to send a signal to the pump of the cleaning fluid path to adjust a flow rate of the cleaning fluid from the at least one cleaning fluid reservoir to the at least one cleaning station vessel.

A ninth aspect A9 includes the fluid management system of any of the foregoing aspects A7-A8, wherein the controller is further configured to send a signal to a heater positioned between the pump and the at least one cleaning station vessel to adjust a temperature of the cleaning fluid.

A tenth aspect A10 includes the fluid management system of any of the foregoing aspects A1-A9, wherein at least one of the pump of the cleaning fluid path and the pump of the binder fluid path is configured to move ferrous metals.

An eleventh aspect A11 is directed to a method of using a fluid management system comprising: continuously recirculating a binder fluid through a binder fluid path comprising at least one binder reservoir, a pump, and a binder purge bin, wherein: the pump delivers the binder fluid from the at least one binder reservoir through an ink supply system to a print head manifold; and the binder purge bin receives binder fluid discharged by a print head coupled to the print head manifold; delivering, using a pump, a cleaning fluid from at least one cleaning fluid reservoir to at least one cleaning station vessel; receiving, at a waste tank, a first portion of the cleaning fluid from the at least one cleaning station vessel; returning a second portion of the cleaning fluid from the at least one cleaning station vessel to the at least one cleaning fluid reservoir; and diverting a predetermined amount of the second portion of the cleaning fluid to the waste tank based on a level of contamination of the cleaning fluid with the binder fluid.

A twelfth aspect A12 includes the method of aspect A11, wherein diverting the predetermined amount of the second portion of the cleaning fluid comprises sending a signal to a valve positioned between the at least one cleaning station vessel, the at least one cleaning fluid reservoir, and the waste tank to divert the predetermined amount of the second portion of the cleaning fluid flowing from the at least one cleaning station vessel to the at least one cleaning fluid reservoir to the waste tank.

A thirteenth aspect A13 includes the method of any of the foregoing aspects A11-A12, wherein the binder purge bin comprises an overflow outlet for redirecting the binder fluid from the binder purge bin to the at least one binder reservoir.

A fourteenth aspect A14 includes the method of any of the foregoing aspects A11-A13, wherein continuously recirculating the binder fluid comprises pumping the binder fluid from the binder purge bin to the at least one binder reservoir.

A fifteenth aspect A15 includes the method of any of the foregoing aspects A11-A14, wherein the binder fluid path further comprises a filter positioned between the binder purge bin and the at least one binder reservoir.

A sixteenth aspect A16 includes the method of aspect A15, wherein the filter is positioned between the binder purge bin and the pump of the binder fluid path.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 4E is a cross-sectional side view of a blade-less wet wipe member in a wet wipe cleaning section of an additive manufacturing apparatus according to one or more embodiments shown and described herein;

FIG. 4F is a cross-sectional side view of a vacuum wipe member in a wet wipe cleaning section of an additive manufacturing apparatus according to one or more embodiments shown and described herein;

FIG. 5C is a cross-sectional front view of the wiper mounting member of the dry wipe member according to one or more embodiments shown and described herein;

FIG. 5D is a cross-sectional front view of the wiper mounting member including blades at different vertical positions of the dry wipe member according to one or more embodiments shown and described herein;

FIG. 8 is a process flow diagram of the fluid management system (binder pathway and the cleaning fluid pathway) according to one or more embodiments shown and described herein;

DETAILED DESCRIPTION

Figure 1:
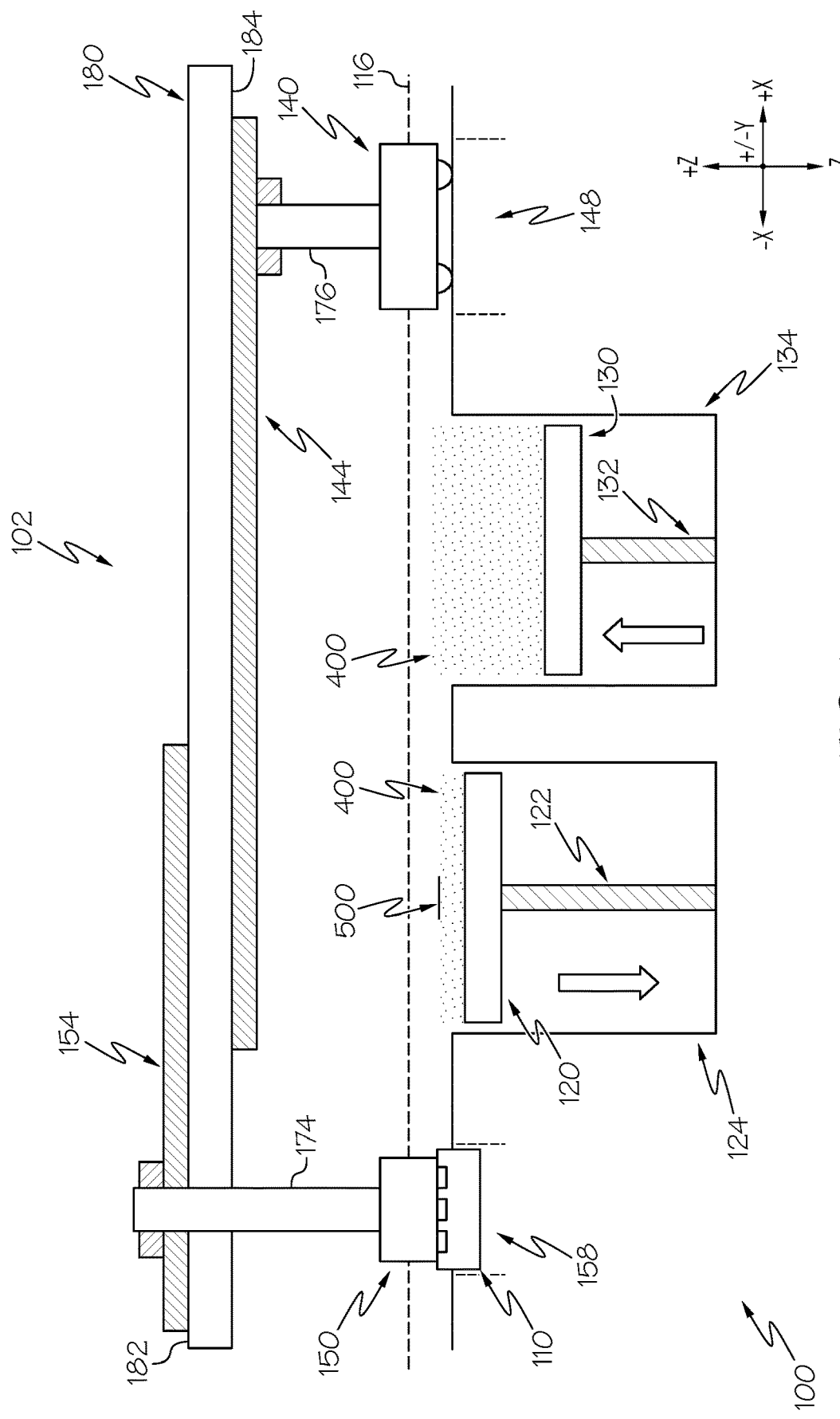
FIG. 1 schematically depicts an additive manufacturing apparatus according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. One embodiment of an additive manufacturing apparatus 100 comprising a cleaning station 110 is schematically depicted in FIG. 1. The cleaning station 110 may generally include a wet wipe cleaner section and a dry wipe cleaner section. The cleaning station is in fluid communication with a cleaning fluid reservoir and applies cleaning fluid to a print head to clean the print head. Various embodiments of cleaning stations for additive manufacturing apparatuses, additive manufacturing apparatus comprising the cleaning stations, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

During operation of an additive manufacturing apparatus, the efficacy and performance of the print head is essential. The print head is exposed to heat, and is also subject to excess build material distributed by a recoat head and/or binder material from the print head. The combination of these contaminants (i.e., excess build material and binder material) can lead to clogged nozzles in the print head, which can adversely impact operation of the additive manufacturing apparatus.

The embodiments described herein are directed to additive manufacturing apparatuses and components for additive manufacturing apparatuses, specifically cleaning systems in additive manufacturing apparatuses, which may be used to conduct automated routine maintenance of the additive manufacturing apparatuses to reduce or eliminate the presence of clogged nozzles in the print head and other contamination.

Additive Manufacturing Apparatus

Referring now to FIG. 1, an embodiment of an additive manufacturing apparatus 100 is schematically depicted. The additive manufacturing apparatus 100 includes a cleaning station 110, a build platform 120, and an actuator assembly 102. The additive manufacturing apparatus 100 may optionally include a supply platform 130. The actuator assembly 102 comprises, among other elements, a recoat head 140 for distributing build material 400 and a print head 150 for depositing binder material 500. The actuator assembly 102 may be constructed to facilitate independent control of the recoat head 140 and the print head 150 along the working axis 116 of the additive manufacturing apparatus 100. This allows for the recoat head 140 and the print head 150 to traverse the working axis 116 of the additive manufacturing apparatus 100 in the same direction and/or in opposite directions and for the recoat head 140 and the print head 150 to traverse the working axis of the additive manufacturing apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step. In the embodiments of the additive manufacturing apparatus 100 described herein, the working axis 116 of the additive manufacturing apparatus 100 is parallel to the +/−X axis of the coordinate axes depicted in the figures.

In the embodiment depicted in FIG. 1, the additive manufacturing apparatus 100 includes a cleaning station 110, a build platform 120, a supply platform 130, and an actuator assembly 102. However, it should be understood that, in other embodiments, the additive manufacturing apparatus 100 does not include a supply platform 130, such as in embodiments where build material is supplied to the build platform 120 with, for example and without limitation, a build material hopper. In the embodiment depicted in FIG. 1, the cleaning station 110, the build platform 120, and the supply platform 130 are positioned in series along the working axis 116 of the additive manufacturing apparatus 100 between a print home position 158 of the print head 150 located proximate an end of the working axis 116 in the −X direction, and a recoat home position 148 of the recoat head 140 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build platform 120, and the supply platform 130 are positioned therebetween. In the embodiments described herein, the build platform 120 is positioned between the cleaning station 110 and the supply platform 130 along the working axis 116 of the additive manufacturing apparatus 100.

The cleaning station 110 is positioned proximate one end of the working axis 116 of the additive manufacturing apparatus 100 and is co-located with the print home position 158 where the print head 150 is located or "parked" before and after depositing binder material 500 on a layer of build material 400 positioned on the build platform 120. The cleaning station 110 may include one or more cleaning sections (shown in greater detail below) to facilitate cleaning the print head 150 between depositing operations.

The build platform 120 is coupled to a lift system comprising a build platform actuator 122 to facilitate raising and lowering the build platform 120 relative to the working axis 116 of the additive manufacturing apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build receptacle 124 located below the working axis 116 (i.e., in the −Z direction of the coordinate axes depicted in the figures) of the additive manufacturing apparatus 100. During operation of the additive manufacturing apparatus 100, the build platform 120 is retracted into the build receptacle 124 by action of the build platform actuator 122 after each layer of binder material 500 is deposited on the build material 400 located on build platform 120.

The supply platform 130 is coupled to a lift system comprising a supply platform actuator 132 to facilitate raising and lowering the supply platform 130 relative to the working axis 116 of the additive manufacturing apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the additive manufacturing apparatus 100. During operation of the additive manufacturing apparatus 100, the supply platform 130 is raised relative to the supply receptacle 134 and towards the working axis 116 of the additive manufacturing apparatus 100 by action of the supply platform actuator 132 after a layer of build material 400 is distributed from the supply platform 130 to the build platform 120, as will be described in further detail herein.

Figure 2:
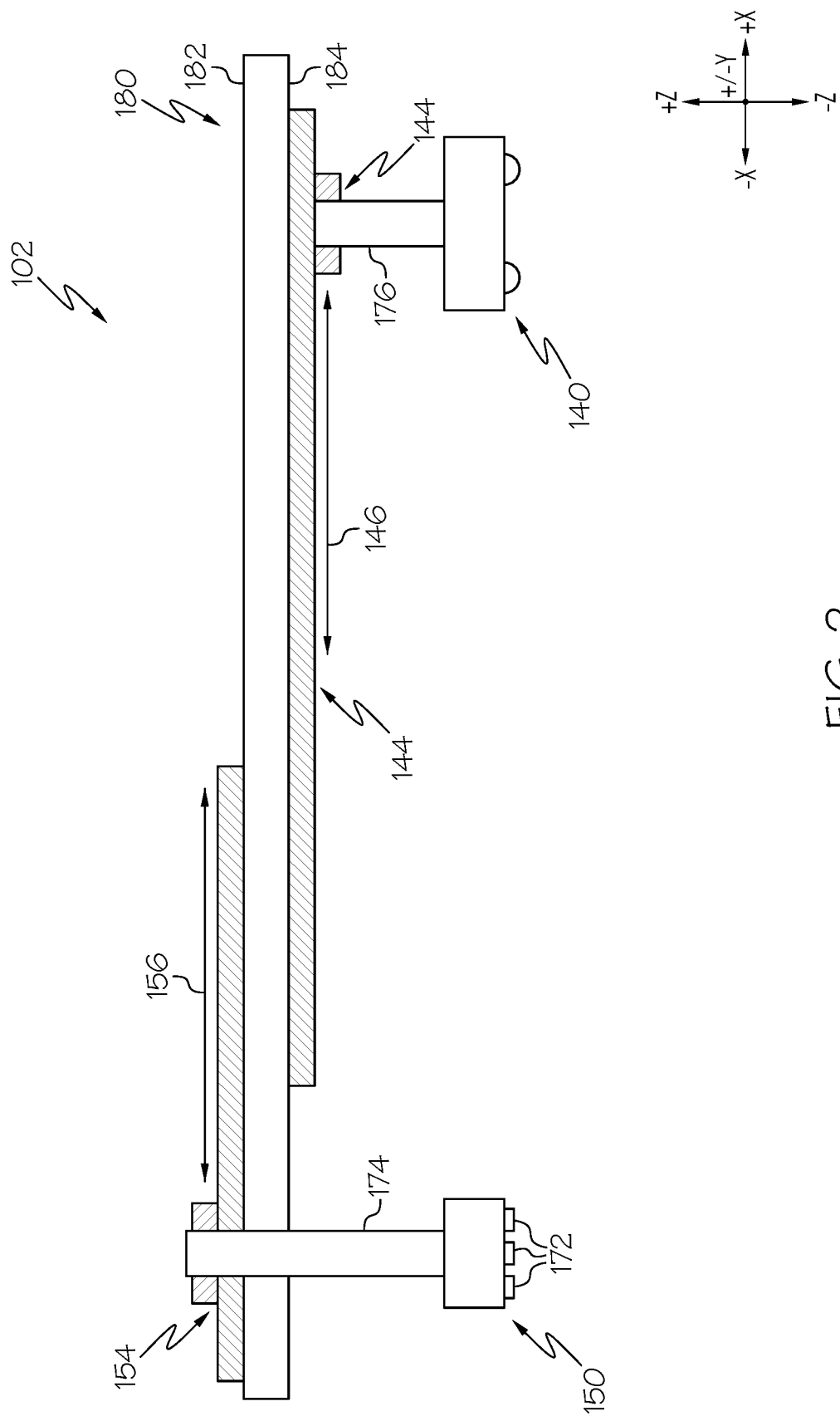
FIG. 2 schematically depicts an embodiment of an actuator assembly for an additive manufacturing apparatus according to one or more embodiments shown and described herein.

Referring now to FIGS. 1 and 2, FIG. 2 schematically depicts the actuator assembly 102 of the additive manufacturing apparatus 100 of FIG. 1. The actuator assembly 102 generally comprises the recoat head 140, the print head 150, a recoat head actuator 144, a print head actuator 154, an upper support 182, and a lower support 184. In the embodiments described herein, the upper support 182 and the lower support 184 extend in a horizontal direction (i.e., a direction parallel to the +/−X direction of the coordinate axes depicted in the figures) parallel to the working axis 116 (FIG. 1) of the additive manufacturing apparatus 100 and are spaced apart from one another in the vertical direction (i.e., a direction parallel to the +/−Z direction of the coordinate axes depicted in the figures). When the actuator assembly 102 is positioned over the cleaning station 110, the build platform 120, and the supply platform 130 as depicted in FIG. 1, the upper support 182 and the lower support 184 extend in a horizontal direction from at least the cleaning station 110 to beyond the supply platform 130.

In one embodiment, such as the embodiment of the actuator assembly 102 depicted in FIGS. 1 and 2, the upper support 182 and the lower support 184 are opposite sides of a rail 180 that extends in a horizontal direction and is oriented such that the upper support 182 is positioned above and spaced apart from the lower support 184. For example, in one embodiment, the rail 180 may be rectangular or square in vertical cross section (i.e., a cross section in the Y-Z plane of the coordinate axes depicted in the figures) with the top and bottom surfaces of the rectangle or square forming the upper support 182 and the lower support 184, respectively. In an alternative embodiment (not depicted), the rail 180 may have an "I" configuration in vertical cross section (i.e., a cross section in the Y-Z plane of the coordinate axes depicted in the figures) with the upper and lower flanges of the "I" forming the upper support 182 and the lower support 184, respectively. However, it should be understood that other embodiments are contemplated and possible. For example and without limitation, the upper support 182 and the lower support 184 may be separate structures, such as separate rails, extending in the horizontal direction and spaced apart from one another in the vertical direction as depicted in an alternative embodiment of the actuator assembly.

In the embodiments described herein, the recoat head actuator 144 is coupled to one of the upper support 182 and the lower support 184 and the print head actuator 154 is coupled to the other of the upper support 182 and the lower support 184 such that the recoat head actuator 144 and the print head actuator 154 are arranged in a "stacked" configuration. For example, in the embodiment of the actuator assembly 102 depicted in FIGS. 1 and 2, the recoat head actuator 144 is coupled to the lower support 184 and the print head actuator 154 is coupled to the upper support 182. However, it should be understood that, in other embodiments (not depicted) the recoat head actuator 144 may be coupled to the upper support 182 and the print head actuator 154 may be coupled to the lower support 184.

In the embodiments described herein, the recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. The recoat motion axis 146 and the print motion axis 156 extend in a horizontal direction and are parallel with the working axis 116 (FIG. 1) of the additive manufacturing apparatus 100. In the embodiments described herein, the recoat motion axis 146 and the print motion axis 156 are parallel with one another and spaced apart from one another in the vertical direction due to the stacked configuration of the recoat head actuator 144 and the print head actuator 154. In some embodiments, such as the embodiment of the actuator assembly 102 depicted in FIG. 2, the recoat motion axis 146 and the print motion axis 156 are located in separate vertical planes (i.e., a plane parallel to the X-Z plane of the coordinate axes depicted in the figures). However, it should be understood that other embodiments are contemplated and possible, such as embodiments in which the recoat motion axis 146 and the print motion axis 156 are located in the same vertical plane.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators manufactured by Aerotech® Inc. of Pittsburgh, Pennsylvania, such as the PRO225LM Mechanical Bearing, Linear Motor Stage.

As shown in FIGS. 1 and 2, the recoat head 140 is coupled to the recoat head actuator 144 such that the recoat head 140 is positioned below (i.e., in the −Z direction of the coordinate axes depicted in the figures) the upper support 182 and the lower support 184. When the actuator assembly 102 is assembled over the cleaning station 110, the build platform 120, and the supply platform 130 as depicted in FIG. 1, the recoat head 140 is situated on the working axis 116 (FIG. 1) of the additive manufacturing apparatus 100. Thus, bi-directional actuation of the recoat head actuator 144 along the recoat motion axis 146 affects bi-directional motion of the recoat head 140 on the working axis 116 of the additive manufacturing apparatus 100. In the embodiment of the actuator assembly 102 depicted in FIGS. 1 and 2, the recoat head 140 is coupled to the recoat head actuator 144 with support bracket 176 such that the recoat head 140 is positioned on the working axis 116 (FIG. 1) of the additive manufacturing apparatus 100 while the recoat head actuator 144 is positioned above the working axis 116. Positioning the recoat head actuator 144 above the working axis 116 of the additive manufacturing apparatus 100 reduces fouling of the recoat head actuator 144 with powder from either the build platform 120 or the supply platform 130. This increases the maintenance interval for the recoat head actuator, increases the service life of the recoat head actuator, reduces machine downtime, and reduces build errors due to fouling of the recoat head actuator 144. In addition, positioning the recoat head actuator 144 above the working axis 116 of the additive manufacturing apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

Similarly, the print head 150 is coupled to the print head actuator 154 such that the print head 150 is positioned below (i.e., in the −Z direction of the coordinate axes depicted in the figures) the upper support 182 and the lower support 184. When the actuator assembly 102 is assembled over the cleaning station 110, the build platform 120, and the supply platform 130 as depicted in FIG. 2, the print head 150 is situated on the working axis 116 (FIG. 2) of the additive manufacturing apparatus 100. Thus, bi-directional actuation of the print head actuator 154 along the print motion axis 156 affects bi-directional motion of the print head 150 on the working axis 116 of the additive manufacturing apparatus 100. In the embodiment of the actuator assembly 102 depicted in FIG. 2, the print head 150 is coupled to the print head actuator 154 with support bracket 174 such that the print head 150 is positioned on the working axis 116 (FIG. 2) of the additive manufacturing apparatus 100 and the print head actuator 154 is positioned above the working axis 116. Positioning the print head actuator 154 above the working axis 116 of the additive manufacturing apparatus 100 reduces fouling of the print head actuator 154 with powder from either the build platform 120 or the supply platform 130. This increases the maintenance interval for the print head actuator 154, increases the service life of the print head actuator 154, reduces machine downtime, and reduces build errors due to fouling of the print head actuator 154. In addition, positioning the print head actuator 154 above the working axis 116 of the additive manufacturing apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the print motion axis 156 and the working axis 116 (i.e., fixed along the +/−Z axis and/or fixed along the +/−Y axis). That is, in embodiments, the entire print head is fixed in directions orthogonal to the print motion axis 156, however, sub-components of the print head, such individual arrays of nozzles or the like, may be translatable in directions that are non-parallel to the print motion axis 156, such as directions that are orthogonal to the print motion axis.

As noted above, in the embodiments described herein the recoat head 140 and the print head 150 are both located on the working axis 116 of the additive manufacturing apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the additive manufacturing apparatus 100 at different times during a single build cycle. However, the recoat motion axis 146 of the recoat head actuator 144 and the print motion axis 156 of the print head actuator 154 are spaced apart from one another in a vertical direction due to the stacked configuration of the actuators 144, 154. The spacing of the recoat motion axis 146 and the print motion axis 156 permits the recoat head 140 and the print head 150 to be moved along the working axis 116 of the additive manufacturing apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

While FIGS. 1 and 2 schematically depict an embodiment of an actuator assembly 102 which comprises an upper support 182 and a lower support 184 with the recoat head actuator 144 and the print head actuator 154 mounted thereto, respectively, it should be understood that other embodiments are contemplated and possible, such as embodiments which comprise more than two supports and more than two actuators. Moreover, it is contemplated that embodiments may include a single support having the recoat head actuator 144 and the print head actuator 154 mounted thereto.

Cleaning Station

Figure 3A:
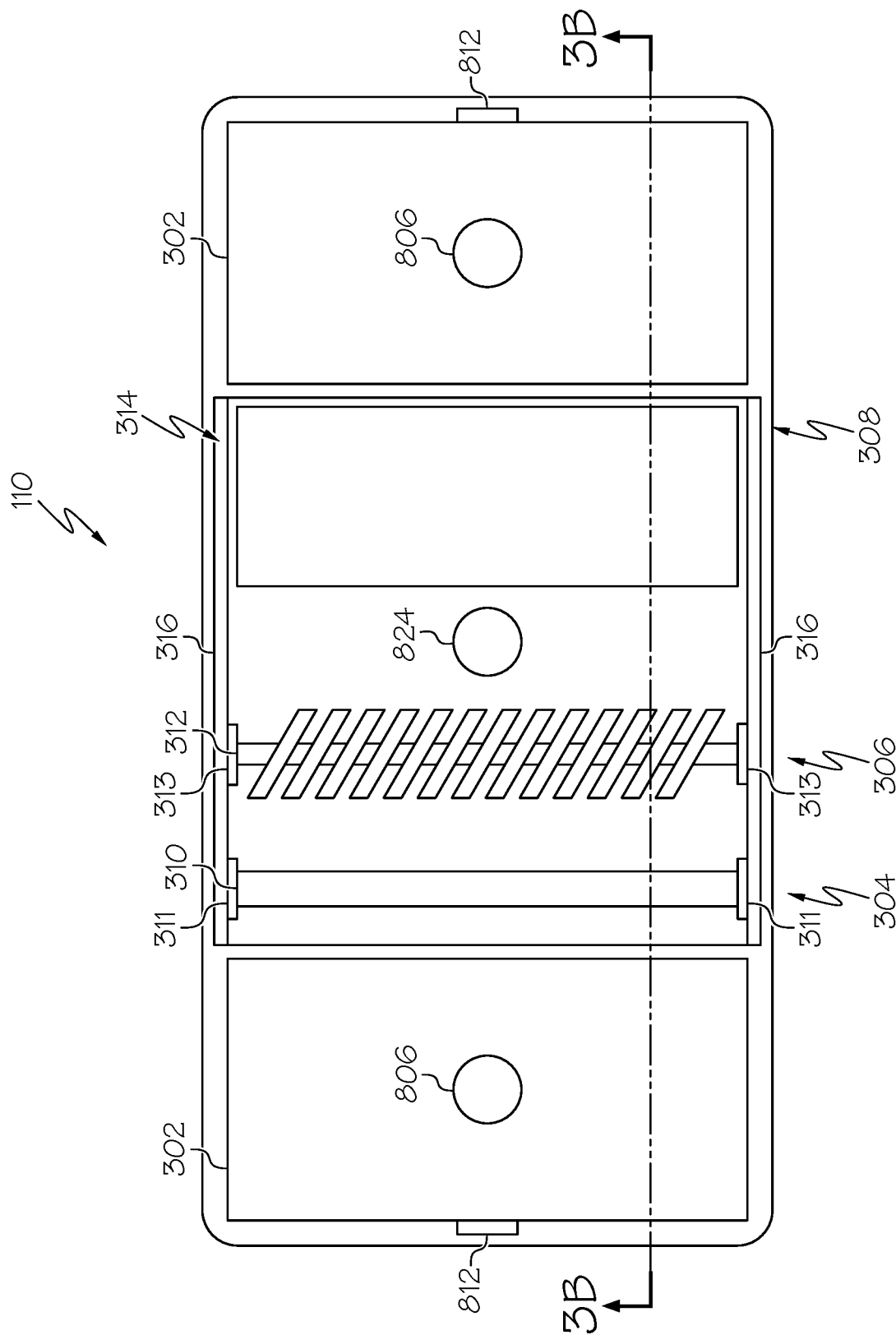
FIG. 3A is a schematic top view of a cleaning station of an additive manufacturing apparatus according to one or more embodiments shown and described herein.
Figure 3B:
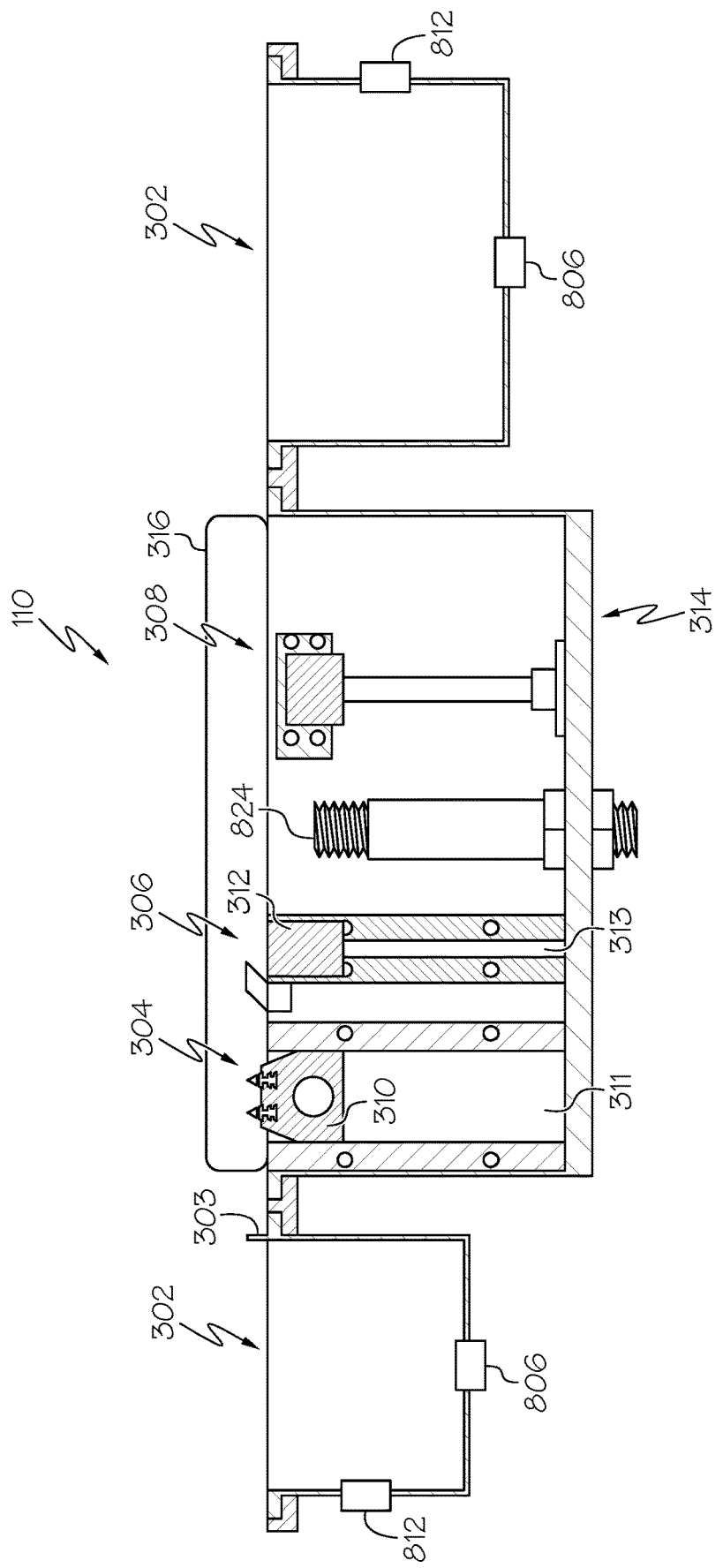
FIG. 3B is a side cross-sectional view of a cleaning station of an additive manufacturing apparatus according to one or more embodiments shown and described herein.

Turning now to FIGS. 3A and 3B, an embodiment of the cleaning station 110 is shown in greater detail. Although described in various embodiments as being associated with the additive manufacturing apparatus 100 of FIGS. 1 and 2, it is contemplated that the cleaning station 110 and fluid management system coupled thereto may be used with other types of additive manufacturing apparatuses known and used in the art.

The cleaning station 110 may comprise a cleaning station vessel 314 positioned proximate at least one binder purge bin 302. As shown in FIGS. 3A and 3B, the cleaning station 110 is positioned between two binder purge bins 302, each of which is configured to receive material, such as contaminants and binder material, discharged by the print head. Although shown in FIGS. 3A and 3B as including two binder purge bins 302, it is contemplated that in embodiments, only one binder purge bin, or more than two binder purge bins, may be included. In embodiments, the binder purge bin 302 optionally includes a purge wiper 303 (FIG. 3B) positioned between the binder purge bin 302 and the wet wipe cleaner section 304. When included, the purge wiper 303 can contact the print head after contaminants and binder material are discharged into the binder purge bin 302 to remove loose contaminants and binder material from the face of the print head before the print head is introduced to the wet wipe cleaner section 304. In embodiments, the purge wiper 303 redirects the loose contaminants and binder material into the binder purge bin 302 for disposal, thereby reducing the amount of contaminants and binder material introduced into the cleaning station 110 during the cleaning process.

Further as shown, the cleaning station vessel 314 is a container which includes a wet wipe cleaner section 304, a dry wipe cleaner section 306, and a capping section 308. In various embodiments, the wet wipe cleaner section 304, the dry wipe cleaner section 306, and the capping section 308 are sections of a cleaning station vessel 314 containing a volume of cleaning fluid. The wet wipe cleaner section 304 applies cleaning fluid to the print head, specifically, a faceplate of the print head. The dry wipe cleaner section 306, which in some embodiments is downstream of the wet wipe cleaner section 304, removes excess liquid (e.g., cleaning fluid and contaminants) from the print head in advance of binder jetting. The capping section 308, which may be also considered an idle section, is a location where the print head may be temporarily placed in advance of binder jetting. In embodiments, the capping section 308 supplies cleaning fluid to the print head faceplate to prevent binder from drying on the print head. Without being limited to theory, maintaining the wet wipe cleaner section 304, the dry wipe cleaner section 306, and the capping section 308 within a single cleaning station vessel 314 is highly advantageous as it streamlines cleaning fluid management by eliminating the need to control three separate cleaning station vessels. In this embodiment, cleaning fluid maintenance is limited to a single cleaning station vessel 314.

In embodiments, the cleaning station vessel 314 includes at least one moveable wall 316 extending vertically upward (e.g., +/−Z) from the cleaning station vessel 314 and in a direction parallel to a direction of movement of the print head 150 through the cleaning station 110 (e.g., +/−X). When included, the moveable wall 316 redirects cleaning fluid into the cleaning station vessel 314. For example, cleaning fluid that is splashed, such as from the movement of the wet wipe member 310 and/or the dry wipe member 312 into and out of the cleaning station vessel 314, may be redirected back into the cleaning station vessel 314 rather than being lost into the environment (e.g., onto the floor). In embodiments, the moveable wall 316 may be coupled to one or more actuators to enable movement of the wall. For example, the moveable wall 316 may be moved in the +Z direction when the print head 150 enters the cleaning station 110, and in the −Z direction when the print head 150 leaves the cleaning station 110. Additionally or alternatively, the moveable wall 316 may be moved along the +/−X direction through the cleaning station 110 along a path parallel to the path of the print head 150.

In embodiments, the moveable wall 316 is coupled to the wall of the cleaning station vessel 314 through a guide slot (not shown), and is moveable within the guide slot. Accordingly, in the event that the print head 150 or another item contacts the moveable wall 316, the moveable wall 316 will yield (e.g., move) rather than causing damage to the print head 150 or other part of the additive manufacturing apparatus 100. It is contemplated that the moveable wall 316 could be coupled to the wall of the cleaning station vessel 314 in other ways, including through the use of magnetic mounts, bolts, or slotted holes, for example.

Figure 3C:
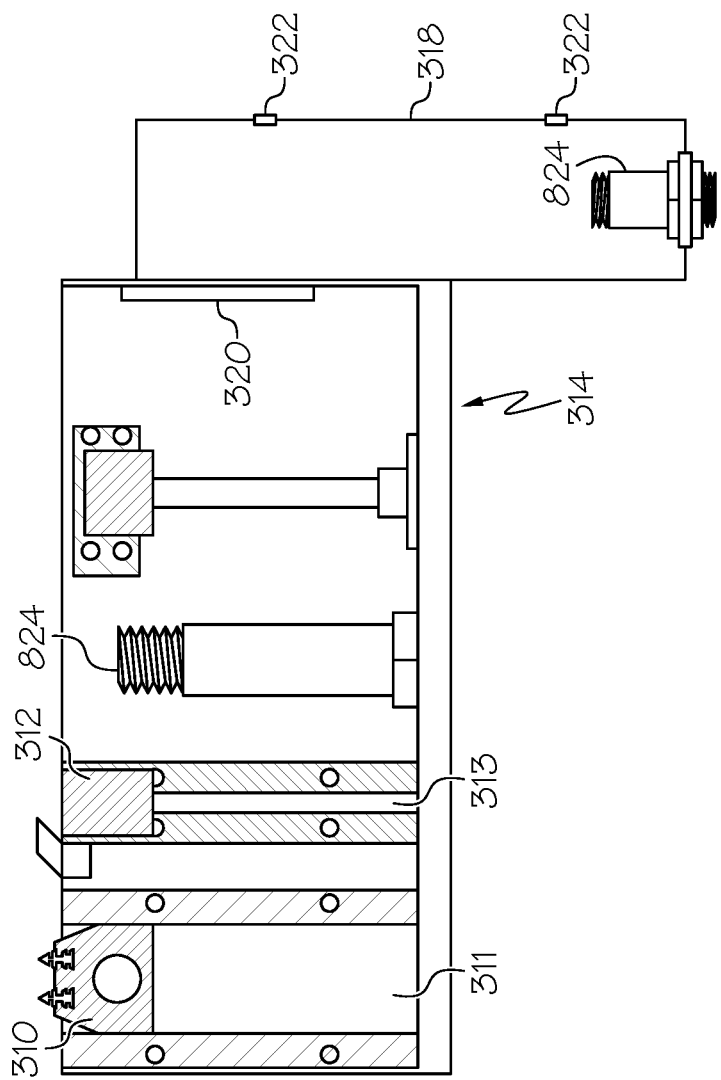
FIG. 3C is a side cross-sectional view of a cleaning station vessel of an additive manufacturing apparatus according to one or more embodiments shown and described herein.

In embodiments, the cleaning station vessel 314 is in fluid communication with an overflow vessel 318, as shown in FIG. 3C, such as through a fluid level wall 320. Accordingly, the cleaning fluid may be continuously pumped into the cleaning station vessel 314, as will be described in greater detail below. When the cleaning fluid in the cleaning station vessel 314 reaches the top of the fluid level wall 320, the cleaning fluid flows over the fluid level wall 320 and into the overflow vessel 318. In embodiments, the overflow vessel 318 includes at least two fluid level sensors 322, each positioned at a different vertical position within the overflow vessel 318. Accordingly, cleaning fluid is pumped into the cleaning station vessel 314, flows over the fluid level wall 320 and into the overflow vessel 318 until both of the fluid level sensors 322 detect cleaning fluid, indicating that the fluid level of the cleaning fluid within the overflow vessel 318 is at or above the vertical position of the fluid level sensor 322 that is closer to the top of the overflow vessel 318. In response to both of the fluid level sensors 322 detecting the fluid, cleaning fluid is pumped out of the overflow vessel 318, such as through a drain 824 in the overflow vessel 318, until neither of the fluid level sensors 322 detects the fluid, indicating that the fluid level of the cleaning fluid within the overflow vessel 318 is below the vertical position of the fluid level sensor 322 that is closer to the bottom of the overflow vessel 318. In embodiments, the fluid level wall 320 can be adjusted to control the vertical height of the top of the fluid level wall 320 and, accordingly, the fluid level within the cleaning station vessel 314.

Referring again to FIGS. 1, 2, 3A, and 3B, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In one or more embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head.

In general, after the print head 150 has deposited the binder material 500 on the layer of build material 400 positioned on the build platform 120 (FIG. 1), it is moved to the binder purge bin 302, where contaminants are dislodged via backpressure and, in embodiments, using binder material 500 ejected from the nozzles 172. In embodiments including a purge wiper 303 (FIG. 3B), the print head 150 is wiped by the purge wiper 303 as it is moved from the binder purge bin 302 toward the wet wipe cleaner section 304 to direct loose contaminants and binder material from the face of the print head 150 into the binder purge bin 302. Next, the print head 150 is moved to the wet wipe cleaner section 304 where a cleaning fluid is applied to the print head 150 and contaminants are mechanically removed from the print head 150. The print head 150 is then moved to the dry wipe cleaner section 306 where the cleaning fluid and remaining contaminants are removed, before the print head 150 is moved to the second binder purge bin 302. At the second binder purge bin 302, any remaining contaminants are dislodged and the binder meniscus is reestablished by ejecting binder material 500 from the nozzles 172. In embodiments in which the print head 150 is idle, instead of moving to the second binder purge bin 302, the print head 150 may be moved to the capping section 308 where it is kept moist to prevent the binder material from drying out and clogging the nozzles 172 of the print head 150. Each of the sections of the cleaning station 110 will now be described in greater detail.

Cleaning Station—Wet Wipe Cleaner Section

Various suitable embodiments are contemplated for the wet wipe cleaner section 304. As shown in FIGS. 3A and 3B, the wet wipe cleaner section 304 comprises a wet wipe member 310. The wet wipe member 310 comprises any suitable mechanism for passively applying cleaning fluid to a print head, for example, a brush, a squeegee, and the like. As used herein, "passively applying" means the wet wipe member 310 contacts the print head as it traverses the wet wipe cleaner section 304. The wet wipe member 310 is connected to one or more actuators 311 that raise or lower the wet wipe member within the wet wipe cleaner section 304 of the cleaning station vessel 314. The actuators may comprise linear actuators, rotary actuators, or electric actuators. While various actuators and actuator locations are considered suitable, the actuators 311 depicted in FIGS. 3A and 3B are disposed primarily outside the cleaning station vessel 314. Without being bound by theory, minimizing actuator 311 contact with the cleaning fluid, especially contact with any electronic components of the actuators 311, may be beneficial in maintaining actuator performance. Thus, some embodiments will include the actuators 311 primarily positioned outside the cleaning station vessel 314.

Referring now to FIGS. 4A-4E, additional embodiments of the wet wipe cleaner section 304 are schematically depicted. Specifically as shown in FIGS. 4A-4E, a wet wipe member 310 for applying cleaning fluid to the print head 150 is depicted. The wet wipe member 310 includes a wet wiper body 401 having a top side 402 and a bottom side 404. The wet wipe member 310 includes at least one wiper blade 406 vertically extending from the top side 402 of the wet wiper body 401. In the embodiment shown in FIGS. 4A and 4B, the wet wipe member 310 includes a first wiper blade 406a and a second wiper blade 406b (collectively, the wiper blades 406), spaced apart from one another. In the embodiment shown in FIG. 4C, the wet wipe member 310 includes a single wiper blade 406. Accordingly, any number wiper blades may be included in the wet wipe member 310.

Although the wet wipe member 310 is described in various embodiments as including at least one wiper blade 406, in embodiments, the wet wipe member 310 does not include wiper blades, as shown in FIG. 4E.

Figure 4A:
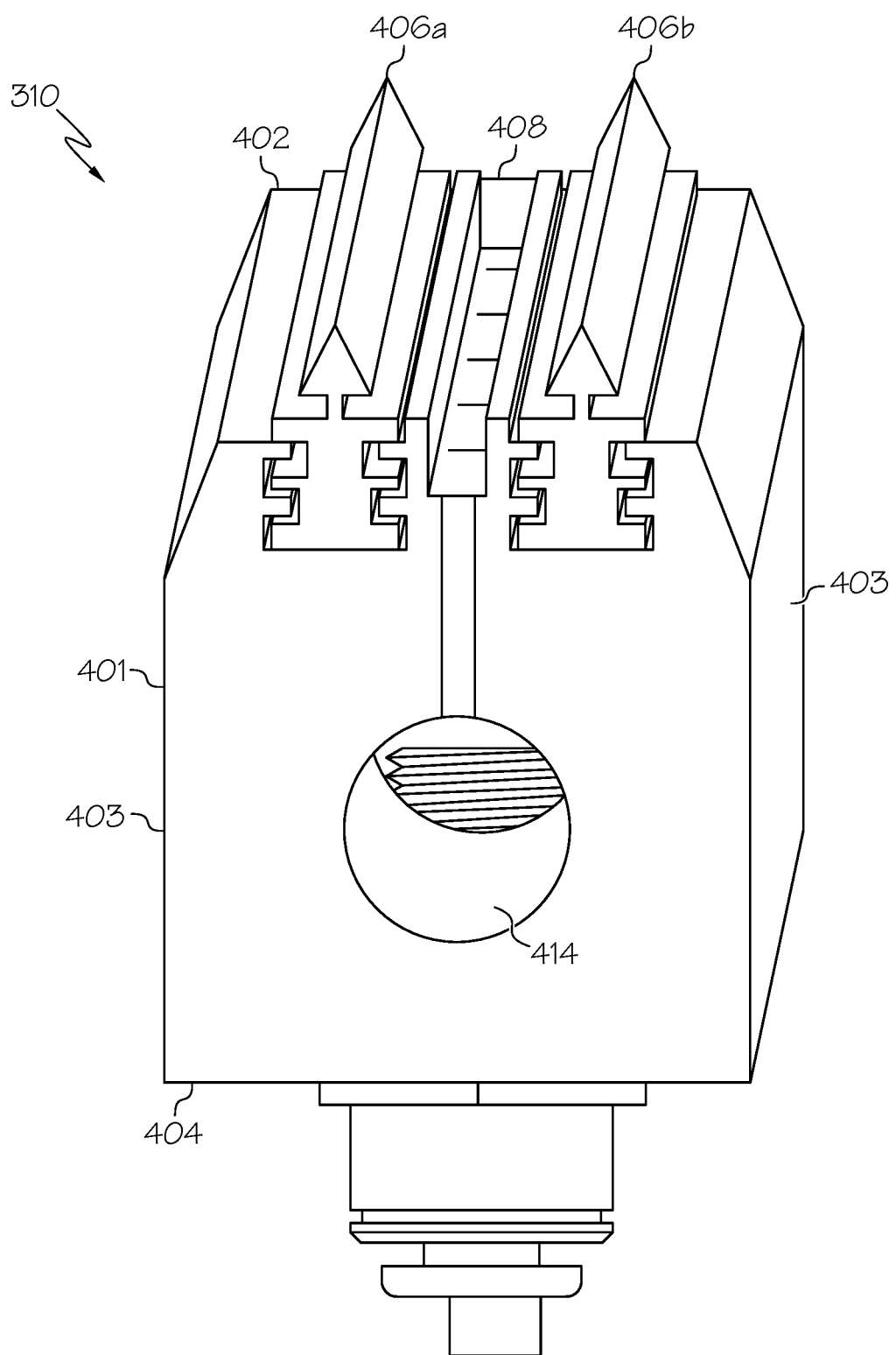
FIG. 4A is a schematic perspective view of a wet wipe member including two blades in a wet wipe cleaning section of an additive manufacturing apparatus according to one or more embodiments shown and described herein.
Figure 4B:
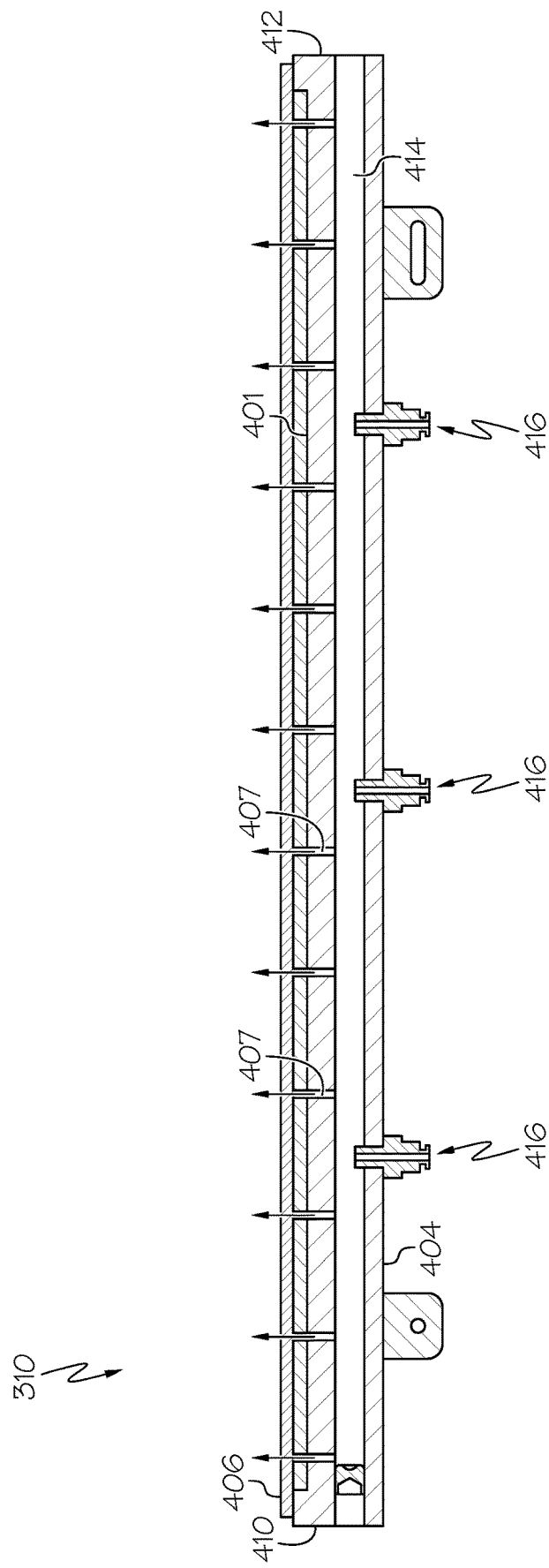
FIG. 4B is a cross-sectional front view of a wet wipe member in a wet wipe cleaning section of an additive manufacturing apparatus according to one or more embodiments shown and described herein.
Figure 4C:
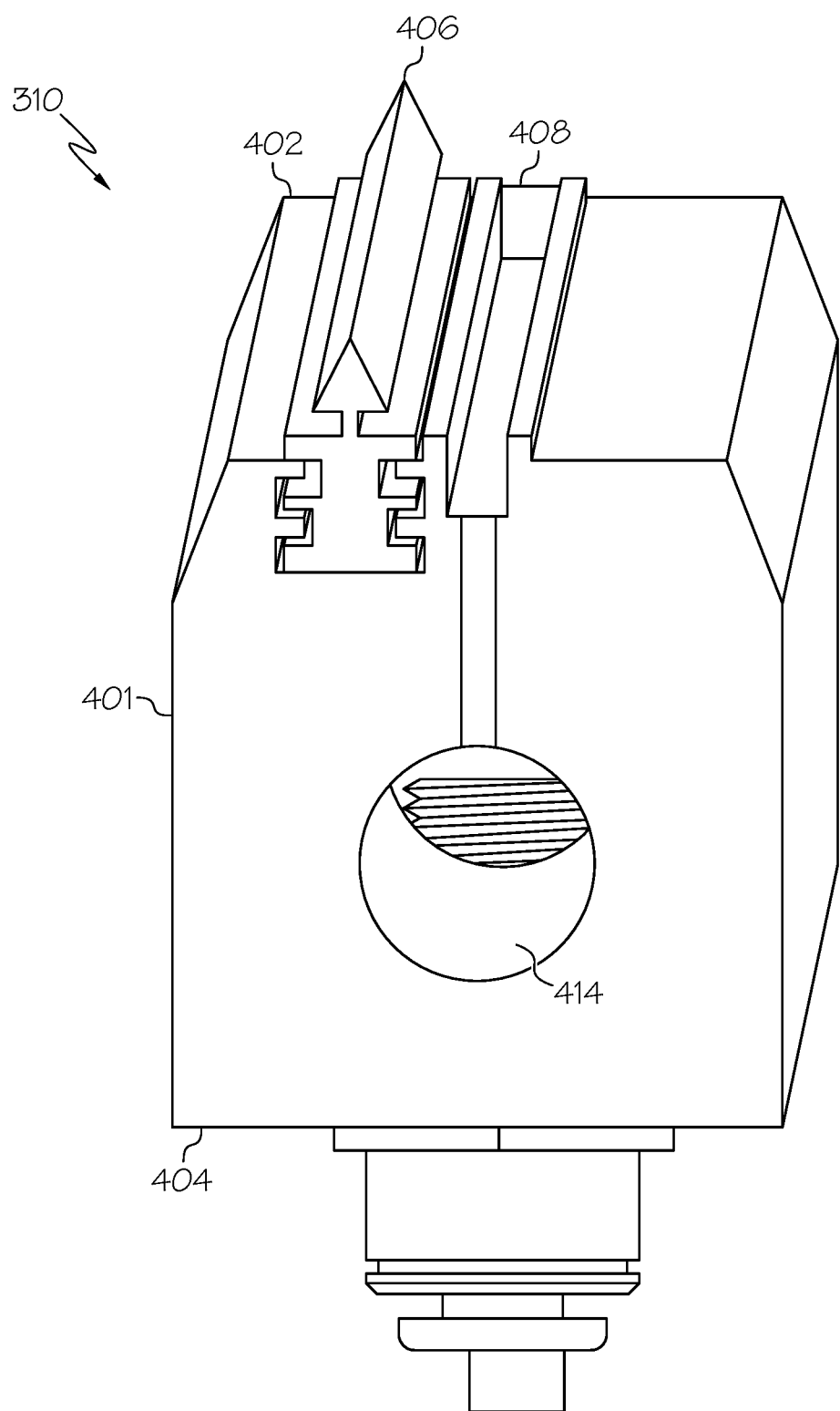
FIG. 4C is a schematic perspective view of a wet wipe member including a single blade in a wet wipe cleaning section of an additive manufacturing apparatus according to one or more embodiments shown and described herein.
Figure 4D:
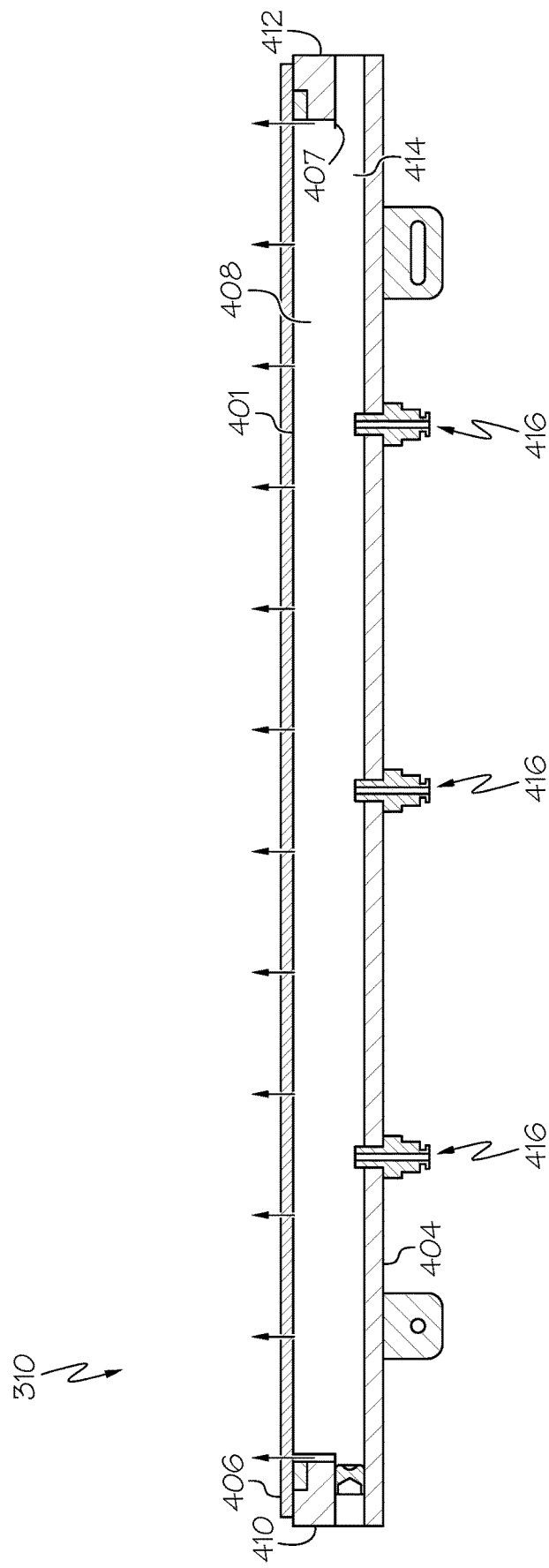
FIG. 4D is a cross-sectional front view of a wet wipe member in a wet wipe cleaning section of an additive manufacturing apparatus according to one or more embodiments shown and described herein.

A fluid channel 408 extends horizontally from a first end 410 of the wet wiper body 401 to a second end 412 of the wet wiper body 401, as shown in FIGS. 4A-4C, and defines a recessed path within the wet wiper body 401. The fluid channel 408 has an open top to allow cleaning fluid to flow out of the fluid channel 408. The rate of the flow of the cleaning fluid through the fluid channel 408 is controlled in embodiments, thereby enabling control of the height of a fluid wall 418 created by the cleaning fluid, shown in FIG. 4E. In embodiments, such as the embodiment shown in FIGS. 4A and 4B, the fluid channel 408 is positioned between the first wiper blade 406a and the second wiper blade 406b. Although the wiper blades 406 and the fluid channel 408 are described herein as extending from a first end 410 to the second end 412 of the wet wiper body 401, in embodiments, the wet wiper body 401 has a length from the first end 410 to the second end 412 that is greater than a length of the wiper blades 406 and/or the fluid channel 408. For example, in embodiments, the wiper blades 406 and/or the fluid channel 408 may be positioned within the wet wiper body 401 with the wet wiper body 401 extending about 1 mm, about 2 mm, about 5 mm, or about 10 mm on each end. This additional length of the wet wiper body 401 can enable, for example, the wet wiper body 401 to extend from end to end of the cleaning station while the wiper blades 406 and/or the fluid channel 408 are sized to have substantially the same length as the print head.

As shown in FIG. 4E, in embodiments in which the wet wipe member 310 does not include wiper blades 406, the flow of the cleaning fluid through the fluid channel 408 is controlled to provide a touchless wiping system that uses the fluid wall 418 to wipe contaminants from the print head without requiring the use of wiper blades. Moreover, in embodiments, a vacuum wipe member 420 (FIG. 4F) may be included. The vacuum wipe member 420 may be similar in structure to the wet wipe member 310, including a channel 422 and optionally one or more wiper blades 406. However, the channel 422 in the vacuum wipe member 420 enables process gasses (e.g., air, argon, nitrogen, or the like) to be drawn through the channel, thereby generating a vacuum effective to pull liquids and contaminants off of the print head as it passes over the vacuum wipe member 420. When included, the vacuum wipe member 420 is coupled to a pump (not shown) for generating the vacuum as well as at least one filter (not shown) to prevent contaminants from being pulled into the pump. In embodiments, the vacuum wipe member 420 can be included with a wet wipe member 310, such as the wet wipe member 310 shown in any of FIGS. 4A-E, or can be independently included in the cleaning station 110.

Figure 4G:
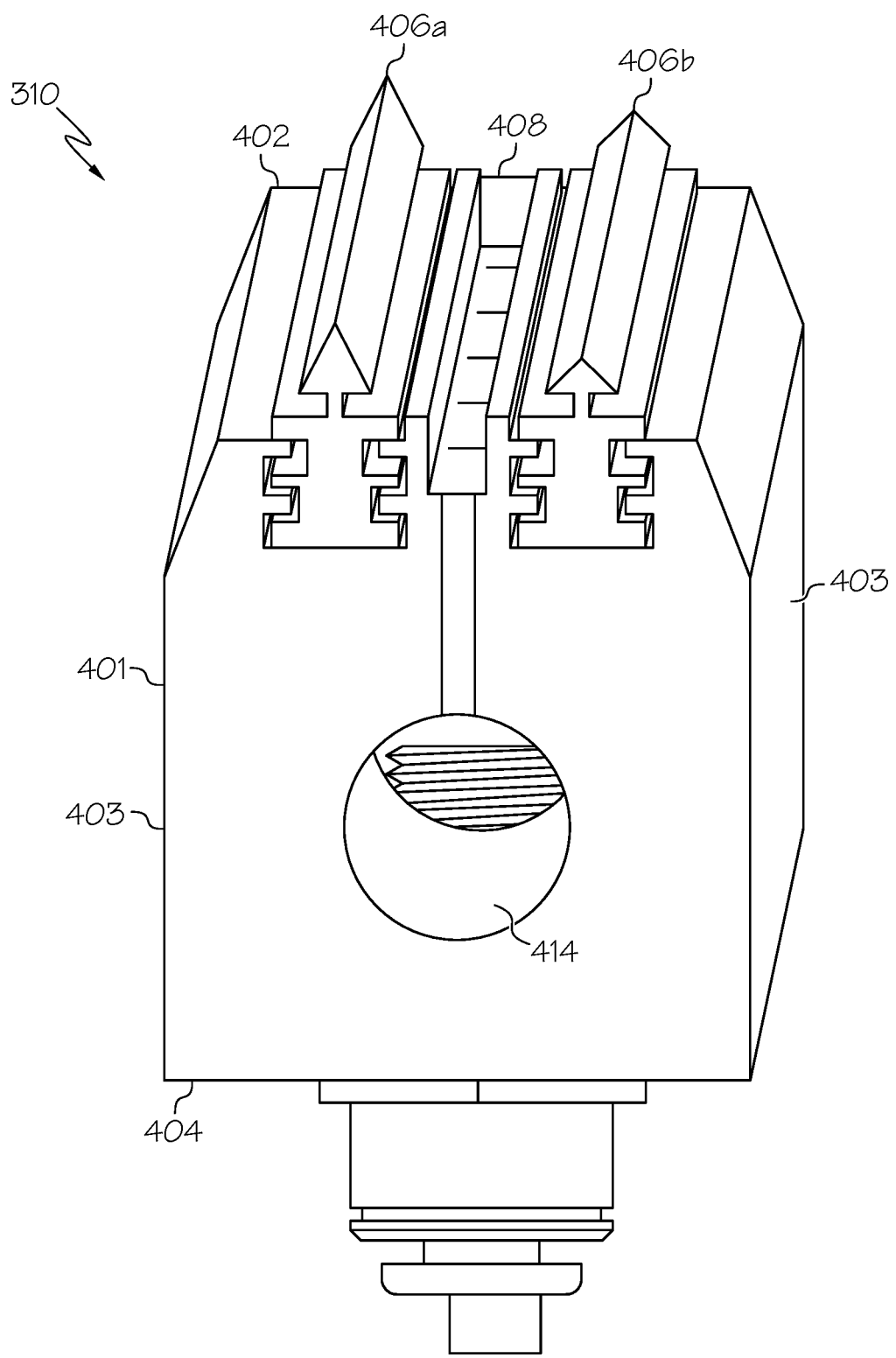
FIG. 4G is a cross-sectional side view of a wet wipe member including two blades having different vertical positions in a wet wipe cleaning section of an additive manufacturing apparatus according to one or more embodiments shown and described herein.

In embodiments, each of the wiper blades 406a has the same vertical (e.g., +/−Z) position as the other blades 406b, as shown in FIG. 4A. Accordingly, all of the wiper blades 406a, 406b has the same engagement distance with the print head 150 during wiping operations. As is known in the art, the "engagement distance" refers to the amount by which the vertical position of the print head 150 and the vertical position of an undeflected wiper blade 406 overlap. However, in embodiments, one or more wiper blades 406a are positioned at a first vertical position while one or more wiper blades 406b are positioned at a second vertical position, as shown in FIG. 4G. In such embodiments, a least one wiper blade 406a has a different engagement distance than the wiper blades 406b. For example, the wiper blades 406 may be positioned such that the engagement distance with the print head 150 increases along the path of the print head 150 during the wet wiping process.

As shown in FIGS. 4A-4C, the wet wipe member 310 further includes a cleaning manifold 414 that extends below the fluid channel 408 within the wet wiper body 401. The cleaning manifold 414 is in fluid communication with the fluid channel 408 through at least one fluid port 407 to provide cleaning fluid from the cleaning manifold 414 to the top side 402 of the wet wiper body 401, e.g., via the fluid channel 408. In the embodiment shown in FIG. 4B, twelve fluid ports 407 provide cleaning fluid from the cleaning manifold 414 to the fluid channel 408. Each fluid port 407 may have a circular cross-section, a square cross-section, or other cross-section suitable for fluid flow. However, in the embodiment shown in FIG. 4D, one fluid port 407 provides cleaning fluid from the cleaning manifold 414 to the fluid channel 408. The fluid port 407 in FIG. 4D extends from the first end 410 to the second end 412 of the wet wiper body 401 and has a substantially rectangular cross-section. Other shapes, sizes, and quantities of fluid ports are possible and contemplated. In embodiments, such as the embodiment shown in FIG. 4B where the fluid channel 408 is positioned between first and second wiper blades 406, the fluid port 407 is also disposed between the first and second wiper blades 406.

In various embodiments, the cleaning fluid is provided to the cleaning manifold 414 through a plurality of cleaning fluid inlets 416 that are fluidly coupled to a cleaning fluid reservoir or cleaning fluid management system, described in greater detail below. The plurality of cleaning fluid inlets 416 may be, for example, fluid conduits that extend vertically upward through the bottom side 404 of the wet wiper body 401. However, in embodiments, the plurality of cleaning fluid inlets 416 additionally or alternatively extend from a side 403 of the wet wiper body 401 adjacent to the top side 402 and the bottom side 404 of the wet wiper body 401. The plurality of cleaning fluid inlets 416 are operable to receive the cleaning fluid and provide the cleaning fluid to the cleaning manifold 414. The cleaning fluid inlets 416 are in fluid communication with the fluid port 407 through the cleaning manifold 414 such that cleaning fluid enters the cleaning manifold 414 through the cleaning fluid inlets 416 and exits the cleaning manifold 414 through the fluid port 407.

As stated above, the wet wipe member 310 is coupled to one or more actuators 311 which are operable to raise or lower the wet wipe member 310 into and out of the volume of the cleaning fluid. For example, the wet wipe member 310 may be actuated just prior to the print head 150 moving to the wet wipe cleaner section 304 such that the wet wipe member 310 is raised out of the volume of the cleaning fluid and contacts the print head 150 as it is moved through the wet wipe cleaner section 304. In various embodiments, the wet wipe member 310 is actuated as close to the time that it will make contact with the print head 150 as possible, so as to ensure that the wiper blades 406 are wet with cleaning fluid, although it is contemplated that some period of time may pass between the wet wipe member 310 being raised out of the volume of the cleaning fluid and making contact with the print head 150.

As another example, the wet wipe member 310 may be actuated after the print head 150 has moved to the dry wipe cleaner section 306 such that the wet wipe member is lowered into the volume of the cleaning fluid. The lowering of the wet wipe member into the cleaning fluid may wash away contaminants on the surface of the wiper blades 406 and clean the wet wipe member 310, thereby reducing the likelihood that the wet wipe member 310 will introduce contaminants to the print head 150. Additional details on the actuation of wet wipe member 310 embodiments are described below.

In various embodiments, the cleaning manifold 414 fills with the cleaning fluid and feeds the fluid channel 408, which fills from the bottom of the fluid channel 408. In embodiments in which the fluid channel 408 is positioned between the wiper blades 406, the cleaning fluid forms a pool of cleaning fluid between the wiper blades 406. In one or more embodiments, the cleaning fluid flows over the sides of the fluid channel 408 and into overflow drains, which return the cleaning fluid to the cleaning manifold 414. In further embodiments, the cleaning fluid is fed through the wet wipe member 310 continuously during operation of the additive manufacturing apparatus. After the wet wipe member applies liquid to the print head, the liquid then overflows back into the cleaning station vessel 314. As described more below, within the cleaning station vessel 314, there is a drain 824 (see FIG. 3B), which directs cleaning fluid into a cleaning fluid reservoir 816 (see FIG. 8), and is then pumped back into the wet wipe member 310. The continuous cleaner circulation and recirculation is described more below.

Accordingly, when the wet wipe member 310 is actuated, cleaning fluid is supplied to the print head 150 to dissolve contaminants while the wiper blades 406 mechanically remove contaminants. While the cleaning fluid may dissolve the contaminants in some cases, the contaminants may also be considered as mixed or suspended within the cleaning fluid. The cleaning manifold 414 and the fluid channel 408 ensure that cleaning fluid can be directly applied to the print head 150 during cleaning while compensating for any delay that may result from the use of pumps in the fluid management system, as will be discussed in greater detail below. In particular, the cleaning manifold 414 and the fluid channel 408 provide a local reservoir of cleaning fluid that can be used even when the pumps are not actively providing cleaning fluid to the wet wipe member 310.

In the embodiment depicted in FIG. 4A, the cleaning fluid does not flow to the top of the wiper blades 406. However, it is contemplated that in other embodiments, a pair of walls extends between the first wiper blade 406a and the second wiper blade 406b from the top side 402 of the wet wiper body 401 to a top of each of the first wiper blade 406a and the second wiper blade 406b. The pair of walls thus extends the depth of the fluid channel 408 to the top of the wiper blades 406, enabling the cleaning fluid to fill up to the top of the wiper blades 406. Such embodiments may enable greater dissolution of contaminants on the print head 150, and may facilitate the wiping by further wetting both the wiper blades 406 and the print head 150.

Cleaning Station—Dry Wipe Cleaner Section

Similar to the wet wipe cleaner section 304, various suitable embodiments are contemplated for the dry wipe cleaner section 306. Referring to the embodiments depicted in FIGS. 3A-3B, the dry wipe cleaner section 306 comprises a dry wipe member 312. The dry wipe member 312 comprises any suitable mechanism (e.g., brush, a squeegee, and the like) for removing cleaning fluid and contaminants. For example, the dry wipe member 312 may remove cleaning fluid and contaminants from the print head 150. Like the wet wipe member 310, the dry wipe member 312 is coupled to one or more actuators 313 that raise or lower the dry wipe member 312 within the dry wipe cleaner section 306 of the cleaning station vessel 314. While various actuators and actuator locations are considered suitable, the actuators 313 depicted in FIGS. 3A-3B are disposed primarily outside the cleaning station vessel 314. Without being bound by theory, minimizing actuator 313 contact with the cleaning fluid, especially contact with any electronic components of the actuators 313, may be beneficial in maintaining actuator performance. Thus, some embodiments will include the actuators 313 primarily positioned outside the cleaning station vessel 314. The actuators 313 can be linear actuators, rotary actuators, pneumatic actuators, or electric actuators. Additional details on the actuators 313 is provided hereinbelow.

Figures 5A, 5B:
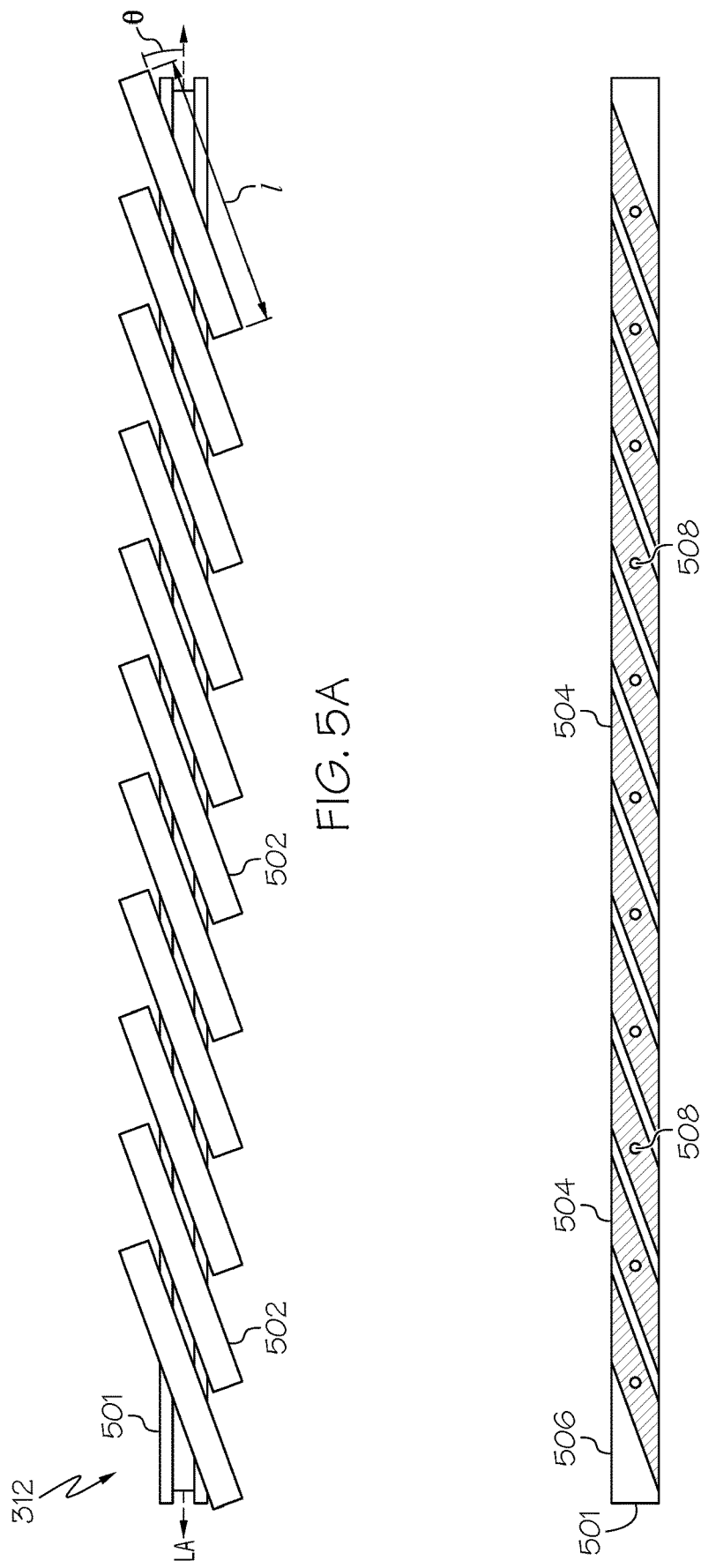
FIG. 5A is a top view of an angled dry wipe member in a dry wipe cleaning section of an additive manufacturing apparatus according to one or more embodiments shown and described herein.
FIG. 5B is a partial top view of FIG. 5A without the angled wipers included for illustration according to one or more embodiments shown and described herein.

An embodiment of the dry wipe member 312 is depicted in FIG. 5A. The dry wipe member 312 may define a wiper array, which includes a wiper mounting member 501 and a plurality of dry wiper blades 502 mounted to the wiper mounting member 501. Each of the plurality of dry wiper blades 502 may include a body member 514 and a blade 516 extending from the body member 514. The wiper mounting member 501 extends along a longitudinal axis LA, and a length 1 of each of the plurality of dry wiper blades 502 extends in a direction that is at an angle θ that is greater than 0 and less than 90° relative to the longitudinal axis LA. In some embodiments, each of the plurality of dry wiper blades 502 extends in a direction that is at an angle θ of from 5° to 50°, 5° to 45°, or from 10° to 30° relative to the longitudinal axis LA. The angle θ may be varied to provide for additional contact with the print head 150, as may be desired in embodiments.

As described above, each of the plurality of dry wiper blades 502 has an overlap of at least part of its length 1 with the length 1 of an adjacent dry wiper blade 502 in a direction orthogonal to the longitudinal axis LA. In embodiments, each of the plurality of dry wiper blades 502 has an overlap of at least 30% of its length 1 with the length of an adjacent dry wiper blade in a direction orthogonal to the longitudinal axis LA. For example, in some embodiments, each of the plurality of dry wiper blades 502 may have an overlap of from 30% to 70% of its length with the length of an adjacent dry wiper blade in a direction orthogonal to the longitudinal axis LA. Such an arrangement enables the dry wipe member 312 to contact the print head 150 with at least two blades 516 over the entire length of the print head 150. Other arrangements are contemplated, such as arrangements that enable the dry wipe member 312 to contact the print head 150 with three or more blades 516 over the entire length of the print head 150. Without being bound by theory, it is believed that because the dry wiper blades are angled with respect to the longitudinal axis LA and their lengths overlap with adjacent dry wiper blades, the dry wipe member 312 imparts less drag on the print head 150 as it wipes cleaning fluid from the print head 150 and is thereby more effective in wiping off the cleaning fluid. Additionally, the use of the array of angled dry wiper blades may result in the cleaning fluid being drained away from the print head 150 in less time compared to a single wiper blade extending along the longitudinal axis LA.

In embodiments, each of the blades 516 has the same vertical (e.g., +/−Z) position as the other blades 516. Accordingly, all of the blades 516 has the same engagement distance with the print head 150 during wiping operations. As is known in the art, the "engagement distance" refers to the amount by which the vertical position of the print head 150 and the vertical position of an undeflected blade 516 overlap. However, as shown in FIG. 5D, in embodiments, one or more blades 516 are positioned at a first vertical position $Z_1$ while one or more blades 516 are positioned at a second vertical position $Z_2$. In such embodiments, a least one blade 516 has a different engagement distance than the blades 516. For example, the blade 516 positioned at the first vertical position $Z_1$ has a smaller engagement distance than the blade 516 positioned at the second vertical position $Z_2$. In embodiments, the blades 516 may be positioned such that the engagement distance with the print head 150 increases along the path of the print head 150 during the dry wiping process. Such embodiments can, for example, reduce the amount of cleaning fluid that is expelled from the cleaning station 110 during the cleaning process.

In some embodiments, the wiper mounting member 501 includes channels 504, as shown in FIG. 5B. Each channel 504 is formed in a top face 506 of the wiper mounting member 501 and is shaped to receive one of the plurality of dry wiper blades 502. The formation of the channels 504 to receive the plurality of dry wiper blades 502 may enable the plurality of dry wiper blades 502 to be securely and accurately coupled to the wiper mounting member, which may ease manufacturing of the dry wipe member 312 and prevent movement of the dry wiper blades 502 with respect to the wiper mounting member 501 during use.

As depicted in FIG. 5B, in embodiments, each channel may include a hole 508 extending through the thickness of the wiper mounting member 501. In embodiments in which the wiper mounting member 501 does not include channels, a plurality of holes 508 may be positioned along the length of the wiper mounting member 501, with each of the plurality of holes 508 extending through the thickness from the top face 506 to a bottom face 510 of the wiper mounting member 501, as shown in FIG. 5C. In various embodiments, an attachment member 512, such as a screw, bolt, or other attachment mechanism, may be coupled to the body member 514 of each of the plurality of dry wiper blades 502 through the hole 508. Although in various embodiments, the plurality of dry wiper blades 502 are coupled to the wiper mounting member 501 by coupling an attachment member 512 to the body member 514, other methods of mounting the plurality of dry wiper blades 502 to the wiper mounting member 501 are possible and contemplated. For example, each of the plurality of dry wiper blades 502 can be secured within the wiper mounting member 501 using end caps that are bolted in place. While the above wiper array of FIGS. 5A-5D is discussed for use as a dry wipe member 312, it is further contemplated that the wiper array could also be included as a wet wipe member 310 or a purge wiper 303 (FIG. 3B).

In further embodiments, the dry wipe member 312 is coupled to two actuators (e.g., actuators 313) which are operable to raise or lower the dry wipe member 312 into and out of the volume of the cleaning fluid. For example, the dry wipe member 312 may be actuated such that the dry wipe member 312 is raised out of the volume of the cleaning fluid with sufficient time to allow the cleaning fluid to drain away from the dry wiper blades 502. The dry wipe member 312 contacts the print head 150 as it is moved through the dry wipe cleaner section 306 to remove cleaning fluid, contaminants and other debris from the print head 150 after the print head 150 is cleaned by the wet wipe member 310.

As another example, the dry wipe member 312 may be actuated after the print head 150 has moved to the capping section 308 or the build platform 120 such that the dry wipe member 312 is lowered into the volume of the cleaning fluid. The lowering of the dry wipe member 312 into the cleaning fluid may wash away contaminants on the surface of the dry wiper blades 502 and clean the dry wipe member 312, thereby reducing the likelihood that the dry wipe member 312 will introduce (or reintroduce) contaminants to the print head 150. In some embodiments, the dry wipe member 312 is lowered into the volume of the cleaning fluid for a period of time sufficient to rinse the dry wipe member 312, and then is raised out of the volume of the cleaning fluid until it has been used to wipe the print head 150 again.

Cleaning Station—Capping Section

As described with reference to FIGS. 3A-3C, in various embodiments, the cleaning station 110 includes a capping section 308 including a cover 701 to create or maintain a non-curing environment around the print head 150. As used herein, a "non-curing environment" means an environment in which the binder material does not cure within or on the surface of the nozzles of the print head 150. The non-curing environment may be maintained, for example, by maintaining a particular humidity level, temperature, or the like, that prevents the binder material from curing. Various suitable embodiments are contemplated.

Figure 7A:
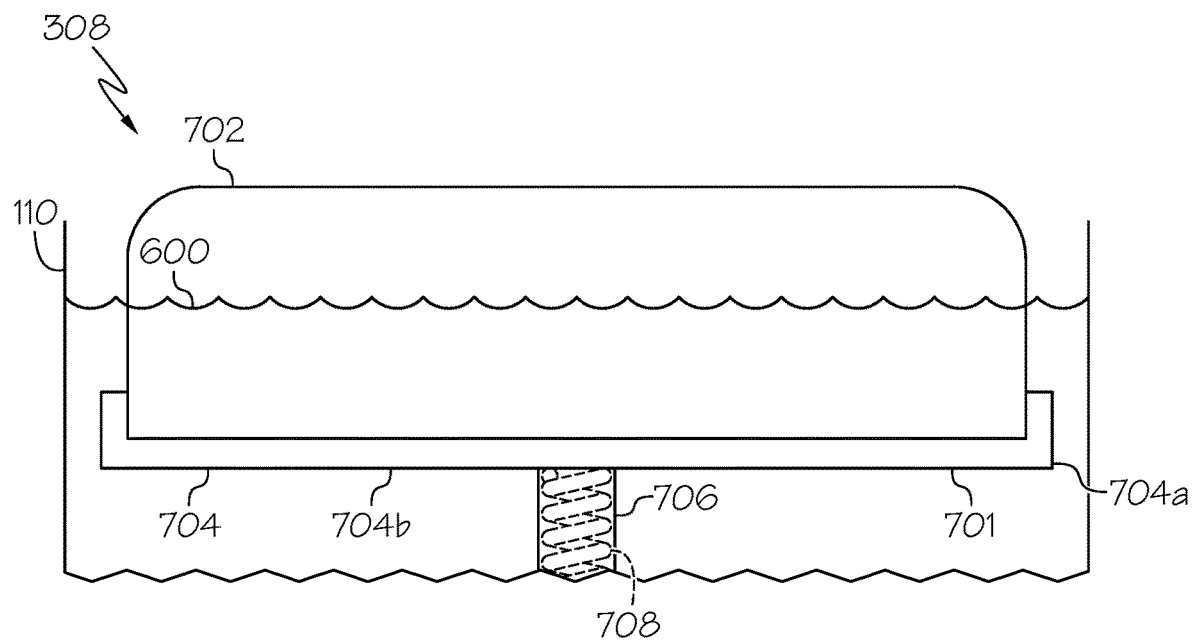
FIG. 7A is a cross-sectional side view of a capping section of the cleaning station including a sponge according to one or more embodiments shown and described herein.

An example embodiment of a capping section 308 is shown in greater detail in FIG. 7A. In particular, the capping section 308 includes a cover 701 in the form of a sponge 702 supported by a sponge support 704 coupled to an actuator 706 operable to raise and lower the sponge 702 into and out of the cleaning fluid within the cleaning station 110. Accordingly, the sponge 702 may be used to soak up cleaning fluid from the cleaning station 110 and the sponge 702 may be applied to the print head 150 while the print head 150 is idle. Without being bound by theory, the application of the wet sponge 702 to the print head 150 may reduce evaporation of binder material in one or more jet nozzles of the print head 150 and/or prevent the curing thereof. In other words, when the print head 150 is in an idle state, the print head 150 may be located at the capping section 308 to maintain the print head 150 in a non-curing environment, which, in embodiments, includes maintaining the print head 150 in a humid, moist, wet, or submerged state.

The sponge 702 can be formed of any suitable material capable of absorbing and holding the cleaning fluid for a predetermined period of time. In some embodiments, the sponge 702 may be made from cellulose wood fibers or foamed plastic polymers. In some particular embodiments, the sponge 702 may be made from a silicone material, such as a foamed silicone, a polyurethane, a polyimide, or combinations thereof.

The sponge support 704 can be a metal or plastic plate sized to support the sponge 702. In some embodiments, the sponge 702 may be coupled to the sponge support 704, such as through the use of an adhesive layer between the sponge 702 and the sponge support 704, or an attachment member, such as a bolt, screw, or other mechanism to attach the sponge 702 to the sponge support 704. In some embodiments, the sponge 702 may be removably coupled to the sponge support 704 such that the sponge 702 can be easily replaced without also replacing the sponge support 704 and actuator 706.

As shown in FIG. 7A, in some embodiments, the sponge support 704 may include edges 704a that extend in an upward direction from a base 704b. However, it is contemplated that in other embodiments, the sponge support 704 includes only the base 704b, and does not include raised edges 704a. In embodiments, the sponge support 704 may be perforated or otherwise include one or more holes through the thickness of the sponge support 704 to enable cleaning fluid in the cleaning station to be absorbed by the sponge 702. In other embodiments, the sponge 702 and sponge support 704 may be positioned such that the fluid level 600 of the cleaning fluid is above the edges 704a (if any) of the sponge support 704 such that the cleaning fluid is in contact with the sponge 702.

The sponge support 704 is coupled to an actuator 706 that is operable to raise and lower the sponge 702 within the cleaning fluid. The actuator 706 may be a linear actuator, a rotary actuator, a pneumatic actuator, an electric actuator, or any other suitable type of actuator selected based on the particular embodiment. Although depicted in FIG. 7A as being coupled to the sponge 702 through the sponge support 704, it is contemplated that in some embodiments, the actuator 706 may be directly coupled to the sponge 702, and a sponge support 704 may not be included. Such embodiments, for example, may be employed when the sponge 702 is made from a stiff, yet absorbent, material.

In the embodiment shown in FIG. 7A, the actuator 706 is coupled to a passive resistance mechanism 708, which biases the sponge 702 toward a raised position such that at least a portion of the sponge 702 is above the fluid level 600 of the cleaning fluid and able to contact the print head 150. The passive resistance mechanism 708 may be, by way of example and not limitation, a spring biased in an upward direction. The incorporation of a passive resistance mechanism 708, though optional, serves as a fail-safe to ensure that, in the event of an actuator failure, the sponge 702 is positioned for use to maintain the print head 150 in a non-curing environment. Additionally or alternatively, the incorporation of the passive resistance mechanism 708 may enable energy savings by enabling power to the actuator 706 to be reduced or turned off while the print head 150 is idle without causing the sponge 702 to be retracted below the fluid level of the cleaning fluid.

In various embodiments, when the print head 150 is located at the capping section 308 of the cleaning station 110, the sponge 702 is at least partially submerged in the cleaning fluid. In other words, some or all of the sponge 702 extends below the fluid level 600 of the cleaning fluid to enable the sponge 702 to be constantly absorbing cleaning fluid from the cleaning station 110. In some such embodiments, at least a portion of the sponge 702 extends above the fluid level 600 of the cleaning fluid such that the sponge 702 is in contact with the print head 150 without submerging the print head 150 in the cleaning fluid. In embodiments, 1%, 5%, 10%, 20%, 30%, 40%, 50%, 60%, 70%, 80%, 90%, 95%, or even 99% of the volume of the sponge 702 may extend above the fluid level 600 of the cleaning fluid.

In practice, to clean the print head 150, cleaning fluid is applied to the print head 150 using the wet wipe member 310 by passing the print head 150 through the wet wipe cleaner section 304. Then, cleaning fluid is removed from the print head 150 using the dry wipe member 312 by passing the print head 150 through the dry wipe cleaner section 306. Then, when the print head 150 will be idle or the additive manufacturing apparatus 100 is undergoing maintenance, the print head 150 is moved to the capping section 308 and into contact with the sponge 702 that is at least partially submerged in the cleaning fluid. In other embodiments (not shown), it is not required for the sponge to be submerged in the cleaning fluid. The sponge 702 is maintained in contact with the print head 150 while the print head 150 is idle or the additive manufacturing apparatus 100 is undergoing maintenance, thereby reducing evaporation of binder material in the nozzles of the print head 150, preventing the curing of the binder material around the print head 150, and the like.

Figure 7B:
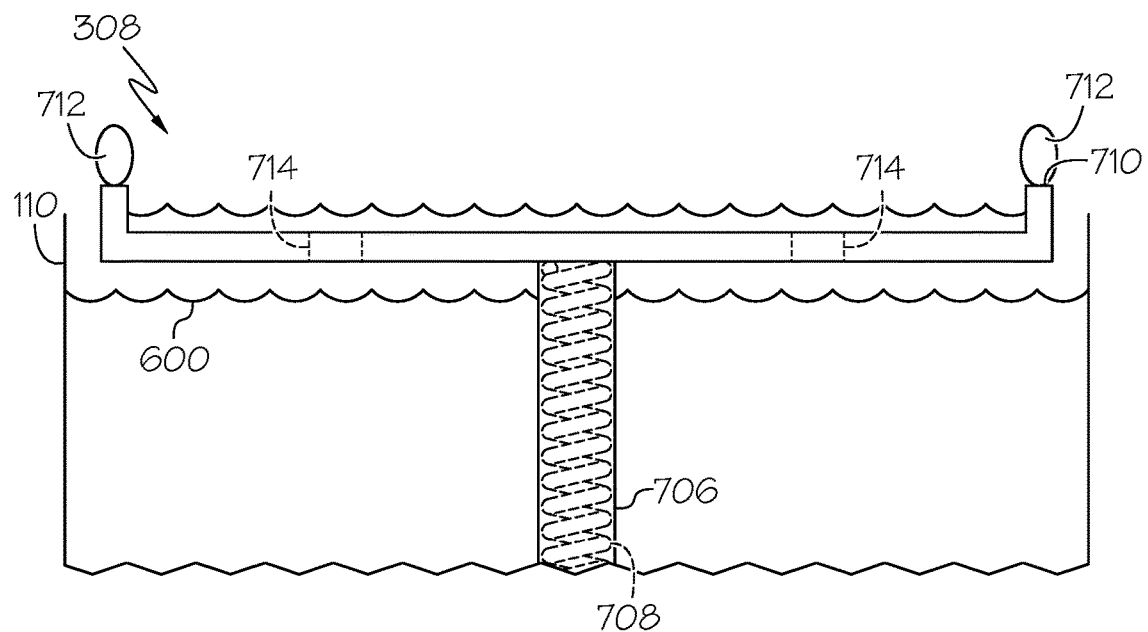
FIG. 7B is a cross-sectional side view of a capping section of the cleaning station including a cap according to one or more embodiments shown and described herein.

Although described above as including a sponge 702, in some embodiments, the cover 701 of the capping section 308 is a cap 710, as shown in FIG. 7B. In embodiments, the cap 710 may be sealed around the print head 150 when the print head 150 is idle to prevent the evaporation of binder material from the nozzles of the print head 150, to maintain a humidity level around the print head 150, and/or to maintain or create a non-curing environment around the print head 150. As shown in FIG. 7B, in embodiments, the cap 710 may include a volume of cleaning fluid, thereby forming a smaller cleaning vessel within the cleaning station vessel 314, so as to create a humid, non-curing environment around the nozzles of the print head 150, although in some embodiments, the cap 710 may not include a volume of fluids.

As with the sponge 702, the cap 710 is coupled to an actuator 706 that is operable to raise and lower the cap 710 within the cleaning fluid. The actuator 706 may be a linear actuator, a rotary actuator, a pneumatic actuator, an electric actuator, or any other suitable type of actuator selected based on the particular embodiment. In the embodiment shown in FIG. 7B, the actuator 706 is coupled to a passive resistance mechanism 708, which biases the cap 710 toward a raised position such that at least a portion of the cap 710 is above the fluid level 600 of the cleaning fluid and able to contact the print head 150. The passive resistance mechanism 708 may be, by way of example and not limitation, a spring biased in an upward direction. The incorporation of a passive resistance mechanism 708, though optional, serves as a fail-safe to ensure that, in the event of an actuator failure, the cap 710 is positioned for use to maintain the print head 150 in a non-curing environment. Additionally or alternatively, the incorporation of the passive resistance mechanism 708 may enable energy savings by enabling power to the actuator 706 to be reduced or turned off while the print head 150 is idle without causing the cap 710 to be retracted below the fluid level of the cleaning fluid.

In embodiments, the actuator 706 enables the height of the cap 710 to be adjusted relative to the print head 150. Accordingly, the cap 710 may be positioned to contact the print head 150 with fluid contained within the cap 710, or the cap 710 may be positioned to cap the print head 150 such that the face of the print head 150 is not contacted by the fluid.

In embodiments, the cap 710 may further include one or more gaskets or seals 712 to create a seal between the cap 710 and the print head 150 when the cap 710 is in use. The creation of a seal may minimize or even eliminate evaporation of the cleaning fluid in the cap 710, the binder material in the print head 150, or both. Moreover, in embodiments, the cap 710 may include one or more ports 714 (e.g., inlet and outlet ports) to enable cleaning fluid to be flowed through the cap 710 during use. Accordingly, the cleaning fluid in the cap 710 can be replenished or refreshed.

In still other embodiments, the cap 710 of FIG. 7B may be combined with the capping section 308 shown and described with respect to FIG. 7A, such that the sponge 702 may be actuated into and out of the cap 710, which seals around the print head 150. In such embodiments, the cap 710 may be selectively sealed around the print head 150 and may be actuated independent of the sponge 702. For example, the sponge may be actuated such that it is in contact with the print head 150 during relatively short periods of idleness, while the sponge may be retracted and the cap may be actuated and sealed around the print head 150 during longer periods of idleness, such as when the additive manufacturing apparatus 100 is powered off or undergoing maintenance.

Figure 7C:
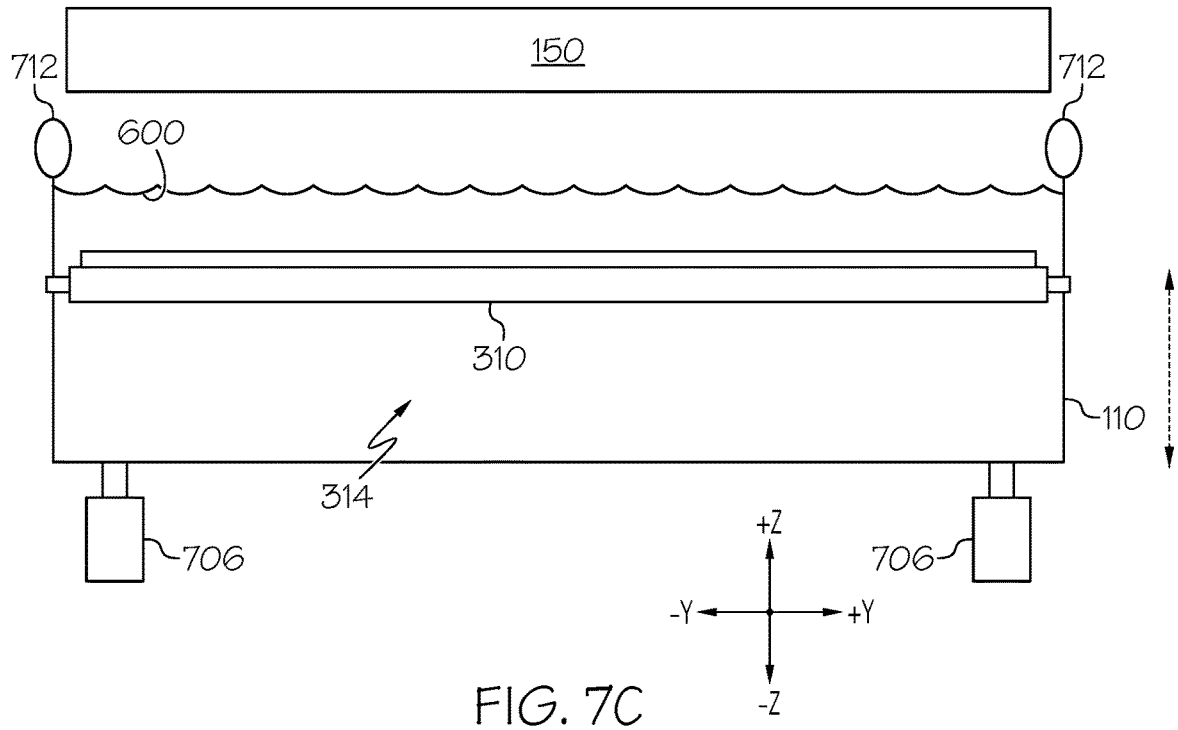
FIG. 7C is a cross-sectional front view of a cleaning station in which the cleaning station vessel is actuated vertically to cover the print head according to one or more embodiments shown and described herein.
Figure 7D:
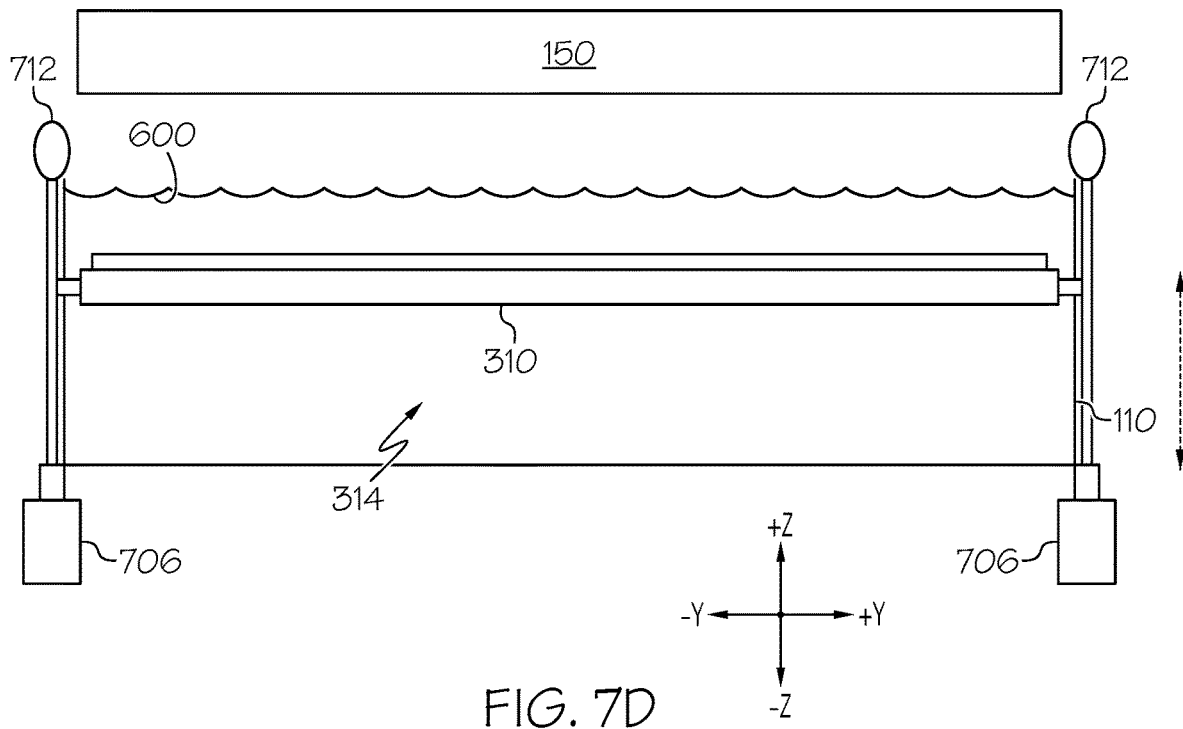
FIG. 7D is a cross-sectional front view of a cleaning station in which seals around the cleaning station vessel are actuated vertically to cover the print head according to one or more embodiments shown and described herein.
Figure 7E:
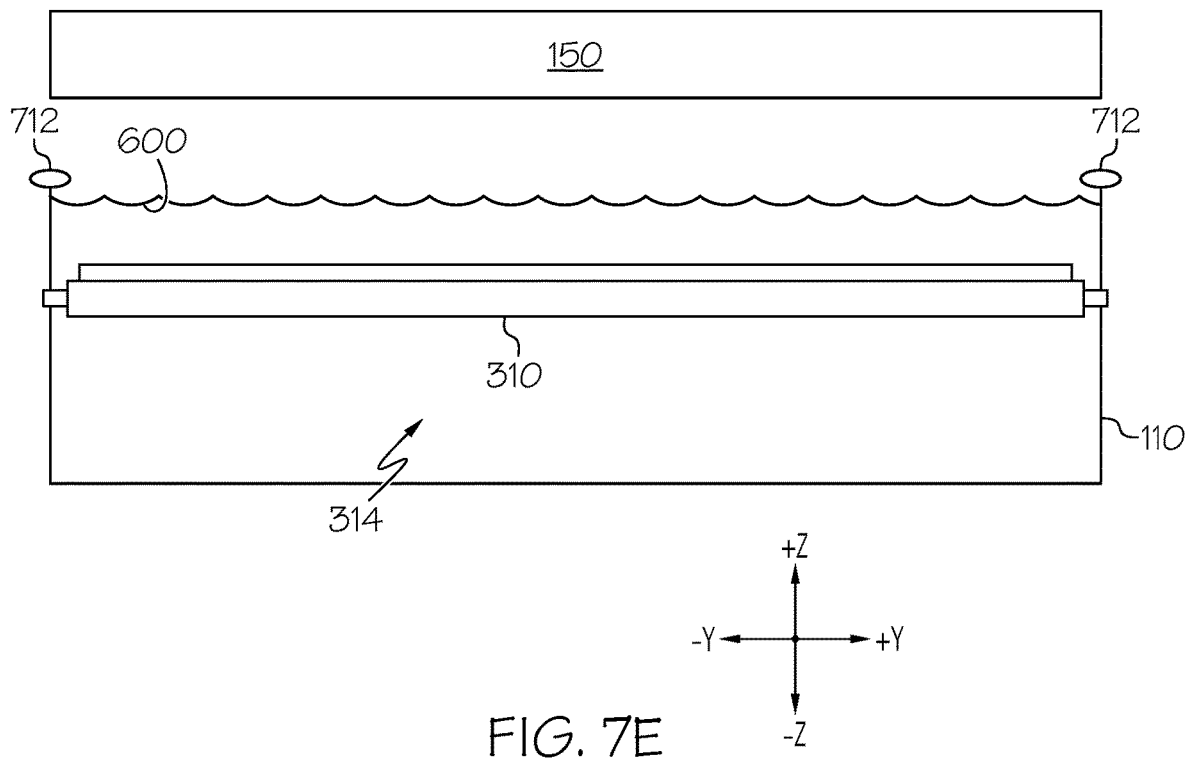
FIG. 7E is a cross-sectional front view of a cleaning station in which the cleaning station vessel includes deflated seals according to one or more embodiments shown and described herein.
Figure 7F:
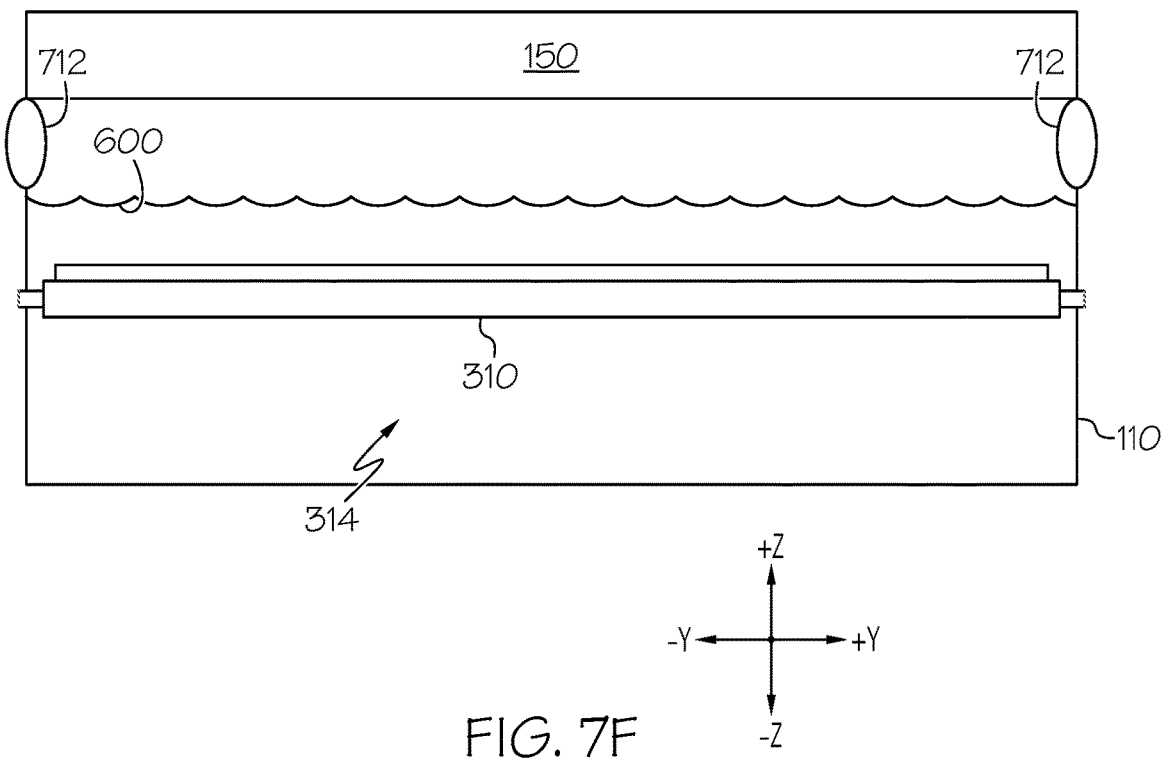
FIG. 7F is a cross-sectional front view of a cleaning station in which the deflated seals of FIG. 7E are inflated to form a seal with the print head according to one or more embodiments shown and described herein.

In embodiments, as an alternative to a dedicated capping section 308, the cleaning station vessel 314 itself may form a cover for the print head. In such embodiments, the cleaning station vessel 314 is coupled to one or more actuators 706 to move the cleaning station vessel 314 in a vertical direction with respect to the print head 150, as shown in FIG. 7C. Accordingly, the cleaning station vessel 314 can serve as a capping section 308 in such embodiments, and the print head 150 is capped by the entire cleaning station vessel 314. In embodiments, the cleaning station vessel 314 may be equipped with seals 712 that may be actuated, either independently (FIG. 7D) or with the cleaning station vessel 314 (FIG. 7C) to create a seal between the cleaning station vessel 314 and the print head 150. In addition to, or as an alternative to, actuation of the seals 712, it is contemplated that the seals 712 around the perimeter of the cleaning station vessel 314 may be inflatable seals that are inflated to provide a seal between the cleaning station vessel and the print head 150, as shown in FIGS. 7E and 7F.

It is further contemplated that, in embodiments, the print head 150 is actuatable in the vertical direction for sealing with the cleaning station vessel 314. Accordingly, depending on the particular embodiment, one or more of the cleaning station vessel 314, seals positioned around the perimeter of the cleaning station vessel 314, and the print head 150 are moved in a vertical direction to enable a seal to be formed between the cleaning station vessel 314 and the print head 150. As with the previously-described embodiments of the capping section 308, in embodiments, vertical movement of one or more of the cleaning station vessel 314, seals positioned around the perimeter of the cleaning station vessel 314, and the print head 150 is effective to maintain the print head 150 in a non-curing environment.

Cleaning Station—Motion of Components

As has been described herein, various components of the cleaning station 110, including the wet wipe member 310, the dry wipe member 312, and the capping section 308, are configured to move in a vertical (e.g., +/−Z) direction during the cleaning of the print head 150. Although described herein with reference only to the vertical component of the movement, it is contemplated that, in embodiments, the motion of the various components may have motion in other directions in addition to the vertical direction. For example, the motion may be in the form of an arc that includes both horizontal and vertical motion.

In general, the various components of the cleaning station 110 each independently moves between an extended position, in which the component is positioned to engage with or clean the print head 150, and a retracted position, in which the component is submerged within the cleaning fluid within the cleaning station vessel 314. For example, in embodiments, and with reference to FIGS. 3A and 3B, the print head 150 enters the cleaning station 110 from the right hand side of the figure, passing over the second binder purge bin 302 first. In embodiments, as the print head 150 proceeds from right to left, the capping section 308, the wet wipe member 310, and the dry wipe member 312 are in the retracted position such that they do not contact or clean the print head 150. The print head 150 arrives at the first binder purge bin 302, where backpressure is applied to the print head 150 to discharge contaminants from the print head 150 into the first binder purge bin 302. In embodiments, during an additive manufacturing process, the print head 150 discharges contaminants into the first binder purge bin 302 while the recoat head 140 is moving in the −X direction (e.g., a forward direction) in FIG. 1, supplying build material to a working surface of the build platform 120. The print head 150 then moves to the right, where the print head 150 is introduced to the wet wipe member 310. The wet wipe member 310 is in an extended position to apply cleaning fluid to the print head 150. Next, the print head 150 is introduced to the dry wipe member 312, which has moved to an extended position to wipe excess cleaning fluid from the print head 150, as described herein. In embodiments, the wet wipe member 310 and/or the dry wipe member 312 are vertically raised out of the cleaning fluid before the completion of the discharge of the contaminants from the print head 150 over the first binder purge bin 302. The wet wipe member 310 and/or the dry wipe member 312 are retracted into the cleaning fluid in the cleaning station vessel 314 after the print head 150 proceeds past them. For example, the wet wipe member 310 may be submerged in the cleaning fluid while the print head 150 is being wiped by the dry wipe member 312. In embodiments, during an additive manufacturing process, the wet wiping and dry wiping steps performed by the wet wipe member 310 and the dry wipe member 312, respectively, are performed while the recoat head 140 is moving in the +X direction (e.g., a reverse direction) from the build platform 120 toward a recoat home position 148.

After being wiped, the print head 150 may be capped in the capping section 308, or it may proceed to the second binder purge bin 302, where it is prepared for printing. For example, back pressure may be applied to the print head 150 to equilibrate the print head 150 for printing. In embodiments, the print head 150 then returns to the build platform 120 to deposit binder material onto the powder layer, as described with respect to FIG. 1.

Alternative orders in the operations of the components of the cleaning station 110 are contemplated. For example, in embodiments, the print head 150 enters the cleaning station 110 from the right hand side of the figure, passing over the second binder purge bin 302 first. However, as the print head 150 proceeds from right to left, the wet wipe member 310, the dry wipe member 312, or the wet wipe member 310 and the dry wipe member 312 are in the extended position such that they contact the print head 150 along its path to the first binder purge bin 302. In such embodiments, this can be a pre-cleaning step to remove surface contaminants prior to the discharging of additional contaminants over the first binder purge bin 302.

In some embodiments, the wet wipe member 310 and/or the dry wipe member 312 may be actuated using a two-stage actuation process to raise and lower the members out of and into the volume of cleaning fluid. Without being bound by theory, the two stage actuation improves cleaning fluid draining from one or both of the dry and wet wipe members, because the cleaning fluid easily flows back into the cleaning station vessel 314 when only one side of the wipe member is raised above the cleaning fluid level in stage one of the two stage actuation process. Because the dry wipe member 312 is directed to removing cleaning fluid, not applying it, ensuring the cleaning fluid is quickly drained from the dry wipe member 312 in the two-stage actuation process is desirable. However, in embodiments, other actuation processes, including single-stage actuation processes, are contemplated and possible.

Figure 6A:
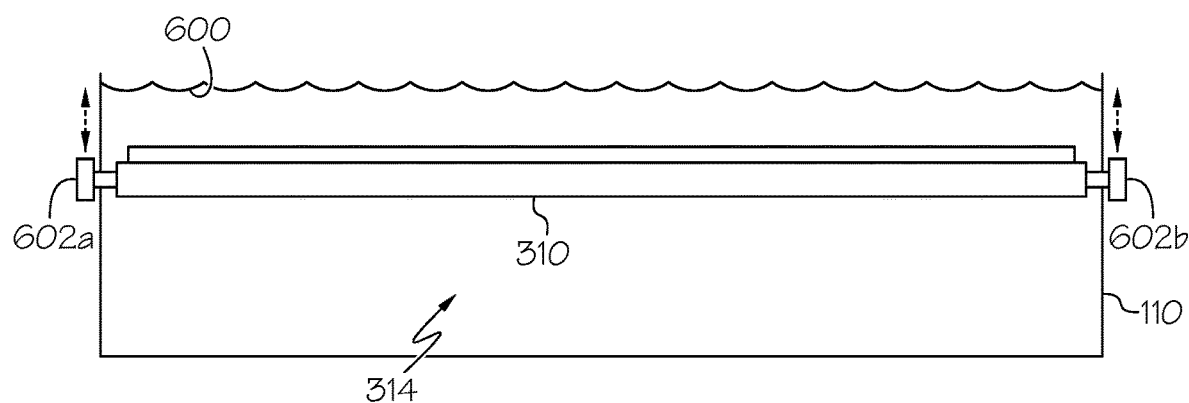
FIG. 6A is a cross-sectional front view of a dry wipe member submerged in cleaning fluid in the dry wipe section of the cleaning station vessel according to one or more embodiments shown and described herein.
Figure 6B:
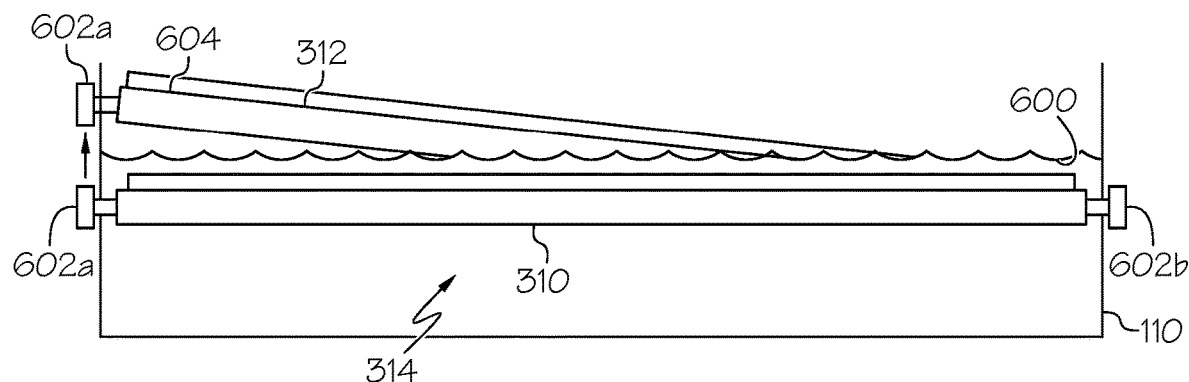
FIG. 6B is a cross-sectional front view depicting one end of the dry wipe member of FIG. 6A raised above the fluid level of the cleaning fluid according to one or more embodiments shown and described herein.
Figure 6C:
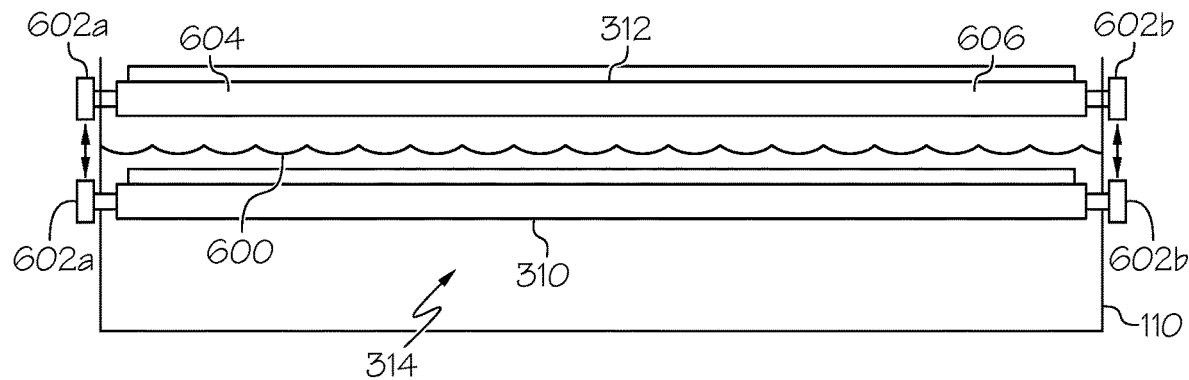
FIG. 6C is a cross-sectional front view depicting both ends of the dry wipe member of FIG. 6A raised above the fluid level of the cleaning fluid according to one or more embodiments shown and described herein.

The embodiment shown in FIGS. 6A-6C schematically depict a two-stage actuation process for raising the dry wipe members 312 out of the cleaning fluid of the cleaning station vessel 314. As shown in FIG. 6A, the dry wipe member 312 may be submerged in the cleaning station vessel 314 of the cleaning station 110 such that the dry wipe member 312 is below a fluid level 600 of the cleaning fluid within the cleaning station 110. Each of the wet wipe member 310 and the dry wipe member 312 are coupled to a first actuator 602*a* and a second actuator 602*b*, respectively, for raising and lowering the members. Actuators 602*a*, 602*b* in embodiments, may correspond to actuators 311 and 313 described in accordance with FIGS. 3A and 3B. The first actuator 602*a* is coupled proximate a first end of the wet wipe member 310 or the dry wipe member 312 and the second actuator 602*b* is coupled proximate a second end of the wet wipe member 310 or the dry wipe member 312. By "coupled proximate," it is meant that the actuator is coupled at or near the respective end of the member. In embodiments, the first actuator 602*a* is coupled to the wet wipe member 310 or the dry wipe member 312 at a point that is closer to the first end than the second end of the corresponding member, and the second actuator 602*b* is coupled to the wet wipe member 310 or the dry wipe member 312 at a point that is closer to the second end than the first end of the corresponding member. Each of the actuators 602*a* and 602*b* are independently operable to raise or lower the corresponding end of the dry wipe member 312 to which they are coupled into and out of the volume of the cleaning fluid.

In FIG. 6A, dry wipe member 312 is not shown, as it is positioned behind, and obscured by, the wet wipe member 310 in this view. As shown in FIG. 6B, the first actuator 602*a* coupled to the dry wipe member 312 is actuated to raise a first end 604 of the dry wipe member 312 above the fluid level 600 of the cleaning fluid while a second end 606 of the dry wipe member 312 remains below the fluid level 600. Although depicted in FIG. 6B as raising the first end 604 of the dry wipe member 312 to completely remove the first end 604 from the volume of cleaning fluid, it is contemplated that in some embodiments, the dry wipe member 312 may be raised such that the dry wiper blades 502 (not shown in FIGS. 6A-6C) are above the fluid level while at least a portion of the wiper mounting member 501 remains submerged in the cleaning fluid, below the fluid level 600. After the first end 604 of the dry wipe member 312 is raised, the second actuator 602b coupled to the dry wipe member 312 is actuated to raise the second end 606 of the dry wipe member 312 above the fluid level 600 of the cleaning fluid, as shown in FIG. 6C. As would be understood, lowering the dry wipe member 312 into the cleaning fluid may be achieved by reversing the process described above and depicted in FIGS. 6A-6C. In embodiments, actuators 602a and 602b may be actuated simultaneously to lower the first end 604 and the second end 606 of the dry wipe member 312 at the same time, or during overlapping time periods.

Figure 6D:
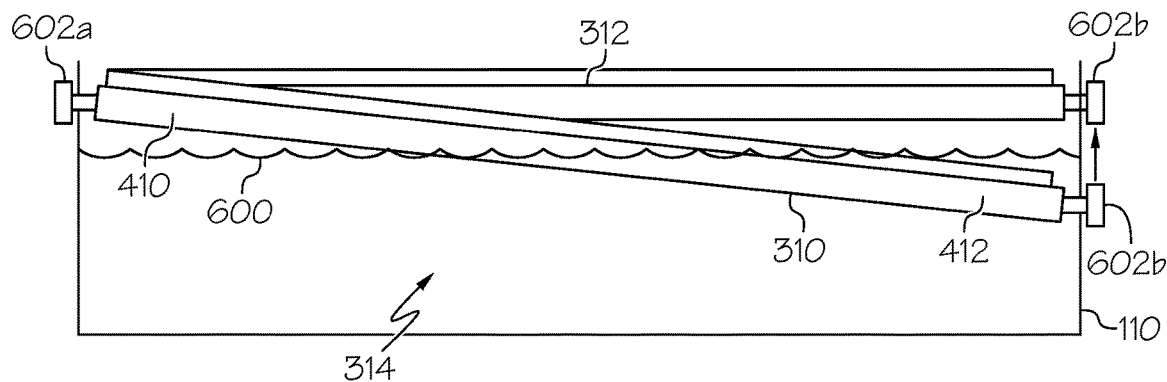
FIG. 6D is a cross-sectional front view depicting one end of the wet wipe member of FIG. 6A raised above the fluid level of the cleaning fluid according to one or more embodiments shown and described herein.
Figure 6E:
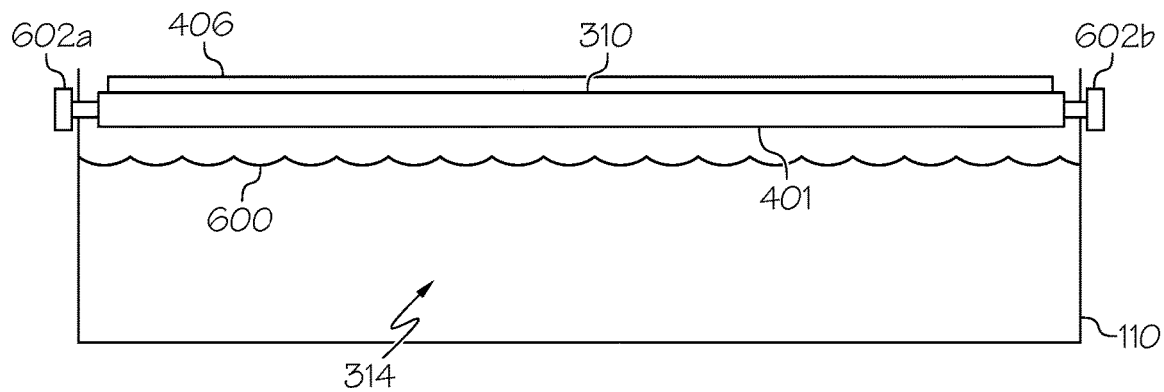
FIG. 6E is a cross-sectional front view depicting both ends of the wet wipe member of FIG. 6A raised above the fluid level of the cleaning fluid according to one or more embodiments shown and described herein.

Similarly, the embodiment shown in FIGS. 6D and 6E schematically depict a two-stage actuation process for raising the wet wipe member 310 out of the cleaning fluid of the cleaning station vessel 314. In particular, as shown in FIG. 6D, the first actuator 602a coupled to the wet wipe member 310 is actuated to raise the first end 410 of the wet wipe member 310 above the fluid level 600 of the cleaning fluid while the second end 412 of the wet wipe member 310 remains below the fluid level 600. Although depicted in FIG. 6D as raising the first end 410 of the wet wipe member 310 to completely remove the first end 410 from the volume of cleaning fluid, it is contemplated that in some embodiments, the wet wipe member 310 may be raised such that the wiper blades 406 are above the fluid level while at least a portion of the wet wiper body 401 remains submerged in the cleaning fluid, below the fluid level 600. After the first end 410 of the wet wipe member 310 is raised, the second actuator 602b coupled to the wet wipe member 310 is actuated to raise the second end 412 of the wet wipe member 310 above the fluid level 600 of the cleaning fluid, as shown in FIG. 6E. As above, the wet wipe member 310 can be resubmerged in the cleaning fluid by reversing the process, actuating the second actuator 602b and then actuating the first actuator 602a of the wet wipe member 310. Alternatively, in embodiments, actuators 602a and 602b may be actuated simultaneously to lower the first end 410 and the second end 412 of the wet wipe member 310 at the same time, or during overlapping time periods.

In some embodiments, the two-stage actuation process may occur for both the dry wipe members 312 and the wet wipe members 310. This embodiment, which is sequentially illustrated in FIGS. 6A-6E, may be completed before or while the print head 150 is moved to the binder purge bin 302. After the print head 150 is moved passed the wet wipe cleaner section 304 and the dry wipe cleaner section 306, the wet wipe member 310 and the dry wipe member 312 may be returned to the cleaning fluid. In particular, after the print head 150 is passed over the wet wipe member 310 and the dry wipe member 312, the actuators 602a-602b may be actuated to lower the wet wipe member 310 and the dry wipe member 312 below the fluid level 600 of the cleaning fluid. In some embodiments, two or more of the actuators may be actuated simultaneously to lower the wet wipe member 310 and the dry wipe member 312 into the cleaning fluid, while in other embodiments, each of the actuators is independently actuated.

For example, in embodiments, the actuator 602b is actuated while the first actuator 602a is actuated to lower the first and second ends of the wet wipe member 310 or the dry wipe member 312 at substantially the same time or during an overlapping time period. In embodiments, such as the embodiment shown in FIGS. 6D and 6E, the actuator 602a is actuated to lower the first end 410 of the wet wipe member 310 into the volume of cleaning fluid, then the actuator 602b is actuated to lower the second end 412 of the wet wipe member 310 into the cleaning fluid. Then, as shown in FIGS. 6A-6C, the actuator 602a is actuated to lower the second end 606 of the dry wipe member 312 into the volume of cleaning fluid, and finally, the actuator 602b is actuated to lower the first end 604 of the dry wipe member 312 into the cleaning fluid. Alternatively, as shown in to FIGS. 6D and 6E, the actuator 602a is actuated to lower the first end 410 of the wet wipe member 310 into the volume of cleaning fluid, then the actuator 602b is actuated to lower the second end 412 of the wet wipe member 310 into the cleaning fluid. As shown in FIGS. 6A-6C, then the actuator 602a is actuated to lower the first end 604 of the dry wipe member 312 into the volume of cleaning fluid, and finally, the actuator 602b is actuated to lower the second end 606 of the dry wipe member 312 into the cleaning fluid. In still other embodiments, the order of the lowering of the first end 410 and the second end 412 of the wet wipe member 310 is reversed, and in still other embodiments, the dry wipe member 312 is lowered into the cleaning fluid before the wet wipe member 310 is lowered into the cleaning fluid. In embodiments, some or all of the actuators may be actuated simultaneously.

In embodiments, the first and second actuators 602a, 602b (and, accordingly, actuators 311 and 313) are electric actuators that are independently operable to raise or lower the corresponding end of the wipe member (e.g., wet wipe member 310 or dry wipe member 312) at a plurality of speeds. Accordingly, in embodiments, the first actuator 602a is actuated to raise a first end of the wipe member at a first speed $r_1$, the second actuator 602b is actuated to raise a second end of the wipe member at a second speed $r_2$, the second actuator 602b is actuated to lower the second end of the wipe member at a third speed $r_3$, and the first actuator 602a is actuated to lower the first end of the wipe member at a fourth speed $r_4$, with at least one of the speeds differing from at least one of the other speeds. For example, the wet wipe member 310 or the dry wipe member 312 may be raised at one speed and lowered at another speed (e.g., $r_1=r_2$, $r_3=r_4$, $r_1 \neq r_3$), the first side may be actuated at one speed and the second side may be actuated at another speed (e.g., $r_1=r_4$, $r_2=r_3$, $r_4 \neq r_3$), each actuation may be at a different speed from each other actuation (e.g., $r_1 \neq r_2 \neq r_3 \neq r_4$), or the like. Such actuation can enable, for example, the wet wipe member 310 to emerge from the cleaning fluid quickly to project cleaning fluid toward the print head and to be submerged in the cleaning fluid to reduce or prevent splashing.

Although the wet wipe member 310 and the dry wipe member 312 are described herein as being coupled to two actuators, it is contemplated that in other embodiments, each wipe member may be coupled to a single actuator, or to more than two actuators. Moreover, although the actuators are described herein as being operable to raise and lower the corresponding wipe member, it is contemplated that the actuators may be used in embodiments to cause additional movement of the wipe member. For example, in embodiments in which the actuators are electric actuators, the actuators may be actuated to cause agitation of the wipe member within the cleaning station vessel 314, to adjust the position of the wipe member within the cleaning station vessel 314 or with respect to the print head 150, or the like. Electric actuators may further enable "just in time" positioning of the wipe member and/or automatic calibration routines. Other features and advantages are possible, depending on the particular embodiment. Commercially available electric actuators suitable for use include, by way of example and not limitation, ERD electric cylinders available from Tolomatic, Inc. (Hamel, MN).

Although it is contemplated in embodiments that the actuators are controlled using a controller, such as control system 1000, in embodiments, one or more additional mechanisms may be included to monitor, set, or limit the motion of the various components of the cleaning station 110. Such mechanisms may be desired, for example, to ensure that the print head 150 is not damaged by the components of the cleaning station 110, while enabling the components to contact the print head 150 as may be necessary to clean the print head 150. Accordingly, in embodiments, an adjustable hard stop 614 (FIG. 6F) may be present to limit the vertical movement of one or more of the components within the cleaning station vessel 314.

Figure 6F:
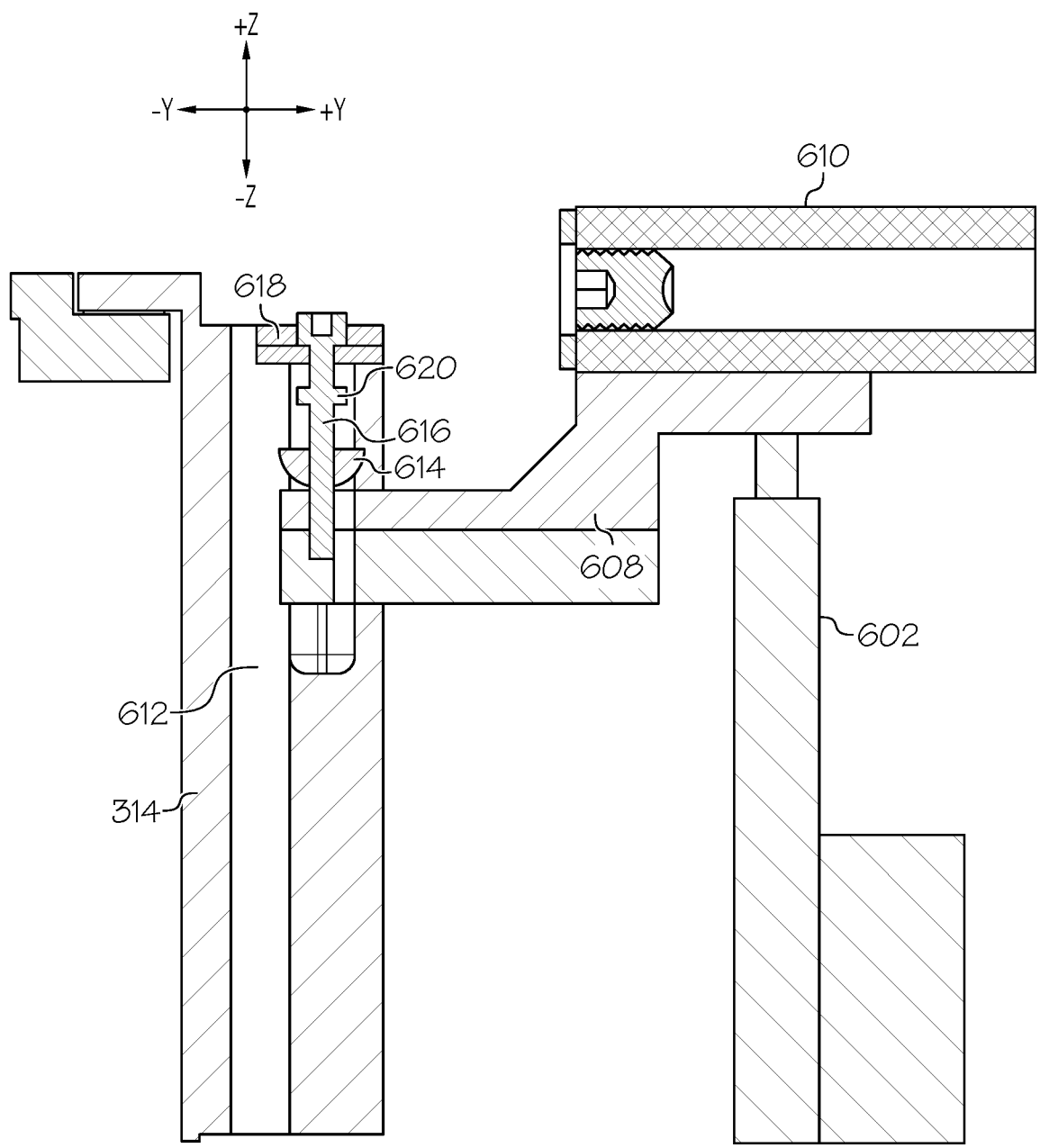
FIG. 6F is a cross-sectional front view depicting an adjustable hard stop for use in coupling of one of the members of the cleaning station within the cleaning station vessel according to one or more embodiment shown and described herein.

In embodiments, a member 610 is coupled to an actuator 602 through a motion coupler 608 to provide or control of the upper position of the member 610 within the cleaning station 110, and specifically, the cleaning station vessel 314, as shown in FIG. 6F. The member 610 can be, for example, the wet wipe member 310, the dry wipe member 312, and/or the cover of the capping section 308 (described in greater detail below), and the actuator 602 can be, for example, the one or more corresponding actuators (e.g., actuators 311, 313, and 706, respectively). The at least one motion coupler 608 extends from the member 610 and is configured to couple the member 610 to the cleaning station vessel 314 for vertical motion (e.g., along the +/−Z axis shown in the FIGS.) therein. In embodiments, the motion coupler 608 may be made from metal coated with polytetrafluoroethylene (e.g., TEFLON™) or other suitable materials.

In the embodiment shown in FIG. 6F, the member 610 moves up and down within the cleaning station vessel 314 on a rail 612 through the motion coupler 608. The rail 612 is coupled to an adjustable hard stop 614. The adjustable hard stop 614 includes a threaded portion through which the adjustable hard stop 614 is coupled with a controlling bolt 616. The controlling bolt 616 is additionally coupled with a rail cap 618 that is fixedly mounted on the rail 612. For example, the rail cap 618 may include a clearance hole through which the controlling bolt 616 passes before it is coupled with the adjustable hard stop 614 through the threaded portion of the adjustable hard stop 614. A nut 620 may be used to prevent the controlling bolt 616 from moving upward. To adjust the adjustable hard stop 614, the controlling bolt 616 is tightened (to move the adjustable hard stop 614 in the upward direction) or loosened (to move the adjustable hard stop 614 in the downward direction). Accordingly, the position of the adjustable hard stop 614 is set to the desired maximum height for the member 610. When the member 610 reaches to the desired maximum height, the adjustable hard stop 614 prevents the motion coupler 608 from continuing in the upward direction on the rail 612.

Although only one end of the member 610 is shown in FIG. 6F, it is contemplated in such embodiments, the member 610 includes a motion coupler 608 on each end and, accordingly, each end of the member 610 may be controlled in this fashion. In embodiments, a gauge or other indicia (not shown) may be included (e.g., machined into the rail 612 or cleaning station vessel 314) to enable the position of each end of the member 610 to be set at an equivalent position. Such indicia may additionally enable multiple members 610 to be set at a common desired position relatively easily.

Figure 11:
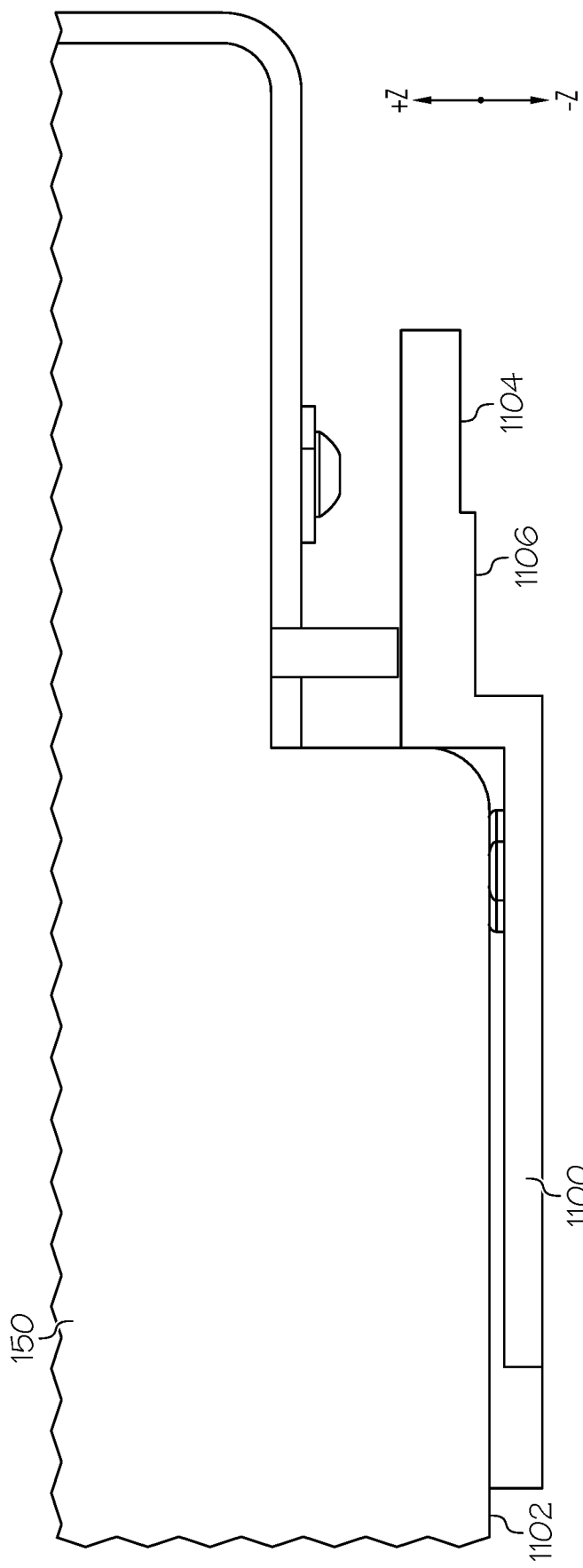
FIG. 11 is a cross-sectional side view of a print head having a gauge thereon for use in setting a maximum vertical height of one or more components of the cleaning station according to one or more embodiments shown and described herein.

In addition to, or as an alternative to, the hard stop, in embodiments a gauge 1100 on the underside of the print head 150 is used to vertically align one or more of the components of the cleaning station 110, as shown in FIG. 11. In FIG. 11, the gauge 1100 is affixed to the bottom face 1102 of the print head 150, such as through the use of bolts, clips, or another attachment mechanism. When affixed to the print head 150 the gauge 1100 includes a first section 1104 at a first vertical position $Z_1$ and a second section 1106 at a second vertical position $Z_2$. As shown in FIG. 11, the first vertical position $Z_1$ is vertically higher than, or above, the second vertical position $Z_2$. In embodiments, the first section 1104 and the second section 1106 can have different indicia or colors to enhance visual differentiation between the first and second vertical positions.

In practice, the print head 150 may be moved over the cleaning station 110, and the member 610 (e.g., wet wipe member 310, dry wipe member 312, or cap 710) is raised to an initial maximum vertical position. As used herein, the "maximum vertical position" of a member refers to the vertical position of the top edge 1108 of the member 610 when the member 610 is at a set maximum vertical height out of the cleaning station vessel 314. The print head 150 may be positioned directly over the member 610, or the print head 150 may be located elsewhere over the cleaning station 110 to enable visual comparison of the vertical position of the member 610 with the gauge 1100. The maximum vertical position $Z_m$, of the member 610 is then adjusted such that the top edge 1108 of the member 610 is vertically below or lower than the first vertical position $Z_1$. In embodiments, the maximum vertical position $Z_m$, of the member 610 is also greater than or equal to the second vertical position $Z_2$. Put another way, the member 610 is adjusted such that the maximum vertical position $Z_m$, of the member 610 is $Z_1 > Z_m \geq Z_2$. Adjustments of the maximum vertical position $Z_m$, of the member 610 can be made by adjusting an adjustable hard stop, as shown and described herein above, adjusting one or more parameters or settings of an actuator coupled to the member 610, or by other methods that will be known to those of skill in the art, depending on the particular embodiment. In embodiments, adjustments can be made using the gauge 1100 to any or all of the components of the cleaning station 110.

Having described various sections of a cleaning station 110, a fluid management system suitable for providing cleaning fluid to the cleaning station 110 and binder material to the print head 150 will now be described in detail.

Fluid Management System

Referring now to FIG. 8 in conjunction with FIG. 1, a fluid management system 800 includes a binder material pathway for providing binder material 500 to a print head 150 and for recycling binder material 500 not deposited on build material 400 positioned on the build platform 120 and a cleaning fluid pathway for providing cleaning fluid to the cleaning station 110 for cleaning the print head 150 between depositing operations and recycling and reconditioning cleaning fluid to minimize the amount of cleaning fluid that is wasted.

In general, the binder material pathway includes a binder reservoir 802 that is in fluid communication with the print head 150 and at least one binder purge bin 302. As depicted in FIGS. 3A and 3B, the cleaning station 110 includes two binder purge bins 302. The binder purge bins 302 may each include an active drain 806, which allows binder flow from the binder purge bin 302 into the binder reservoir 802. Further, as shown, the binder purge bins 302 may each include an overflow drain 812 disposed on the sidewall of the binder purge bin 302, which releases binder from the binder purge bin 302 if a level of binder in the binder purge bin 302 exceeds a desired binder fluid level. In some embodiments, level sensors may be included to ensure binder fluid level is properly monitored and maintained.

Referring again to FIG. 8, the binder material pathway enables recirculation of the binder material to reduce or even eliminate clogging of the binder material in the nozzles of the print head 150. In the binder material pathway depicted in FIG. 8, two binder purge bins 302 are included. In embodiments, one of the binder purge bins 302 may receive binder material and contaminants discharged from the print head 150 via backpressure prior to cleaning of the print head 150 at the cleaning station 110.

In embodiments including multiple binder purge bins, the first binder purge bin is located upstream from the cleaning station vessel 314 and the second binder purge bin (binder purge bin 302 in FIGS. 3A and 3B) is positioned downstream of the cleaning station vessel 314 and the dry wipe cleaner section of the cleaning station 110 along a path of the print head 150. In embodiments, the second binder purge bin is positioned upstream of the build area in order to receive binder material ejected (i.e., "spit") from the print head 150 during preparation of the print head 150 before printing. The second binder purge bin 302, in some embodiments, can include a non-porous medium (e.g., thermal, pH, hydrochromic or wax paper, cloth media, etc.) for receiving a pattern test printed by the print head 150 when the print head 150 is positioned over the additional binder purge bin 302. The pattern can be inspected, such as by using a camera configured to capture an image of the pattern, to determine if the printed pattern is suitable. For example, if the printed pattern matches a predetermined reference pattern, the printed pattern may be determined to be suitable. As another example, if the printed pattern differs from the predetermined reference pattern, the printed pattern may be determined to be unsuitable. In such embodiments, the print head may be prevented from supplying binder material to a working surface of the build area, or adjusted prior to supplying the binder material.

The binder material is provided from the binder reservoir 802 to an ink delivery system 804 which in turn delivers the binder material to the print head 150. The ink delivery system 804 enables the separation of storage of the binder material from the print head 150 and allows for the binder material to be replaced or refilled while the additive manufacturing apparatus 100 is actively printing. The print head 150 discharges the binder material through nozzles into, for example, the build area and the binder purge bins 302.

Binder material discharged into the one or more binder purge bins 302 passes through an active drain 806. In the embodiment depicted in FIG. 8, the active drain 806 is located at or near a bottom of each of the binder purge bins 302, to enable the binder material to be recirculated without requiring the accumulation of the binder material in the binder purge bins 302. In embodiments, the active drain 806 is in fluid communication with a pump 808 that actively moves the binder material from the active drain 806 through a filter 810 and back to the binder reservoir 802. The filter 810 may remove contaminants or large particles, such as polymers that have agglomerated as a result of partial evaporation of the binder material and build material particles, to ensure that the binder material that is returned to the binder reservoir 802 is suitable for recirculation through the binder material pathway.

As shown in FIG. 8, each binder purge bin 302 further includes an overflow drain 812 located through a sidewall of the binder purge bin 302. In embodiments, the overflow drain 812 is located within the top half of the height of the sidewall of the binder purge bin 302. The overflow drain 812 is in fluid communication with a waste reservoir 814. Accordingly, in the event that the active drain 806 becomes clogged or binder material otherwise accumulates to a level greater than or equal to the position of the overflow drain 812, the binder material can be drained from the binder purge bin 302 and removed from the binder material pathway via the waste reservoir 814. In the event of a clog in the active drain 806, the binder material removed from the binder purge bin 302 is directed from the overflow drain 812 to the waste reservoir 814 so as to minimize the amount of contaminants recirculated through the system, although in some embodiments, it is contemplated that the overflow drain 812 may be in fluid communication with the binder reservoir 802, such as through the filter 810.

In embodiments, the binder material pathway may optionally include an overflow tank 813 fluidly coupled to the overflow drain 812 of the binder purge bin 302. The overflow tank 813, when included, is fluidly coupled to the binder reservoir 802 and the waste reservoir 814. In embodiments, the overflow tank 813 is coupled to the binder reservoir 802 and the waste reservoir 814 through a valve 815, although other pathways are contemplated. Valve 815 can be, for example, a pinch valve, a three-way valve, or a four-way valve, although other types of valves are contemplated. It is further contemplated that the overflow tank 813 can be fluidly coupled to another part of the main circulation path instead of being fluidly coupled to the binder reservoir 802.

In embodiments including the overflow tank 813, binder material overflowing from the binder purge bin 302 flows through the overflow drain 812 into the overflow tank 813. Binder material in the overflow tank 813 is evaluated and, if verified that the binder material in the overflow tank 813 is still usable, the binder material is returned to the binder reservoir 802. If, however, the binder material in the overflow tank 813 is not still suitable for use (e.g., it contains too many contaminants or does not otherwise meet specifications for use), the binder material is sent to the waste reservoir 814. In embodiments including the valve 815, the valve 815 can be controlled by a computing device, such as control system 1000 that is configured to verify the suitability of the binder material for use and send a signal to the valve 815 to direct the binder material to the binder reservoir 802 or the waste reservoir 814.

Turning now to the cleaning fluid pathway depicted in FIG. 8, the cleaning fluid pathway generally includes a cleaning fluid reservoir 816 that is in fluid communication with the cleaning station vessel 314 of the cleaning station 110. The cleaning fluid pathway enables cleaning fluid to be applied to the print head 150 to fluidize particles deposited on the print head 150, such as build material particles and binder material particles, while further enabling the cleaning fluid to be recirculated and reconditioned to reduce the amount of cleaning fluid that is wasted.

In embodiments, the cleaning fluid is provided from the cleaning fluid reservoir 816 through a filter 818 to a pump 820, which in turn delivers the cleaning fluid to the cleaning station vessel 314 through a cleaning fluid inlet 822. As shown in FIG. 8, the cleaning fluid inlet 822 may be positioned in the bottom of the cleaning station vessel 314, although in other embodiments, the cleaning fluid inlet 822 may be provided in another location along one of the sidewalls of the cleaning station vessel 314. Additionally or alternatively, multiple cleaning fluid inlets 822 may be positioned within the cleaning station vessel 314 along with one or more cleaning fluid outlets to enable a directional flow of cleaning fluid through the cleaning station vessel 314. The directional flow of cleaning fluid can, for example, agitate the cleaning fluid and debris in the cleaning station vessel 314 and prevent the debris from settling at the base of the cleaning station vessel 314 where it may clog the active drain. In embodiments, tubes are connected to one or more cleaning fluid inlets 822 to direct the cleaning fluid within the cleaning station vessel 314. It is further contemplated that the contents of the cleaning station vessel 314 can be agitated using ultrasonic waves, oscillating or other non-static jets, turbulators or other vortex generators, or the like.

As the cleaning fluid is pumped into the cleaning station vessel 314, the volume of the cleaning fluid accumulates to a fluid level 600 within the cleaning station vessel 314. The volume of cleaning fluid is used to supply cleaning fluid to the wet wipe member 310 and the capping section 308, as described hereinabove, and to supply cleaning fluid to the dry wipe cleaner section 306 for cleaning the dry wipe member 312 between uses. In embodiments, the cleaning fluid inlet 822 can be left open to simply fill the cleaning station vessel 314. Alternatively, the cleaning fluid inlet 822 can be connected to the cleaning fluid inlets 416 of the wet wipe member 310 which then fills the fluid ports 407 and then fills the area between the wiper blades 406. In this setup, cleaning fluid is constantly fed when the machine is in operation and is then overflowed into the cleaning station vessel 314.

The cleaning station vessel 314 includes a drain 824 that is in fluid communication with the cleaning fluid reservoir 816. The drain 824, which is also depicted in FIGS. 3A and 3B, is positioned within the cleaning station vessel 314 to maintain the fluid level 600 at a predetermined level. Accordingly, when the volume of cleaning fluid rises above the predetermined level, cleaning fluid is drained from the cleaning station vessel 314 via the drain 824 and returned to the cleaning fluid reservoir 816. In one or more embodiments, the drain 824 may be an active drain coupled to a pump, or may be a passive drain, which allows the cleaning fluid to pass out of the cleaning station vessel 314 without the use of a pump or other active mechanism.

In the embodiment shown in FIG. 8, the cleaning station vessel 314 further includes an active drain 826 that is in fluid communication with the waste reservoir 814. The active drain 826 can be activated to allow at least a portion of the cleaning fluid that is in the cleaning station vessel 314 to be removed from the cleaning station vessel 314 and directed to the waste reservoir 814. As will be described in greater detail below, a portion of the cleaning fluid may be removed from the cleaning fluid pathway via the waste reservoir 814 in response to determining that the cleaning fluid contains an unsuitable amount of contaminants or that the cleaning fluid should otherwise be replaced, either partially or fully.

In various embodiments, the cleaning station vessel 314 further includes a level sensor 828. The level sensor 828 is used to maintain a constant height of cleaning fluid within the cleaning station vessel 314. For example, the level sensor 828 can determine that the fluid level 600 of the cleaning fluid is low and, responsive to the determination, additional cleaning fluid can be pumped into the cleaning station vessel 314 using the pump 820. The level sensor may be any suitable type of sensor. In some embodiments, the level sensor comprises a sensor that it is able to withstand submersion within the cleaning fluid. In other embodiments, the level sensor is not disposed within the cleaning fluid, and can detect the fluid level via other means. For example, a laser level sensor may be used. In embodiments, the level sensor 828 may be coupled to a control system 1000 which receives signals from the level sensor 828 and provides signals to other system components, such as the pump 820 and/or the active drain 826, as will be described in greater detail below. Additionally or alternatively, the level sensor 828 may include the fluid level sensors 322 positioned within the overflow vessel 318, as described in accordance with FIG. 3C above. Accordingly, it is contemplated that the fluid level sensors 322 can be incorporated into the cleaning fluid pathway, and coupled to the control system 1000, as has been described with respect to the level sensor 828.

In various embodiments, one or more additional components (not shown in FIG. 8) may be included in the fluid management system 800 as part of one or both of the binder material pathway or the cleaning fluid pathway. For example, additional level sensors, flow sensors, cameras, heaters, cooling units, temperature sensors, pumps, filters, valves, or the like may be included in the fluid management pathways to enable monitoring, control, and adjustment of the fluids in the pathways. Such additional components may be included in any of a variety of locations within the fluid management system 800 and may be communicatively coupled to the control system 1000. For example, in embodiments, the cleaning fluid path includes a heater to heat the cleaning fluid prior to it entering the cleaning station vessel 314. When included, the heater may be positioned at any of a number of points along the cleaning fluid path, such as between the pump 820 and the cleaning station vessel 314, or within the cleaning station vessel 314 or the cleaning fluid reservoir 816.

As another example, in embodiments a three-way or four-way valve may be positioned within the drain 824 and the cleaning fluid reservoir 816 to redirect a predetermined amount of the cleaning fluid to the waste reservoir 814. Accordingly, in embodiments, the three-way or four-way valve may replace or replicate the functionality of the active drain 826. Moreover, it is contemplated that one or more on/off valves (e.g., pinch valves) may be used in place of or in addition to the three- or four-way valves described herein.

In embodiments, one or more of the pumps described herein, including but not limited to pump 808 and pump 820, are capable of moving ferrous metals as well as other types of metals. Moreover, in embodiments, one or more of the pumps described herein may include a tunable flow rate, such as through flow regulators, which enable the flow rate to be tuned, such as to enable cleaning fluid to be provided to the wet wipe member at a first flow rate and to the inlet of the cleaning station vessel at a second flow rate.

Having described a fluid management system 800 for use in providing binder material and cleaning fluid to various components of the additive manufacturing apparatus 100, and specifically, the cleaning station 110, the binder material and cleaning fluid will now be described in detail.

Binder Materials

In various embodiments, the binder material is a reversible binder. As defined herein, a "reversible binder" is intended to denote a thermoplastic or thermoset polymer that, during decomposition, is broken down into oligomers and other molecules that are similar or identical to the monomers used to derive the polymer. The reversible binder may be polymerized via radical chain reactions to bond particles and layers of a powder used to print the article. While many of the embodiments described below are directed to metal powder, it is contemplated that other non-metal powders are suitable, for example, for sand, ceramic, and polymer binder jetting.

Although reference is made to a "metal powder" in various embodiments herein, it is contemplated that the material used to print the article may vary depending on the type of the article and the end use of the article. In embodiments in which a metal powder is employed, the metal powder may include nickel alloys, cobalt alloys, cobalt-chromium alloys, cast alloys, titanium alloys, aluminumbased materials, tungsten, steel, stainless steel, or any other suitable material and combinations thereof.

Following deposition of a layer of the metal powder, the binder material is selectively deposited into the layer of metal powder in a pattern representative of the structure of the article being printed. According to various embodiments, the binder material may include polymers derived from unsaturated monomers. For example, the binder material may include one or more polymers having the following formulas: $(CH_2CHR)_n$, where R=—H, —OH, phenyl, alkyl, aryl. The binder material may also include one or more monofunctional acrylic polymers having the formula $(CH_2-CR^2COOR^1)_n$, where $R^1$ is an alkyl or aryl, and $R^2$ is H or $CH_3$; di-acrylic polymers having the formula $[(CH_2-CR^2COO)_2-R^3]_n$, where $R^2$ is H or $CH_3$ and $R^3$ is a divalent hydrocarbon radical; tri-acrylic polymers having the following formula $[(CH_2CR^1COO)_3-R^4]_n$, where $R^1$ is H or $CH_3$ and $R^4$ is a trivalent hydrocarbon radical and/or poly(alkylene carbonates) including co-polymeric alkylene carbonates, such as poly(ethylene-cyclohexene carbonate) and those having the following formulas:

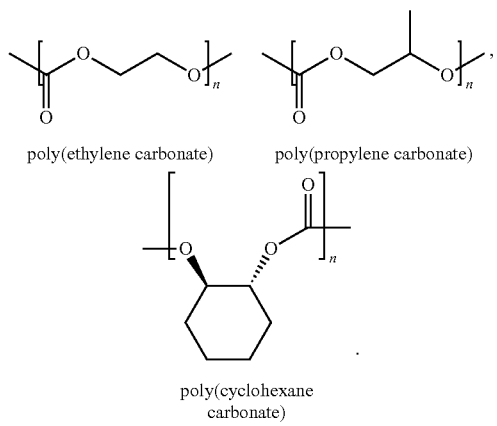

poly(ethylene carbonate)   poly(propylene carbonate)

poly(cyclohexane carbonate)

By way of example and not limitation, the binder material may include poly(methyl methacrylate) (PMMA), polystyrene (PS), poly(vinyl alcohol) (PVA), polyacrylic acid (PAA), Poly vinyl pyrrolidone (PVP), poly(alkylene carbonates), and polymers derived from hexanediol diacrylate (HDDA), trimethylolpropane triacrylate (TMPTA), and diethylene glycol diacrylate (DGD), derivatives of any of the above, or combinations of the above.

In some embodiments described herein, the binder material further includes one or more fluorescent dyes. The inclusion of the fluorescent dyes enables an otherwise clear binder material (e.g., a binder material including PVA and water) to be detectable under certain lighting conditions, as will be described in greater detail below. In specific embodiments, the fluorescent dyes/pigments should be photochromic dyes that respond to specific light intensities, for example near IR or UV (including UVA, UVB, or UVC) light. In embodiments including the fluorescent dye, the intensity of the fluorescence is a function of the concentration of the fluorescent dye. Accordingly, the inclusion of a fluorescent dye can provide information regarding where the binder material has been deposited, how much binder material has been deposited, and/or the extent to which the binder material has cured. Moreover, the fluorescence of the binder material can enable detection of leaks or spills, fluid management applications, such as monitoring tank levels, binder material concentration, and contamination, and part detection. Specific embodiments of using the fluorescent dye in process control are provided below.

In various embodiments, the fluorescent dye in the binder material may be any suitable fluorescent dye that is compatible with the binder material. In some embodiments, the fluorescent dye is not quenched by the metal powder. Moreover, the fluorescent dye should not negatively impact the material properties of the green body, brown body, or final part. Examples of fluorescent binders are fluorescent inorganic pigments and solid solutions of fluorescent dyes in transparent synthetic resins, polymer encapsulated fluorescent dyes.

Fluorescent pigments are solid solutions of fluorescent dyes. These fluorescent dyes may include polyenes, rhodamines, coumarins, naphthalimides, fluoresceins, diazonium salt, acridines, benzoxanthenes, or combinations thereof. The fluorescent color achieved can be from a combination of a single fluorescent dye embedded in a medium (e.g., polymer or resin carrier) or by combining multiple fluorescent dyes at different ratio. When incorporated in a resin dispersion, it is contemplated that the dispersion may be water or solvent based. The dyes may be proteins or non-proteins, and may be organic or synthetic. It is contemplated that the particular dye selected will vary based on the particular embodiment employed. Examples of suitable fluorescent dyes are described in PCT Publication WO 03/029340, which is incorporated by reference herein in its entirety.

Various sizes are contemplated for the fluorescent pigment. For example, the fluorescent pigment or fluorescent dye resin may have a typical average particle size from about 0.01 to about 1 µm. The amount of fluorescent pigment or fluorescent dye resin may be in the typical range of 0.01 to 5% by weight, or from 0.1 to 2% by weight.

The binder material may further include one or more additives that facilitate deposition of the binder material into the layer of metal powder. For example, the binder material may include one or more additives such as viscosity modifiers, dispersants, stabilizers, surfactants (e.g., surface active agents) or any other suitable additive that may facilitate the jettability of the binder material and deposition of the binder material into the layer of metal powder. The surfactants may be ionic (e.g., zwitterionic, cationic, or anionic) or non-ionic, depending on the properties of the binder material and/or the metal powder.

In some embodiments, the additive(s) may improve the wettability of the metal powder to facilitate coating the metal powder with the binder material. The additive(s) may also modify the surface tension of the binder material to facilitate jettability of the binder material. For example, in embodiments, the binder material is considered jettable if the Ohnesorge number (e.g., the ratio of viscous forces to inertial and surface tension forces) is between approximately 0.01 and approximately 2.

In embodiments, the additive(s) may also include a solvent that dissolves the binder material. The solvent may be aqueous or non-aqueous, depending on the particular polymers selected and other additives that may be in the binder material. The solvent is generally non-reactive (e.g., inert) such that it does not react with the metal powder, the polymers in the binder material, or any other additives that may be in the binder material. Additionally, the solvent should readily evaporate after selective deposition of the binder material into the layer of metal powder to facilitate bonding of the binder-coated particles and the printed layers. Example solvents that may be used in the binder material include, but are not limited to, water, methylene chloride ($CH_2Cl_2$), chloroform ($CHCl_3$), toluene, xylenes, mesitylene, anisole, 2-methoxy ethanol, Butanol, diethylene glycol, tetrahydrofuran (THF), methyl ethyl ketone (MEK), trichloroethylene (TCE), or any other suitable solvent.

The binder material may include the reversible binder, one or more monomers used to derive the reversible binder, or both. For example, in some embodiments, the reversible binder is polymerized before selective deposition into the layer of metal powder. Accordingly, in such embodiments, the binder material may include the reversible binder as a pre-formed, dissolved polymer. The reversible binder may be solubilized in a suitable solvent to facilitate jettability and deposition into the layer of the metal powder. Following deposition, the solvent may evaporate and the reversible binder may coalesce and bond the binder-coated particles and the printed layers to form the green body part.

In other embodiments, the reversible binder is polymerized after depositing the binder solution into the layer of metal powder. That is, the reversible binder may be polymerized in situ. For such embodiments, the binder material may include one or more polymerizable monomers (e.g., reactive monomers) that react to form the reversible binder. In one particular embodiment, the binder material includes the one or more polymerizable monomers and a suitable solvent. In other embodiments, the binder material does not include a solvent. Rather, the binder material may be a neat liquid of the one or more polymerizable monomers. Once the binder solution is deposited onto the layer of metal powder, the one or more polymerizable monomers may be polymerized to form the reversible binder within the layer of metal powder to form the printed layer of the green body part. In certain embodiments, the binder material may include initiators such as, for example, azobis(isobutyronitrile) (AIBN), to facilitate in situ polymerization of the one or more polymerizable monomers in the layer of metal powder.

By way of non-limiting example, in some embodiments, the binder material may include between about 0.5 weight percent (wt. %) and about 30 wt. % of the polymerized reversible binder or the polymerizable monomers used to derive the reversible binder in situ. In one embodiment, the binder material include from about 3 wt. % to about 7 wt. % of the polymer or polymerizable monomers. Additionally, the binder material may include suitable viscosity modifiers to enable a viscosity of the binder material that is from about 2 centipoise (cP) and about 200 cP. For example, depending on the viscosity of the mixture of the solvent and polymer/polymerizable monomer solution or the neat polymerizable monomer solution, the binder material may have from about 0.1 wt. % to about 15 wt. % of a viscosity modifier, such that the viscosity of the binder material is within the desired range for efficient and effective jettability.

Following deposition of the metal powder and printing of the binder material, the reversible binder is cured to form a layer of the green body part. While a portion of the solvent in the binder material may be evaporated during deposition (e.g., printing) of the binder material, a certain amount of the solvent may remain within the layer of metal powder. Therefore, in certain embodiments, the green body part may be thermally cured at a temperature that is suitable for evaporating the solvent remaining in the printed layer and allowing efficient bonding of the printed layers of the green body part.

In embodiments, the green body part may be cured to allow polymerization of the polymerizable monomers in the binder material to yield the reversible binder. For example, as discussed above, the reversible binder may be polymerized in situ after printing the binder material into the layer of metal powder. Following deposition of the binder material, the one or more polymerizable monomers in the binder material may be cured to polymerize the one or more monomers and form the printed layer of the green body part. For example, the printed layers may be exposed to heat, moisture, light, or any other suitable curing method that polymerizes the one or more polymerizable monomers in the binder material before the next layer of metal powder is deposited on top of the printed layer. In certain embodiments, the binder material may include a radical initiator (e.g., AIBN) to facilitate polymerization of the one or more polymerizable monomers. In one embodiment, the one or more polymerizable selectively deposited may be cured immediately after forming the printed layer. In other embodiments, the one or more polymerizable monomers may be cured after a desired number of printed layers has been formed. Excess metal powder (e.g., the metal powder that is not bonded by the reversible binder) may be removed after curing to prepare the green body for post-printing processing. After curing, the green body may undergo a drying step to remove any solvent and/or other volatile materials that remain in the green body part. For example, the green body may be dried in a vacuum, under an inert atmosphere (e.g., nitrogen or argon), or air.

Additional details on binder materials suitable for use in the embodiments described herein may be found in U.S. Patent Application Publication No. 2018/0071820 to Natarajan et al., entitled "Reversible binders for use in binder jetting additive manufacturing techniques" and filed on Sep. 9, 2016, the entire contents of which is hereby incorporated by reference. Moreover, it is contemplated that other binder materials may be used with the cleaning station and/or additive manufacturing apparatus described herein, depending on the particular embodiment.

Cleaning Fluids

In various embodiments, the cleaning fluid is compatible with the binder material (e.g., capable of dissolving or otherwise enabling with binder material to be wiped away) and is safe for the components of the additive manufacturing apparatus 100 (e.g., does not cause the need for excessive maintenance or cleaning). In some embodiments, such as embodiments in which the binder material is water-based, the cleaning fluid is a water-miscible cleaning fluid.

In various embodiments, the cleaning fluid includes from 0.1 wt. % to 30 wt. % of a cleaning agent. For example, the cleaning fluid can include from 0.1 wt. % to 30 wt. %, from 0.1 wt. % to 20 wt. %, from 0.5 wt. % to 10 wt. %, from 1 wt. % to 10 wt. %, or from 1 wt. % to 5 wt. % of the cleaning agent. In embodiments, the cleaning agent is an organic solvent. Suitable organic solvents for use in the cleaning fluid include dimethyl formamide (DMF), dimethyl sulfoxide (DMSO), methylpyrrolidone (NMP), N—N-dimethylacetamide (DMAc), 1,3-dimethyl-2-imidazolidnone (DMI), 1,3-dimethyl-3,4,5,6-tetrahydro-2(1H)-pyrimidinone (DMPU), ethylene glycol, diethyl glycol, dipropylene glycol dimethyl ether, cyrene, dimethyl isosorbide, propylene glycol, and mixtures thereof. In particular embodiments, the cleaning agent is DMF, NMP, DMSO, dipropylene glycol dimethyl ether, cyrene, dimethyl isosorbide, ethylene glycol, or combinations thereof.

It is contemplated that in some embodiments, the cleaning fluid may include one or more additives, although in other embodiments, the cleaning fluid includes the cleaning agent and water. Accordingly, in various embodiments, the cleaning fluid includes from 80 wt. % to 99.9 wt. % water, from 90 wt. % to 99.5 wt. % water, from 90 wt. % to 99 wt. % water, or from 95 wt. % to 99 wt. % water.

The cleaning fluid of various embodiments has a viscosity that enables the cleaning fluid to flow through the cleaning fluid pathway without issue. In embodiments, the cleaning fluid has a viscosity of less than 10 cP or less than 5 cP at 25° C. For example, the cleaning fluid may have a viscosity of from 0.5 cP to 5 cP, 0.5 cP to 3 cP, from 1 cP to 2 cP, or from 1 cP to 1.5 cP.

Additionally, or alternatively, the cleaning fluid of various embodiments has a boiling point that is greater than or equal to the boiling point of water. By having a boiling point that is greater than or equal to that of water, the cleaning fluid can resist evaporation and keep the print head 150 moist by preventing the binder material from drying. In various embodiments, the cleaning fluid has a boiling point that is greater than or equal to 100° C. at 1 atm, greater than or equal to 110° C. at 1 atm, greater than or equal to 125° C. at 1 atm, or even greater than or equal to 150° C. at 1 atm.

In embodiments, the cleaning fluid is formulated such that the density of the cleaning fluid is close to the density of water (e.g., 1 $g/cm^3$). In such embodiments, contaminants within the cleaning fluid, such as binder material and other debris, can be detected based on a change in density of the cleaning fluid, as will be described in greater detail below. Accordingly, in various embodiments, the cleaning fluid has a density of from 0.900 $g/cm^3$ to 1.400 $g/cm^3$ from 0.900 $g/cm^3$ to 1.200 $g/cm^3$ or from 0.900 $g/cm^3$ to 1.100 $g/cm^3$. For example, the cleaning fluid may have a density of from 0.905 $g/cm^3$ to 1.195 $g/cm^3$, from 0.910 $g/cm^3$ to 1.175 $g/cm^3$, from 0.950 $g/cm^3$ to 1.150 $g/cm^3$, from 0.905 $g/cm^3$ to 1.095 $g/cm^3$, from 0.910 $g/cm^3$ to 1.075 $g/cm^3$, or from 0.950 $g/cm^3$ to 1.050 $g/cm^3$.

The cleaning fluid may be heated, such as by a heater positioned along the cleaning fluid pathway, although in other embodiments, the cleaning fluid may be applied to the print head 150 at approximately ambient temperature. As used herein, "ambient temperature" within the machine may differ from room temperature outside the machine. For example, the temperature of the machine may be elevated. In other embodiments, the cleaning fluid may be cooled to a temperature below ambient temperature before application to the print head 150. For example, the cleaning fluid may be cooled to a temperature sufficient to cool the print head. Cooling of the cleaning fluid may be accomplished using a cooling apparatus, or simply by recirculation of the cleaning fluid through the cleaning fluid pathway.

As described herein, the cleaning fluid can be applied to the print head 150 to dissolve precipitant (e.g., resulting from partial evaporation of binder material) and other debris deposited on the print head 150 and within the nozzles of the print head 150. Because the cleaning fluid is recirculated through the system and is also specially formulated to be compatible with the cleaning station 110, the print head 150, and the binder material ejected from the print head 150, in various embodiments, the cleaning fluid is monitored to determine when the cleaning fluid should be reconditioned or replaced. An example method 900 of monitoring a status of the cleaning fluid is described in FIG. 9. In some embodiments, the method 900 or similar methods may be used to check the "health" of the cleaning fluid by determining the potency of the cleaning fluid.

Figure 9:
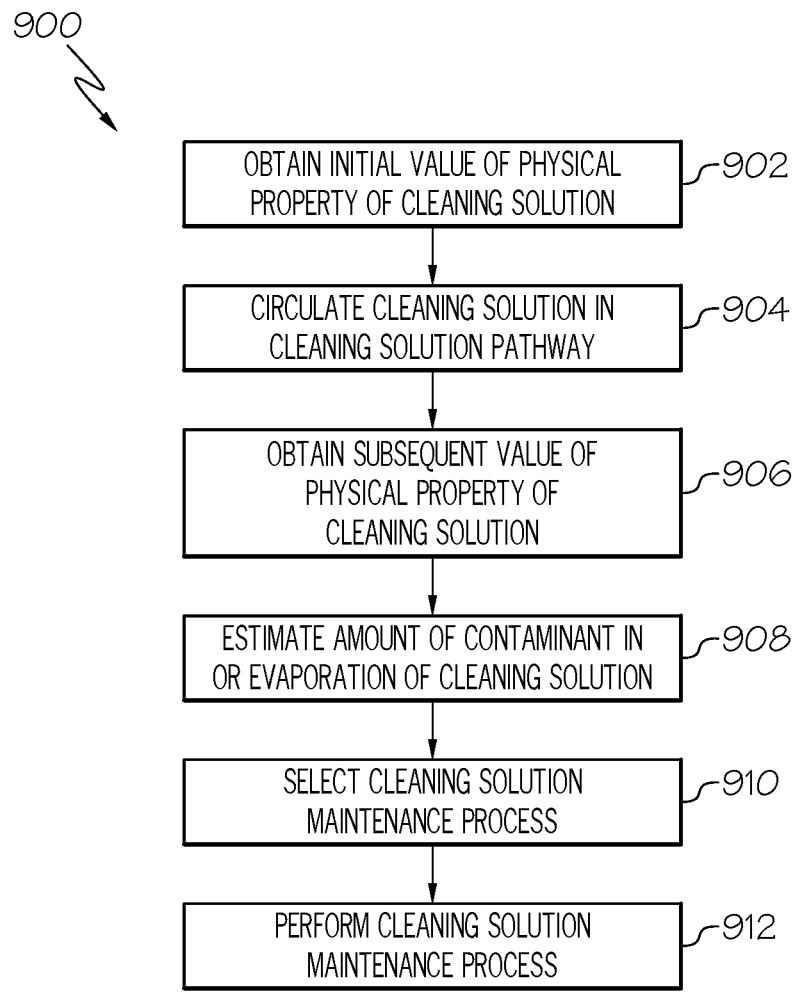
FIG. 9 is a flow chart depicting an embodiment of cleaning fluid maintenance according to one or more embodiments shown and described herein.

In the method depicted in FIG. 9, the method 900 begins by obtaining an initial value of a physical property of the cleaning fluid (block 902). The physical property can be, for example, a density of the cleaning fluid, a viscosity of the cleaning fluid, a haze measurement, a surface tension of the cleaning fluid, a color of the cleaning fluid, a pH of the cleaning fluid, a conductivity of the cleaning fluid, or a fluorescence of the cleaning fluid. The initial value can be obtained in any one of a number of suitable ways, including through the use of sensors, cameras, or user input into a control system, such as control system 1000. In various embodiments, the initial value can be stored in the memory of the control system 1000.

Next, the cleaning fluid is circulated through the cleaning fluid pathway for a predetermined amount of time (block 904). In embodiments, circulation of the cleaning fluid through the cleaning fluid pathway includes using the cleaning fluid to clean the print head 150. The predetermined period of time can vary depending on the particular embodiment. For example, the "predetermined time" may be the sampling rate of an instrument, which would ostensibly yield an effective "continuous" monitoring system. In other embodiments, the predetermined period of time can be a period of 1 minute, 5 minutes, 10 minutes, 30 minutes, an hour, 2 hours, or the like. After the passage of the predetermined period of time, a subsequent value corresponding to the physical property of the cleaning fluid is obtained (block 906). The subsequent value can be determined in the same way as the initial value was determined, or by a different method. For example, a user may input the initial value for a cleaning fluid when the cleaning fluid is introduced to the system, but a sensor may be used to obtain subsequent values corresponding to the physical property.

Next, an amount of contaminant in the cleaning fluid is estimated based on the initial value and the subsequent value corresponding to the physical property of the cleaning fluid (block 908). For example, the initial and subsequent values may be stored in a look up table (LUT) stored in the memory of the control system 1000 along with an estimated contaminant amount. Alternatively, the control system 1000 may perform one or more calculations to determine the amount of contaminant in the cleaning fluid. The contaminant may include, for example, dissolved, mixed and/or suspended binder material removed from the print head 150, dissolved, mixed and/or suspended build material (e.g., metal powder), or the like. As used herein, "contaminant" includes, but is not limited to, precipitant deposited on the print head. In embodiments, the contaminant comprises polyvinyl alcohol (PVA), polyvinyl pyrrolidone (PVP), polyacrylic acid (PVA), or derivatives thereof. In embodiments, as an alternative to or in addition to determining an estimated contaminant amount, an amount of evaporation is estimated. For example, the initial and subsequent values may be stored in a look up table (LUT) stored in the memory of the control system 1000 along with an estimated evaporation amount. Based on the amount of contaminant in the cleaning fluid, the amount of evaporation of the cleaning fluid, or both, a cleaning fluid maintenance process is selected from a plurality of available maintenance processes (block 910). In some embodiments, available maintenance processes may include adding water (or another solvent) to the cleaning fluid, replacing a portion of the cleaning fluid containing contaminants with fresh cleaning fluid, replacing a majority of the volume of the cleaning fluid with fresh cleaning fluid, or returning the cleaning fluid containing the contaminants to the cleaning fluid reservoir. Finally, the selected cleaning fluid maintenance process is performed (block 912).

By way of illustration, the process may include using a density meter to automatically determine an initial density of the cleaning fluid. Then, after the cleaning fluid has been used for a period of about 15 minutes, the density meter again measures the density of the cleaning fluid. Various time periods are considered suitable and can be tailored based on print cycles, cleaning cycles, and the like. In one or more embodiments, the density of the cleaning fluid may be measured as frequently as every 30 seconds or after 15 minutes, or in a further embodiment, density may be measured every 30-60 seconds. The density meter transmits both the initial density and the subsequent density of the cleaning fluid to the control system 1000, which then estimates an amount of contaminant in the cleaning fluid based on the change in density. When the estimated amount of contaminant is within a suitable range, the cleaning fluid recirculated through the cleaning fluid pathway. When the estimated amount of contaminant is moderate, water may be added to the cleaning fluid, or a portion of the cleaning fluid may be diverted to the waste reservoir by activating a three-way valve (described above) while new cleaning fluid is added to the cleaning fluid reservoir. Alternatively, when the estimated amount of contaminant is high, the entire volume of the cleaning fluid is diverted to the waste reservoir and fresh cleaning fluid is added to the cleaning fluid reservoir.

As another example, the process may include using a camera to detect an initial fluorescence of the cleaning fluid. Then, after the cleaning fluid has been used for a period of about an hour, the camera again measures the fluorescence of the cleaning fluid. In embodiments in which the binder material includes a fluorescent dye, an increase in the fluorescence of the cleaning fluid can indicate the presence of binder material in the cleaning fluid. The camera transmits both the initial fluorescence and the subsequent fluorescence of the cleaning fluid to the control system 1000, which then estimates an amount of contaminant in the cleaning fluid based on the change in fluorescence. When the estimated amount of contaminant is within a suitable range, the cleaning fluid recirculated through the cleaning fluid pathway. When the estimated amount of contaminant is moderate, water may be added to the cleaning fluid, or a portion of the cleaning fluid may be diverted to the waste reservoir by activating a three-way valve (described above) while new cleaning fluid is added to the cleaning fluid reservoir. Alternatively, when the estimated amount of contaminant is high, the entire volume of the cleaning fluid is diverted to the waste reservoir and fresh cleaning fluid is added to the cleaning fluid reservoir.

Although various embodiments are described herein with reference to measurement of a single physical property of the cleaning fluid, it is contemplated that in other embodiments, more than one physical property can be monitored and used to determine a cleaning fluid maintenance process to be performed. For example, both density and viscosity can be used to select a cleaning fluid maintenance process. By way of example, the control system 1000 may select a maintenance process that includes adding water to the cleaning fluid based on a change in the density of the cleaning fluid, but the control system 1000 may instead select a maintenance process that includes partial replacement of the cleaning fluid or replacement of the majority of the volume of the cleaning fluid when the density has decreased too much, indicating that the cleaning fluid may be becoming too diluted to function properly. In embodiments, the selection of the cleaning fluid maintenance process can be based on the viscosity, the surface tension, or both, of the cleaning fluid.

Control System

Figure 10:
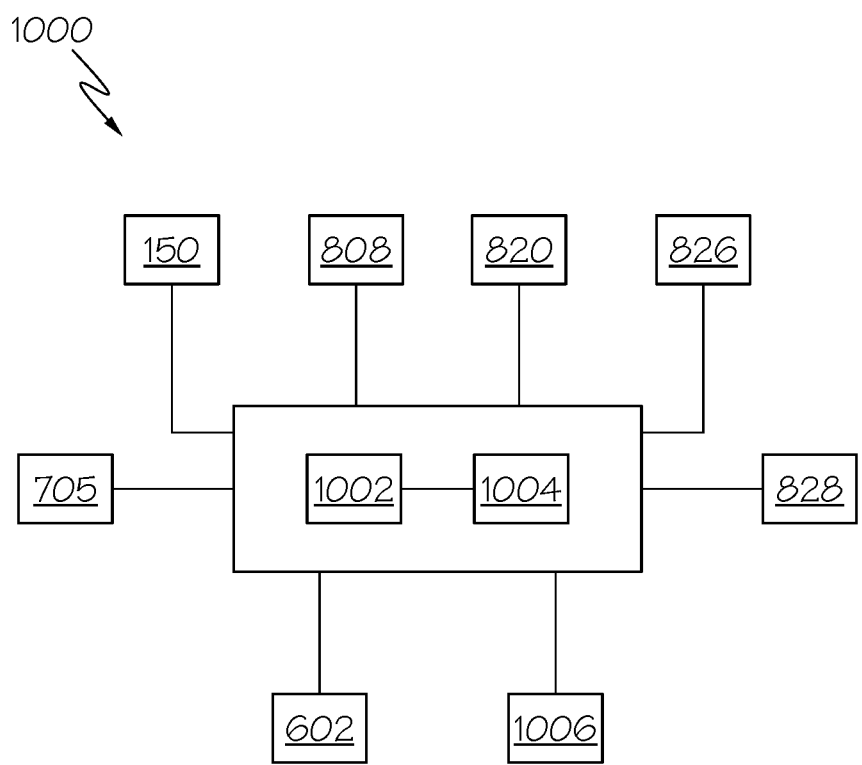
FIG. 10 schematically depicts a control system for controlling the components of the binder pathway and the cleaning fluid pathway according to one or more embodiments shown and described herein.

Referring now to FIG. 10, FIG. 10 schematically depicts a control system 1000 for controlling the components of the cleaning station and the binder and the cleaning fluid pathways. The control system 1000 is communicatively coupled to at least the print head, the pump 808, the pump 820, the active drain 826, and the level sensor 828. In embodiments, the control system 1000 may additionally be communicatively coupled to at least one additional sensor 1006, such as a sensor for monitoring one or more physical properties of the cleaning fluid, as described in greater detail above, the actuators 602*a*, 602*b* coupled to the wet wipe member 310 and the dry wipe member 312, and the actuator 706 coupled to the sponge support 704 or cap 710. In the embodiments described herein, the control system 1000 comprises a processor 1002 communicatively coupled to a memory 1004. The processor 1002 may include any processing component(s), such as a central processing unit or the like, configured to receive and execute computer readable and executable instructions stored in, for example, the memory 1004. In the embodiments described herein, the processor 1002 of the control system 1000 is configured to provide control signals to (and thereby actuate) the print head 150, the pump 808, the pump 820, and the active drain 826.

In embodiments, the control system 1000 may be configured to receive signals from one or more sensors of the fluid management system and, based on these signals, actuate one or more of the print head 150, the pump 808, the pump 820, the active drain 826, or other valves, pumps, and drains that may be included in the fluid management system. In some embodiments, the control system 1000 may be configured to receive signals from one or more additional sensors in the additive manufacturing apparatus 100 and, based on these signals, actuate one or more of the actuators 602*a*, 602*b* coupled to the wet wipe member 310 and the dry wipe member 312, and the actuator 706 coupled to the sponge support 704 or cap 710 to raise and/or lower the components of the cleaning station 110 for use.

In various embodiments, the control system 1000 is configured to receive signals from and send signals to one or more components described herein. Accordingly, the control system 1000, in embodiments, can enable one or more of the functions described herein, including, without limitation, movement of any or all of the components of the cleaning station (e.g., the wet wipe member, the dry wipe member, the capping section, and the cleaning station vessel), adjustment of one more components described herein, monitoring the status of binder material and/or cleaning fluid described herein, monitoring performance of the additive manufacturing apparatus or any component thereof, measurements of various components, opening and closing of ports and valves, and the like. In embodiments, the control system 1000 is configured to control motion of the recoat head, the print head, and other components of the additive manufacturing device described herein.

Moreover, it is contemplated that, although control system 1000 is shown in FIG. 10 as being a single computing device, the control system 1000 may be a distributed system that includes multiple computing devices interconnected to perform the functions herein.

In the embodiments described herein, the computer readable and executable instructions for controlling the additive manufacturing apparatus 100, and particularly, the cleaning station 110 and the fluid management system, are stored in the memory 1004 of the control system 1000. The memory 1004 is a non-transitory computer readable memory. The memory 1004 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

Various methods have been described herein that may be executed by the control system 1000. For example, the monitoring of the status of the cleaning fluid and the selection and implementation of a cleaning fluid maintenance process, the actuation of the wet wipe member, the dry wipe member, and the sponge, and the ejection of binder material from the print head may each be performed through execution of computer readable and executable instructions stored in the memory 1004 by the processor 1002. It is contemplated that one or more of these functions may alternatively be performed by one or more additional computing devices, which may be communicatively coupled to the control system 1000. For example, the monitoring of the status of the cleaning fluid and the selection and implementation of a cleaning fluid maintenance process may be performed from a computing device that is separate from, but communicatively coupled to, the control system 1000. It is also contemplated that additional functions may be performed by the control system 1000 and/or additional computing devices communicatively coupled thereto.

For example, in some embodiments in which the binder material includes a fluorescent dye, as described above, the control system 1000 (or other computing device communicatively coupled thereto) may determine an amount of cure of the printed part (e.g., through storage and execution of computer readable and executable instructions). A UV camera, a visible or other detection system can be used to detect the fluorescence of the binder.

During the operation of a an additive manufacturing apparatus, it may be difficult to assess the quantity, geometric fidelity, and extent of cure of binder deposited into the powder bed. Powder soaked with binder often provides poor visual contrast for reliable optical observation of each layer or multiple layers of the green body part. However, the present embodiments address this problem by including in the binder composition one or more fluorescent photochromic dyes. After layerwise jetting deposition into the powder and any subsequent thermal treatment, the subsequent exposure of the binder-powder surface to UV or other electromagnetic radiation will cause the fluorescent dyes to emit light.

Based on the emitted light, a control system including a UV camera can be used to image each layer of the 3D print. Using the control system, the acquired image(s) at specified time(s) can be compared to the expected quantity of binder jetted and identify spatial defects including binder jet print head misfires, inaccurate binder quantity deposition (saturation), as well as insufficient binder cure.

In one embodiment, the control system can determine the presence of binder solvent increases the quantum yield of emitted light as compared to a solvent free sample. If there is solvent in the binder-powder layer, the control system can pinpoint locations where solvent has not been effectively removed. Improper solvent removal may thus indicate areas of incomplete curing. Alternatively, the control system may detect areas of low binder based on the emitted light. This could indicate the clogging of the print head.

After detecting these defects, the control system enables the operator of the apparatus to troubleshoot or perform diagnostic checks on the additive manufacturing device, for example, by checking the recoat head and/or print head for clogging issues. In one embodiment, the detection of a defect may trigger a pattern test to determine if one or more print head nozzles are clogged.

In one embodiment for monitoring the performance of an additive manufacturing device using a fluorescent binder, the method comprise exposing at least one layer comprising the fluorescent binder to electromagnetic radiation. The fluorescent binder includes fluorescent material which emits light in response to the electromagnetic radiation. Next, the method includes recording the emitted light intensity of the at least one layer after exposure, and computing a level of binder, solvent, or both within the layer by utilizing a control system which correlates the recorded emitted light intensity to the level of binder, solvent, or both in the layer versus time. Defects may be located in the layer when the recorded emitted light intensity deviates from expected emitted light intensity values, or when the level of binder, solvent or both deviates from expected levels.

Further aspects of the invention are provided by the subject matter of the following clauses:

1. A fluid management system for supplying at least a binder fluid and a cleaning fluid, the system comprising: a cleaning fluid path comprising at least one cleaning fluid reservoir, a pump configured to deliver the cleaning fluid from the at least one cleaning fluid reservoir to at least one cleaning station vessel, and a drain coupling the at least one cleaning station vessel to the at least one cleaning fluid reservoir; and a binder fluid path comprising at least one binder reservoir, a pump configured to deliver the binder fluid from the at least one binder reservoir through an ink supply system to a print head manifold, and a binder purge bin configured to receive binder fluid discharged by a print head coupled to the print head manifold.

2. The fluid management system of any preceding clause, wherein the binder purge bin is a first binder purge bin, the binder fluid path further comprising a second binder purge bin, wherein the first binder purge bin is located upstream from the at least one cleaning station vessel and the second binder purge bin is located downstream from the at least one cleaning station vessel along a path of the print head.

3. The fluid management system of any preceding clause, wherein the cleaning fluid path further comprises a filter positioned between the at least one cleaning fluid reservoir and the pump.

4. The fluid management system of any preceding clause, wherein the binder fluid path further comprises a filter positioned between the binder purge bin and the at least one binder reservoir.

5. The fluid management system of any preceding clause, wherein the binder fluid path further comprises an additional pump configured to pump fluid from the binder purge bin to the at least one binder reservoir.

6. The fluid management system of any preceding clause, wherein the cleaning fluid path further comprises a heater to heat the cleaning fluid.

7. The fluid management system of any preceding clause, wherein the cleaning fluid path further comprises a controller configured to send a signal to a valve positioned in the cleaning fluid path between the at least one cleaning station vessel and the at least one cleaning fluid reservoir to redirect a predetermined amount of the cleaning fluid flowing from the at least one cleaning station vessel to the at least one cleaning fluid reservoir to a waste tank, wherein the predetermined amount of the cleaning fluid contains at least some binder fluid.

8. The fluid management system of any preceding clause, wherein the controller is further configured to send a signal to the pump of the cleaning fluid path to adjust a flow rate of the cleaning fluid from the at least one cleaning fluid reservoir to the at least one cleaning station vessel.

9. The fluid management system of any preceding clause, wherein the controller is further configured to send a signal to a heater positioned between the pump and the at least one cleaning station vessel to adjust a temperature of the cleaning fluid.

10. The fluid management system of any preceding clause, wherein at least one of the pump of the cleaning fluid path and the pump of the binder fluid path is configured to move ferrous metals.

11. A method of using a fluid management system comprising: continuously recirculating a binder fluid through a binder fluid path comprising at least one binder reservoir, a pump, and a binder purge bin, wherein: the pump delivers the binder fluid from the at least one binder reservoir through an ink supply system to a print head manifold; and the binder purge bin receives binder fluid discharged by a print head coupled to the print head manifold; delivering, using a pump, a cleaning fluid from at least one cleaning fluid reservoir to at least one cleaning station vessel; receiving, at a waste tank, a first portion of the cleaning fluid from the at least one cleaning station vessel; returning a second portion of the cleaning fluid from the at least one cleaning station vessel to the at least one cleaning fluid reservoir; and diverting a predetermined amount of the second portion of the cleaning fluid to the waste tank based on a level of contamination of the cleaning fluid with the binder fluid.

12. The method of any preceding clause, wherein diverting the predetermined amount of the second portion of the cleaning fluid comprises sending a signal to a valve positioned between the at least one cleaning station vessel, the at least one cleaning fluid reservoir, and the waste tank to divert the predetermined amount of the second portion of the cleaning fluid flowing from the at least one cleaning station vessel to the at least one cleaning fluid reservoir to the waste tank.

13. The method of any preceding clause, wherein the binder purge bin comprises an overflow outlet for redirecting the binder fluid from the binder purge bin to the at least one binder reservoir.

14. The method of any preceding clause, wherein continuously recirculating the binder fluid comprises pumping the binder fluid from the binder purge bin to the at least one binder reservoir.

15. The method of any preceding clause, wherein the binder fluid path further comprises a filter positioned between the binder purge bin and the at least one binder reservoir.

16. The method of any preceding clause, wherein the filter is positioned between the binder purge bin and the pump of the binder fluid path.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A fluid management system for supplying at least a binder fluid and a cleaning fluid, the system comprising:
   a cleaning fluid path comprising at least one cleaning fluid reservoir, a pump configured to deliver the cleaning fluid from the at least one cleaning fluid reservoir to at least one cleaning station vessel, and a drain coupling the at least one cleaning station vessel to the at least one cleaning fluid reservoir, wherein the at least one cleaning station vessel comprises a wet wipe member, the wet wipe member comprising a wet wiper body and a fluid channel positioned therein and extending horizontally from a first end of the wet wiper body to a second end of the wet wiper body and opening vertically such that the cleaning fluid is configured to flow upwardly out of the fluid channel and is applied to a print head coupled to a print head manifold; and
   a binder fluid path comprising at least one binder reservoir, a pump configured to deliver the binder fluid from the at least one binder reservoir through an ink supply system to the print head manifold, and a binder purge bin configured to receive binder fluid discharged by the print head.

2. The fluid management system of claim 1, wherein the binder purge bin is a first binder purge bin, the binder fluid path further comprising a second binder purge bin, wherein the first binder purge bin is located upstream from the at least one cleaning station vessel and the second binder purge bin is located downstream from the at least one cleaning station vessel along a path of the print head.

3. The fluid management system of claim 1, wherein the cleaning fluid path further comprises a filter positioned between the at least one cleaning fluid reservoir and the pump.

4. The fluid management system of claim 1, wherein the binder fluid path further comprises a filter positioned between the binder purge bin and the at least one binder reservoir.

5. The fluid management system of claim 1, wherein the binder fluid path further comprises an additional pump configured to pump fluid from the binder purge bin to the at least one binder reservoir.

6. The fluid management system of claim 1, wherein the cleaning fluid path further comprises a heater to heat the cleaning fluid.

7. The fluid management system of claim 1, wherein the cleaning fluid path further comprises a controller configured to send a signal to a valve positioned in the cleaning fluid path between the at least one cleaning station vessel and the at least one cleaning fluid reservoir to redirect a predetermined amount of the cleaning fluid flowing from the at least one cleaning station vessel to the at least one cleaning fluid reservoir to a waste tank, wherein the predetermined amount of the cleaning fluid contains at least some binder fluid.

8. The fluid management system of claim 7, wherein the controller is further configured to send a signal to the pump of the cleaning fluid path to adjust a flow rate of the cleaning fluid from the at least one cleaning fluid reservoir to the at least one cleaning station vessel.

9. The fluid management system of claim 7, wherein the controller is further configured to send a signal to a heater positioned between the pump and the at least one cleaning station vessel to adjust a temperature of the cleaning fluid.

10. The fluid management system of claim 1, wherein at least one of the pump of the cleaning fluid path and the pump of the binder fluid path is configured to move ferrous metals.

11. The fluid management system of claim 1, wherein the at least one cleaning station vessel further comprises a dry wipe member.

12. A method of using a fluid management system comprising:
   continuously recirculating a binder fluid through a binder fluid path comprising at least one binder reservoir, a pump, and a binder purge bin, wherein:

the pump delivers the binder fluid from the at least one binder reservoir through an ink supply system to a print head manifold; and the binder purge bin receives binder fluid discharged by a print head coupled to the print head manifold;

delivering, using a pump, a cleaning fluid from at least one cleaning fluid reservoir to at least one cleaning station vessel, wherein the at least one cleaning station vessel comprising a wet wipe member, the wet wipe member comprising a wet wiper body and a fluid channel positioned therein and extending horizontally from a first end of the wet wiper body to a second end of the wet wiper body and opening vertically such that the cleaning fluid is configured to flow upwardly out of the fluid channel and is applied to the print head;

receiving, at a waste tank, a first portion of the cleaning fluid from the at least one cleaning station vessel;

returning a second portion of the cleaning fluid from the at least one cleaning station vessel to the at least one cleaning fluid reservoir; and diverting a predetermined amount of the second portion of the cleaning fluid to the waste tank based on a level of contamination of the cleaning fluid with the binder fluid.

13. The method of claim 12, wherein diverting the predetermined amount of the second portion of the cleaning fluid comprises sending a signal to a valve positioned between the at least one cleaning station vessel, the at least one cleaning fluid reservoir, and the waste tank to divert the predetermined amount of the second portion of the cleaning fluid flowing from the at least one cleaning station vessel to the at least one cleaning fluid reservoir to the waste tank.

14. The method of claim 12, wherein the binder purge bin comprises an overflow outlet for redirecting the binder fluid from the binder purge bin to the at least one binder reservoir.

15. The method of claim 12, wherein continuously recirculating the binder fluid comprises pumping the binder fluid from the binder purge bin to the at least one binder reservoir.

16. The method of claim 12, wherein the binder fluid path further comprises a filter positioned between the binder purge bin and the at least one binder reservoir.

17. The method of claim 16, wherein the filter is positioned between the binder purge bin and the pump of the binder fluid path.

\* \* \* \* \*